(12) United States Patent
Shintani et al.

(10) Patent No.: US 11,970,238 B2
(45) Date of Patent: Apr. 30, 2024

(54) VEHICLE

(71) Applicant: SONY CORPORATION, Tokyo (JP)

(72) Inventors: Eiji Shintani, Tokyo (JP); Shigeki Ohno, Tokyo (JP); Yasuyuki Kato, Tokyo (JP); Thomas Waldner, Surrey (GB); Simon Henning, Surrey (GB)

(73) Assignee: SONY CORPORATION, Tokyo (JP)

( * ) Notice: Subject to any disclaimer, the term of this patent is extended or adjusted under 35 U.S.C. 154(b) by 646 days.

(21) Appl. No.: 17/250,322

(22) PCT Filed: May 28, 2019

(86) PCT No.: PCT/JP2019/021000
§ 371 (c)(1),
(2) Date: Jan. 4, 2021

(87) PCT Pub. No.: WO2020/012801
PCT Pub. Date: Jan. 16, 2020

(65) Prior Publication Data
US 2021/0269115 A1    Sep. 2, 2021

(30) Foreign Application Priority Data

Jul. 12, 2018  (JP) .................................. 2018-132568

(51) Int. Cl.
*B62K 5/06* (2006.01)
*B62J 3/00* (2020.01)
(Continued)

(52) U.S. Cl.
CPC ...................... *B62K 5/06* (2013.01);
*B62J 3/00* (2013.01); *B62J 45/422* (2020.02);
*B62K 5/05* (2013.01); *B62K 5/10* (2013.01)

(58) Field of Classification Search
CPC ... B62K 5/06; B62K 5/05; B62K 5/10; B62K 5/02; B62J 3/00; B62J 45/422
See application file for complete search history.

(56) References Cited

U.S. PATENT DOCUMENTS 5,762,351 A *  6/1998  SooHoo  ................... B62K 5/10
                                                  280/282
6,460,866 B1 * 10/2002  Altschul  ................... A45F 4/02
                                                  280/304.5
(Continued)

FOREIGN PATENT DOCUMENTS

CA        2621563 A1    3/2007
CN        1712304 A    12/2005
(Continued)

OTHER PUBLICATIONS

Mecahnical translation of CN-206679166-U, Nov. 2017.*
(Continued)

*Primary Examiner* — John D Walters
(74) *Attorney, Agent, or Firm* — CHIP LAW GROUP

(57) ABSTRACT

Provided is a vehicle including a handle part that includes a handle, what is connected to be steerable by the handle, a rear wheel connected to a pedal, and a frame part that connects what is described above and the rear wheel, in which the frame part is expandable and contractible between a first position in which a movement of what is described above is permitted, and a second position in which a movement of what is described above is restricted.

11 Claims, 62 Drawing Sheets

(51) Int. Cl.
B62J 45/422 (2020.01)
B62K 5/05 (2013.01)
B62K 5/10 (2013.01)

(56) References Cited

U.S. PATENT DOCUMENTS

| | | | |
|---|---|---|---|
| 6,688,614 B2 * | 2/2004 | Hsu | B62K 3/002 280/47.131 |
| 7,490,844 B2 * | 2/2009 | Barak | B62K 13/00 280/7.17 |
| 2003/0042711 A1 | 3/2003 | Hsu | |
| 2007/0007739 A1 | 1/2007 | Bailey et al. | |
| 2007/0057483 A1 | 3/2007 | Barak et al. | |
| 2008/0217875 A1 | 9/2008 | Barak et al. | |
| 2008/0309039 A1 | 12/2008 | Bailey et al. | |

FOREIGN PATENT DOCUMENTS

| | | | |
|---|---|---|---|
| CN | 2871359 Y | | 2/2007 |
| CN | 101267975 A | | 9/2008 |
| CN | 103507895 A | | 1/2014 |
| CN | 206679166 U | * | 11/2017 ............. B62K 11/00 |
| CN | 107458525 A | | 12/2017 |
| CN | 207311729 U | | 5/2018 |
| DK | 1924489 T3 | | 1/2011 |
| EP | 1924489 A1 | | 5/2008 |
| EP | 2196386 A2 | | 6/2010 |
| ES | 2352795 T3 | | 2/2011 |
| JP | 2007-124866 A | | 5/2007 |
| JP | 2010-030588 A | | 2/2010 |
| JP | 4923052 B2 | | 4/2012 |
| NZ | 566369 A | | 5/2010 |
| PL | 220843 B1 | | 1/2016 |
| TW | M299120 U | | 10/2006 |
| TW | 200720137 A | | 6/2007 |
| TW | M313098 U | | 6/2007 |
| TW | M521035 U | | 5/2016 |
| WO | 2002/044008 A2 | | 6/2002 |
| WO | 2007/031987 A1 | | 3/2007 |
| WO | 2011/132185 A1 | | 10/2011 |
| WO | 2014/101627 A1 | | 7/2014 |

OTHER PUBLICATIONS

Office Action for CN Patent Application No. 201980045422.1, dated Feb. 25, 2022, 08 pages of English Translation and 06 pages of Office Action.
International Search Report and Written Opinion of PCT Application No. PCT/JP2019/021000, dated Aug. 6, 2019, 12 pages of ISRWO.
Extended European Search Report of EP Application No. 19834663. 7, dated Jul. 5, 2021, 07 pages.

* cited by examiner

VEHICLE

CROSS REFERENCE TO RELATED APPLICATIONS

This application is a U.S. National Phase of International Patent Application No. PCT/JP2019/021000 filed on May 28, 2019, which claims priority benefit of Japanese Patent Application No. JP 2018-132568 filed in the Japan Patent Office on Jul. 12, 2018. Each of the above-referenced applications is hereby incorporated herein by reference in its entirety.

TECHNICAL FIELD

The present disclosure relates to a vehicle.

BACKGROUND ART

Proposals have been made to enable the shape of a vehicle such as a bicycle to be changed when the vehicle is not being used, thereby improving convenience with regard to portability and other factors. For example, Patent Document 1 below describes a bicycle having an expandable frame, in which expanding or contracting the frame allows the bicycle to be folded after being aligned.

CITATION LIST

Patent Document

Patent Document 1: Japanese Patent Application Laid-Open No. 2010-30588

SUMMARY OF THE INVENTION

Problems to be Solved by the Invention

The description of Patent Document 1 does not contain a description of the technical idea of parking the vehicle in a location such as a bicycle parking area while the shape of the vehicle is in the changed state.

An object of the present disclosure is to provide a vehicle configured to have an expandable frame part, and for example, an object is to provide a vehicle configured to have a frame part capable of being expanded and contracted between a position in which movement of the front wheels is permitted, and a position in which movement of the front wheels is restricted.

Solutions to Problems

The present disclosure is, for example,
a vehicle including:
a handle part that includes a handle;
a front wheel connected to be steerable by the handle;
a rear wheel connected to a pedal; and
a frame part that connects the front wheel and the rear wheel, in which
the frame part is expandable and contractible between a first position in which a movement of the front wheel is permitted, and a second position in which a movement of the front wheel is restricted.

Effects of the Invention

According to at least an embodiment of the present disclosure, the frame part can be expanded and contracted between a position in which movement of the front wheels is permitted and a position in which movement of the front wheels is restricted. Effects described herein are not necessarily limited, but any effect described in the present disclosure may be obtained. In addition, the contents of the present disclosure should not be construed limitedly by the illustrated effects.

MODE FOR CARRYING OUT THE INVENTION

Figure 1:
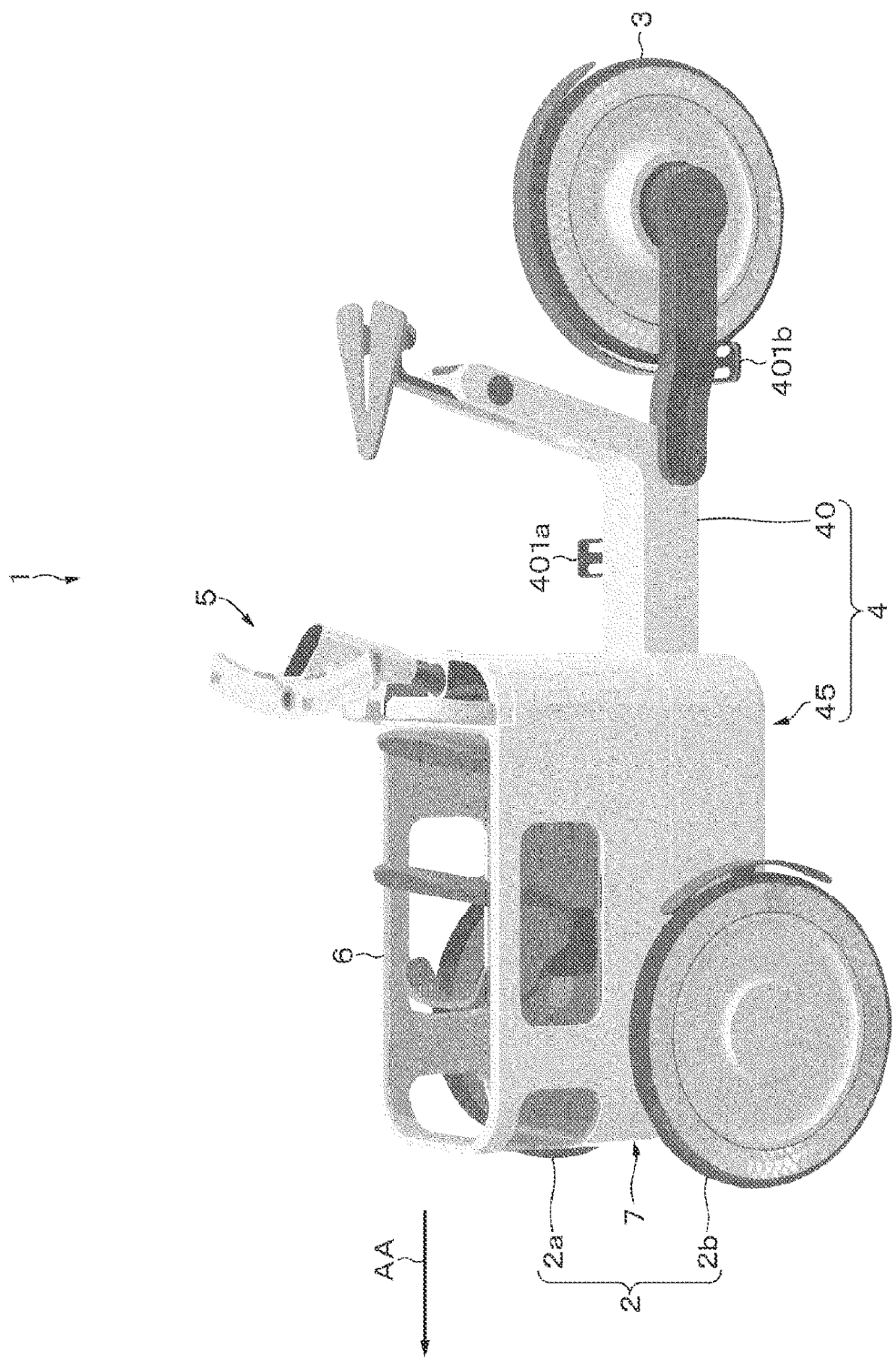
FIG. 1 is a diagram for explaining an example of the overall configuration of a vehicle according to an embodiment.

Hereinafter, embodiments and the like of the present disclosure will be described while referring to the drawings. Note that the description will proceed in the following order.

EMBODIMENTS

Modifications

The embodiments and the like described hereinafter are specific favorable examples of the present disclosure, but the content of the present disclosure is not limited to these embodiments and the like.

EMBODIMENTS

[Example Configuration of Vehicle]
(Example of Overall Configuration of Vehicle)

First, an overall configuration of a vehicle (vehicle 1) according to an embodiment will be summarized. Note that in the following description, a motorized tricycle is described as an example of the vehicle 1. More specifically a motorized tricycle having two front wheels and one rear wheel is described as an example. Also, for convenience, the forward direction (advancement direction) of the vehicle 1 is used as a reference to define and describe the front, rear, left, right, top, and bottom directions. Furthermore, to make the embodiment easy to understand, portions of the configuration are omitted from illustration or simplified in some cases, and reference signs are applied to only a portion of the configuration in some cases.

FIG. 1 is a diagram for explaining an example of the overall configuration of a vehicle 1 according to an embodiment. Broadly, for example, the vehicle 1 has front wheels 2, a rear wheel 3, a frame part 4, a handle part 5, a carrier 6, and a link mechanism 7. Additionally, the vehicle 1 has a battery compartment (not illustrated) provided in a suitable location, and a portable battery is removably housed in the battery compartment. Generally, the vehicle 1 is used in a state where a charged battery is installed, but the vehicle 1 according to the present embodiment is also usable even in the state where a battery is not installed.

The rear wheel 3 of the vehicle 1 is driven due to a user rotating pedals 401a and 401b connected to a crank, for example. With this arrangement, the vehicle 1 advances in the direction indicated by the arrow AA in FIG. 1. Each component of the vehicle 1 is formed by a member having a certain degree of strength, such as a metal or plastic member.

The front wheels 2 according to the embodiment include a right front wheel 2a (one example of a first wheel) and a left front wheel 2b (one example of a second wheel). In the following description, the front wheels 2a and 2b will be collectively referred to as the front wheels 2 if not being individually distinguished. Also, the frame part 4 according to the embodiment includes a first frame part 40 to which the rear wheel 3 is connected, and a second frame part 45 to which the front wheels 2 are connected.

The full width of the vehicle 1 (the length between the front wheels 2a and 2b) is from 60 to 70 cm (centimeters), for example. Also, the full length of the vehicle 1 (the length from the front end of the front wheels 2 to the rear end of the rear wheel 3) is approximately 190 cm in a case where the frame part 4 is in the longest state, and approximately 160 cm in a case where the frame part 4 is in the shortest state, for example.

The frame part 4 is expandable and contractible by moving the first frame part 40 and the second frame part 45 relative to each other, for example. In the present embodiment, bringing the first frame part 40 closer to the second frame part 45 contracts the frame part 4 as a whole, whereas taking the first frame part 40 farther away from the second frame part 45 extends the frame part 4 as a whole. More specifically, the frame part 4 is inseparably expandable and contractible between a first position in which movement of the front wheels 2 is permitted, and a second position in which movement of the front wheels 2 is restricted.

Figure 2:
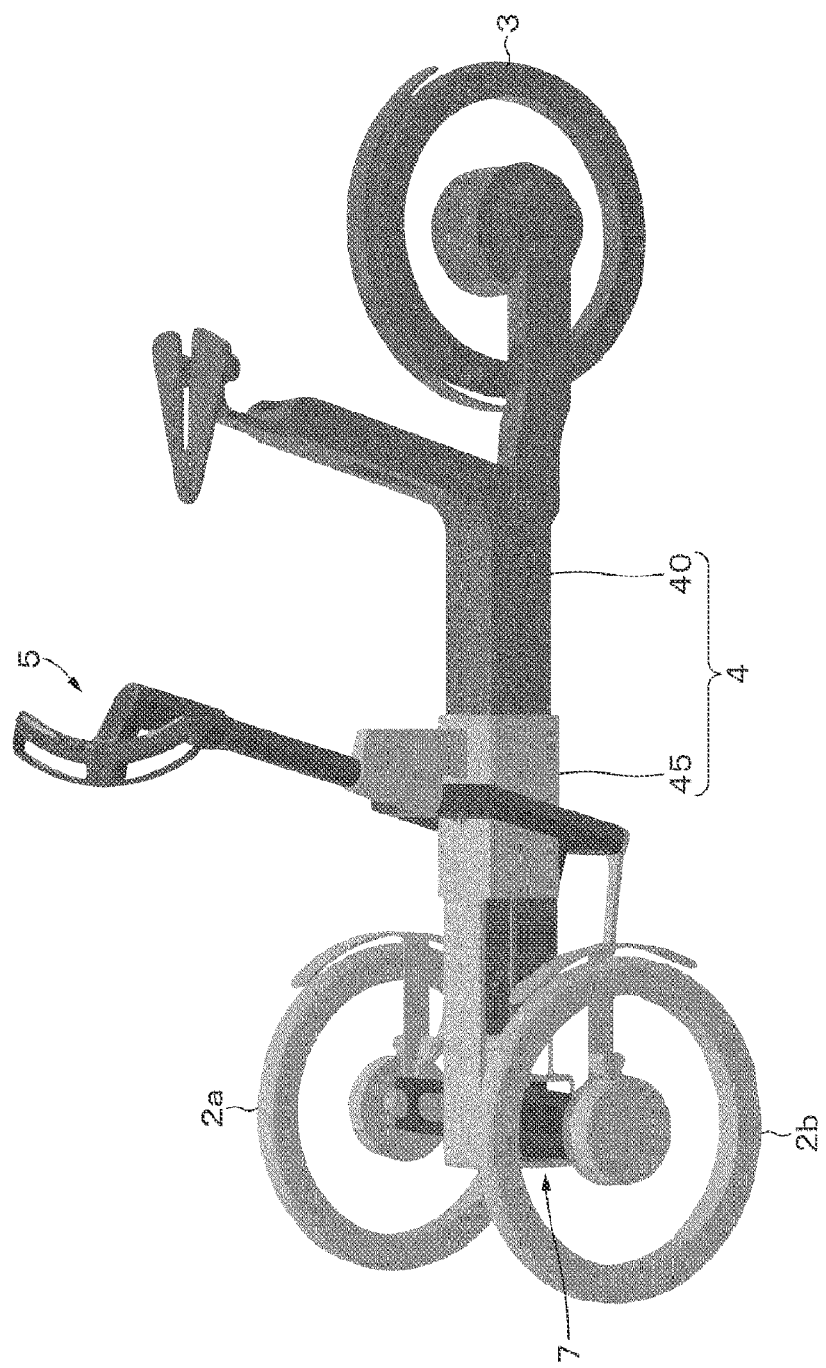
FIG. 2 is a diagram illustrating a state in which the frame part according to an embodiment is set to a first position.
Figure 3:
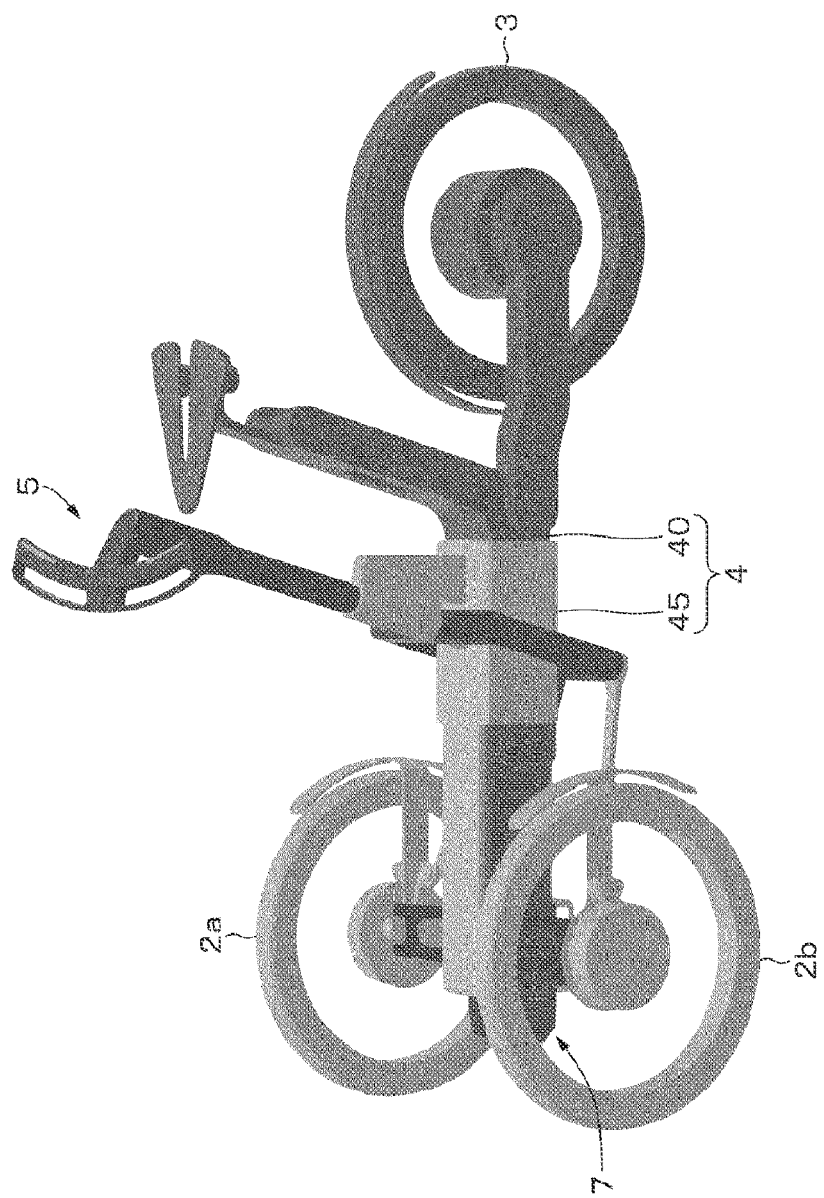
FIG. 3 is a diagram illustrating a state in which the frame part according to an embodiment is set to a second position.

FIG. 2 illustrates a state in which the frame part 4 is set to a first position. Note that in FIG. 2, the carrier 6 is omitted from illustration (FIG. 3 described later is similar). In the state where the frame part 4 is set to the first position, the length of the frame part 4 is maximized, or in other words, the full length of the vehicle 1 is maximized. The vehicle 1 is used in such a state.

FIG. 3 illustrates a state in which the frame part 4 is set to a second position. In the state where the frame part 4 is set to the second position, the length of the frame part 4 is minimized, or in other words, the full length of the vehicle 1 is minimized. The vehicle 1 is parked in such a state. Because the full length of the vehicle 1 is minimized, the vehicle 1 can be parked in a compact state.

(First Frame Part)

Figure 4:
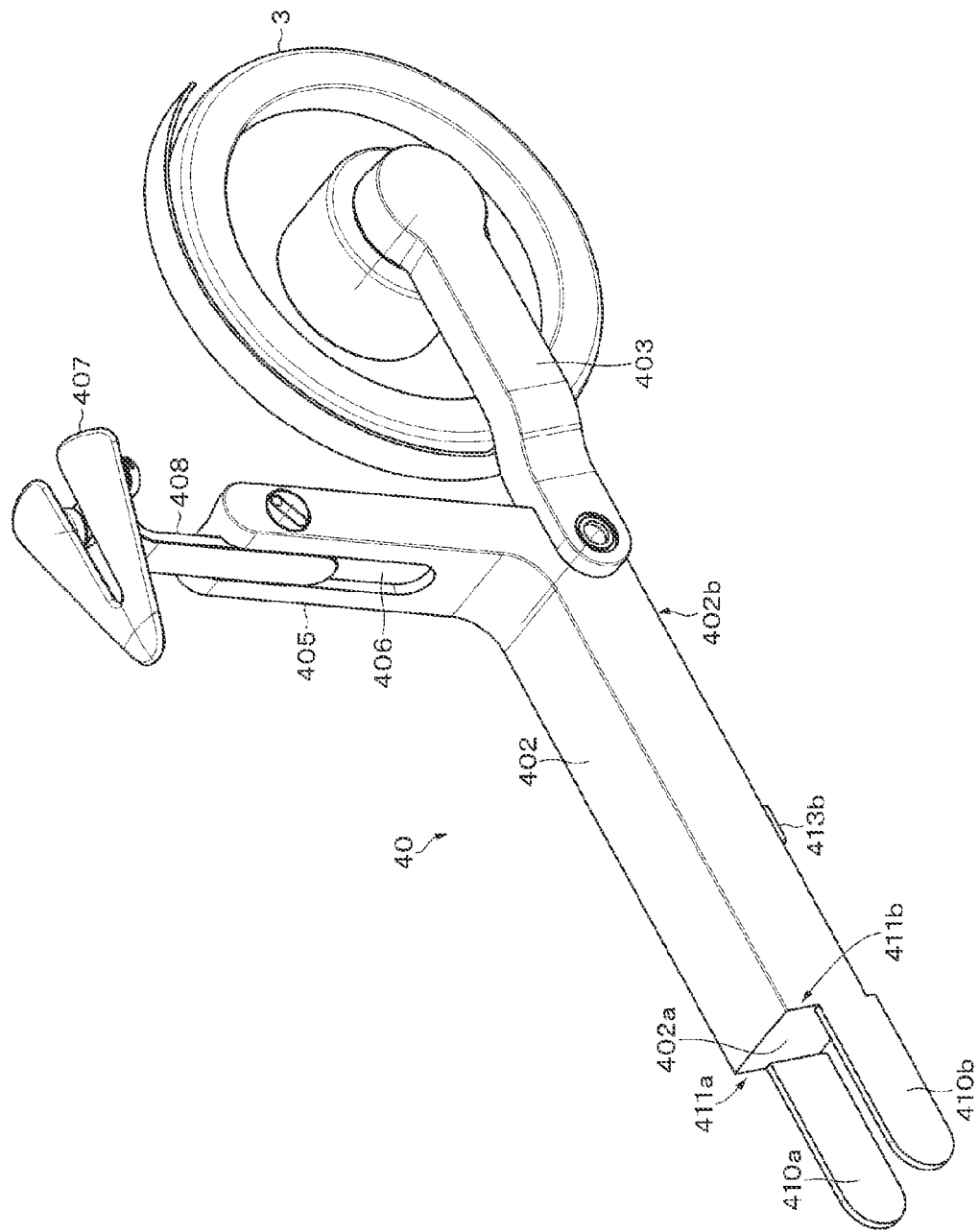
FIG. 4 is a diagram for explaining an example configuration of a first frame part according to an embodiment.
Figure 5:
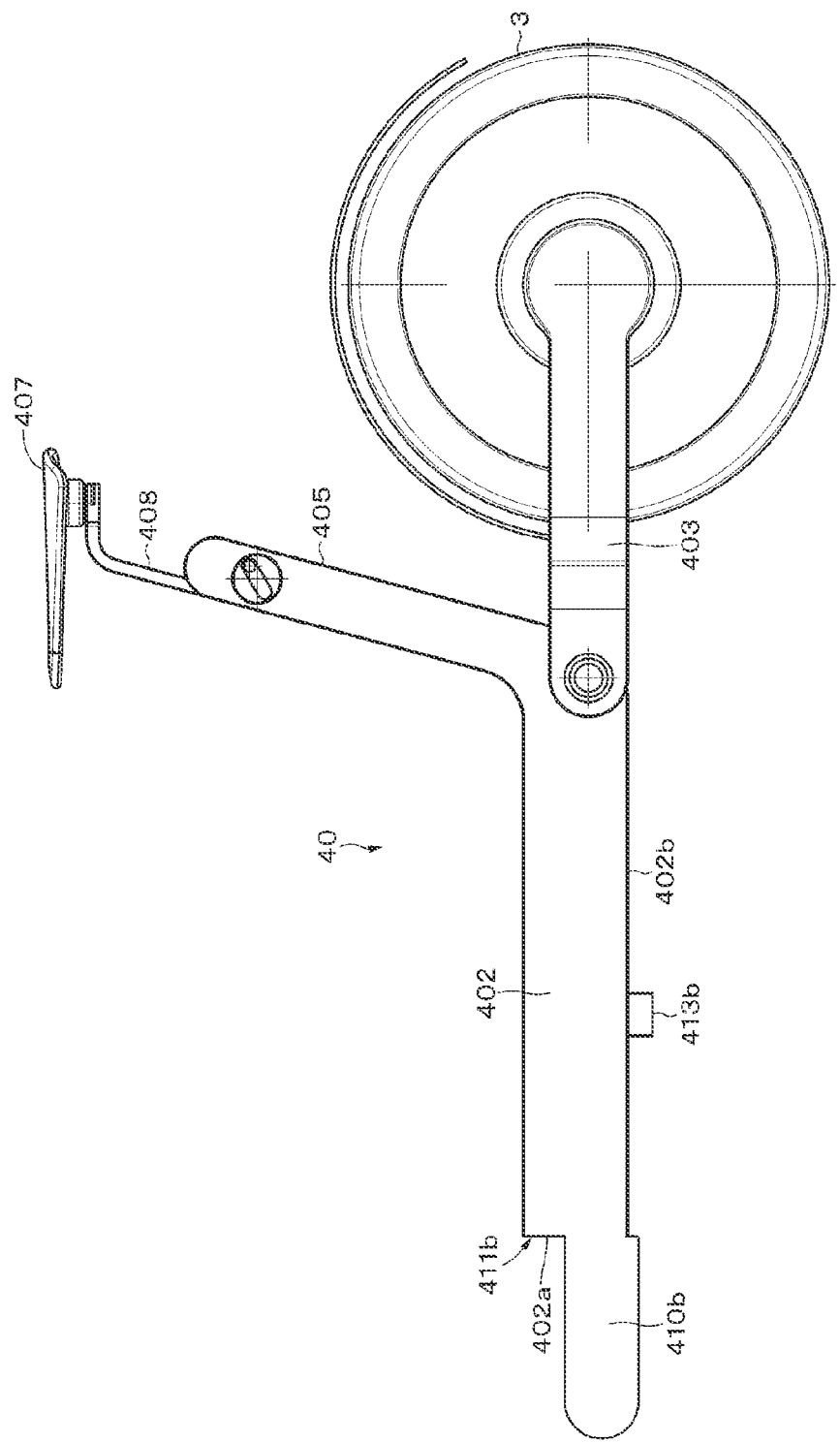
FIG. 5 is a diagram for explaining an example configuration of the first frame part according to an embodiment.

Each part of the vehicle 1 will be described. First, FIGS. 4 and 5 will be referenced to describe an example configuration of the first frame part 40. The first frame part 40 has a first base part 402 having a cuboid shape that extends in the longitudinal direction. On the rear-end side of the first base part 402, a connecting part 403 that extends in the longitudinal direction is connected. A crank is connected to the front end of the connecting part 403, while the rear wheel 3 is connected to the rear end. A motor is disposed inside the connecting part 403, auxiliary driving force associated with the rotation of the pedals 401a and 401b is generated by the motor, and the rear wheel 3 is rotated by a driving force that includes the auxiliary driving force.

From the rear-end side of the first base part 402, an upright part 405 that extends upward is provided. The first base part 402 and the upright part 405 are formed as an integrated (continuous) piece, for example. On the front side of the upright part 405, a groove 406 is formed. A saddle support 408 that supports a saddle 407 is slidable through the groove 406. By sliding the saddle support 408 up or down and stopping the saddle support 408 at a suitable position, the user is able to adjust the height of the saddle 407.

On the other hand, a pair of first and second plate-shaped parts 410a and 410b that project forward are provided on the left and right edges of a front side 402a of the first base part 402. The first and second plate-shaped parts 410a and 410b are provided respectively at positions where predetermined first and second steps 411a and 411b are formed with respect to the side 402a. Additionally, a pair of first and second projecting parts 413a and 413b are provided at a predetermined position on the left and right edges of a bottom (underside) 402b of the first base part 402.

(Second Frame Part)

Figure 6:
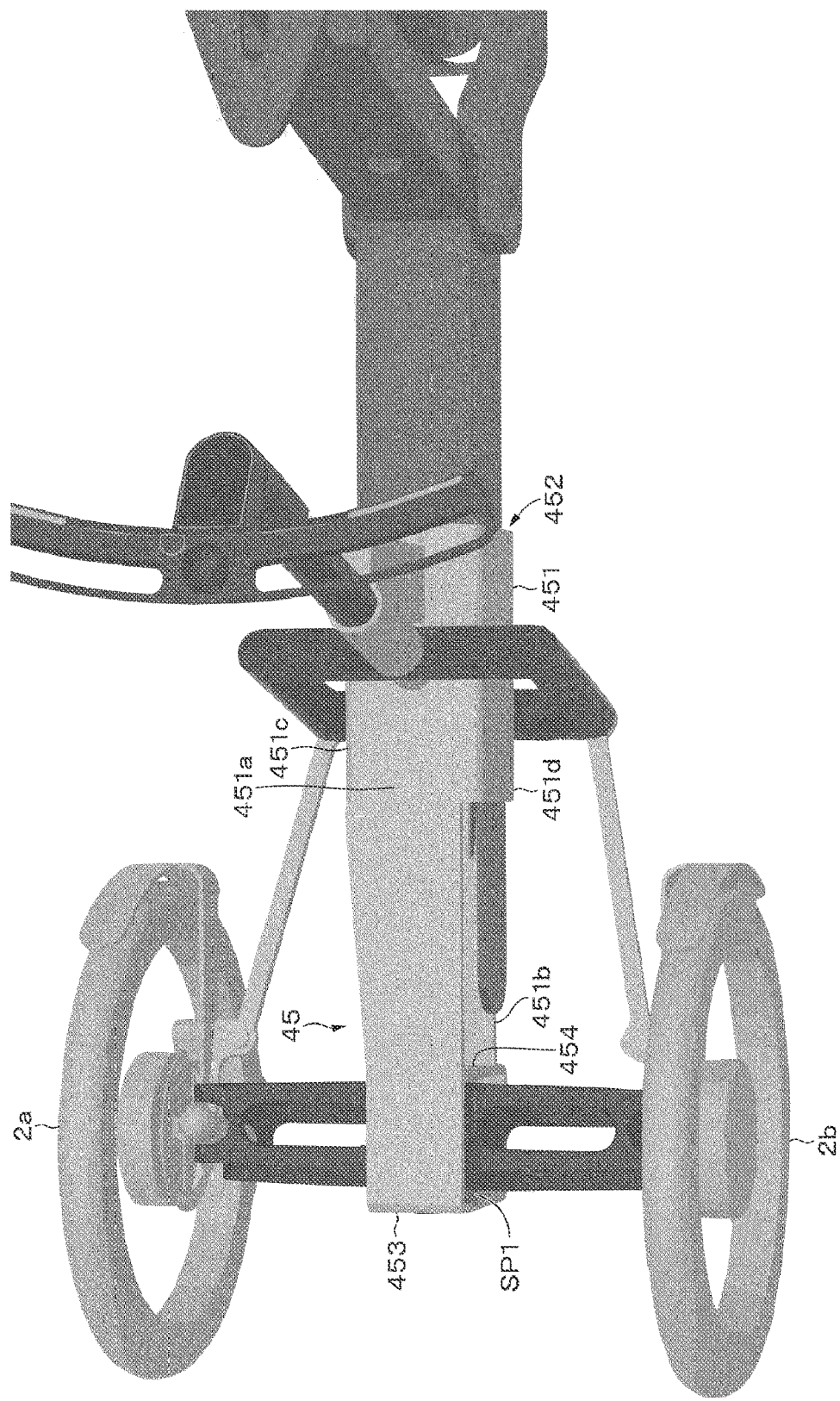
FIG. 6 is a diagram for explaining an example configuration of a second frame part according to an embodiment.
Figure 7:
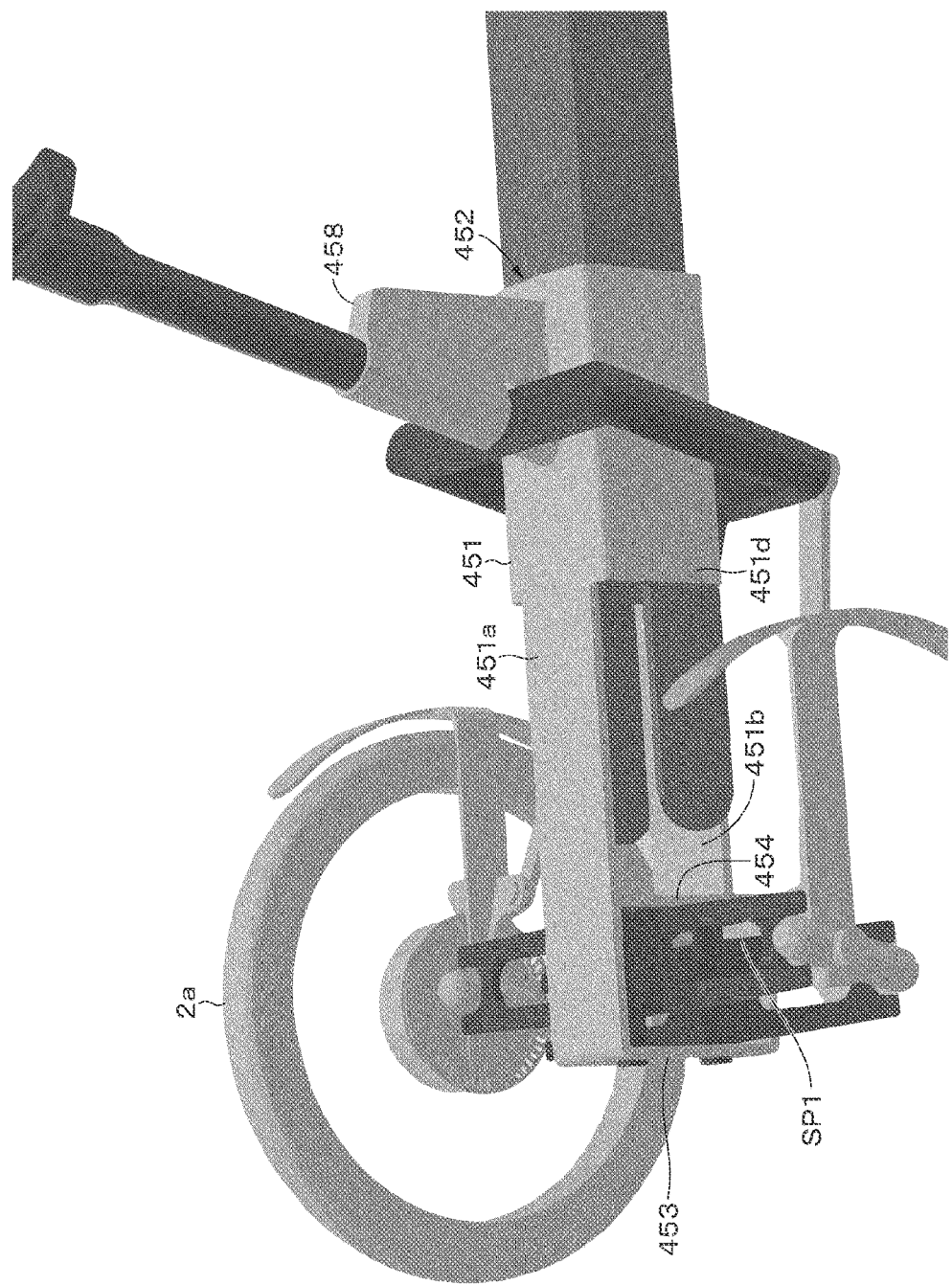
FIG. 7 is a diagram for explaining an example configuration of the second frame part according to an embodiment.
Figure 8:
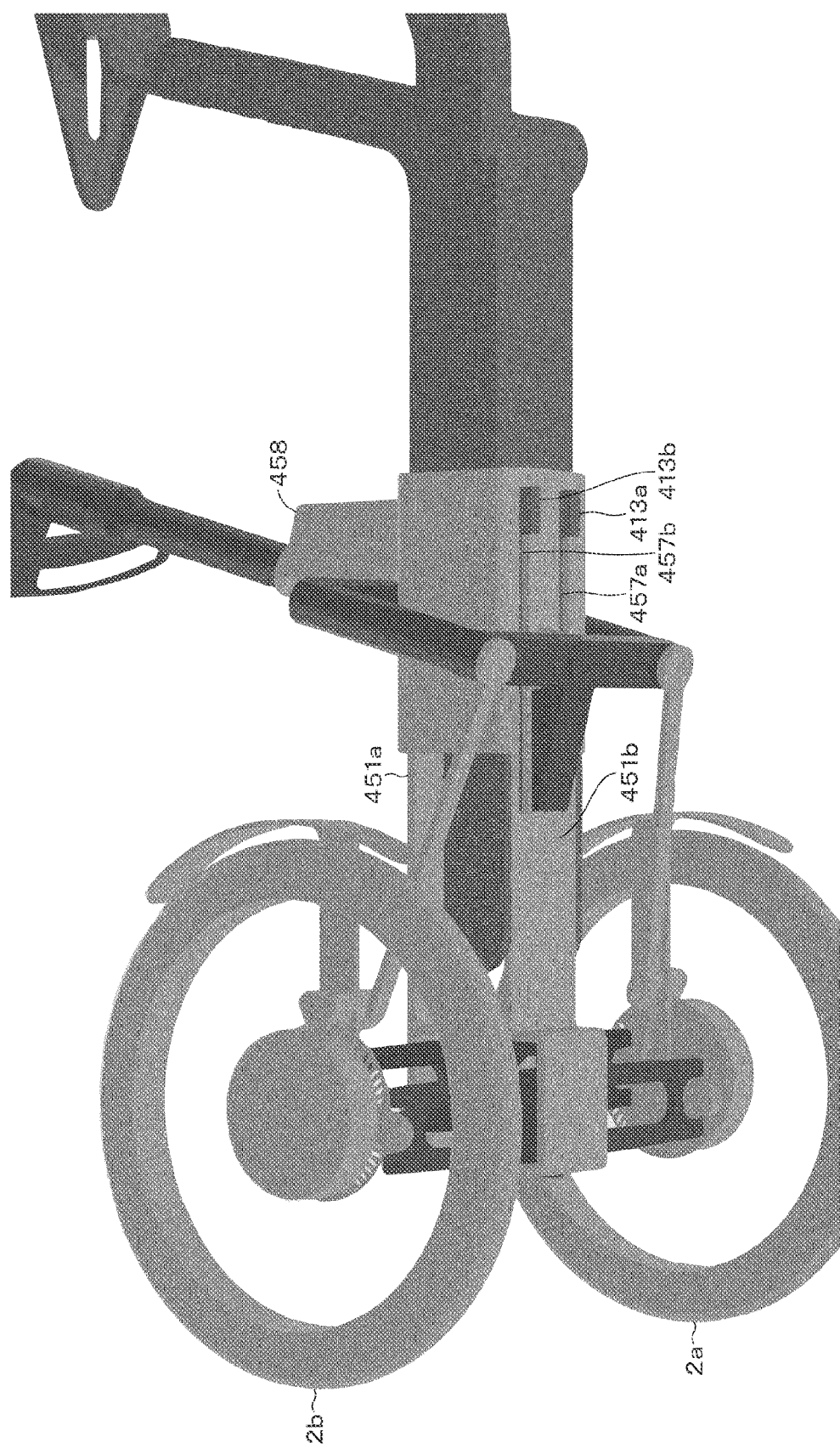
FIG. 8 is a diagram for explaining an example configuration of the second frame part according to an embodiment.

Next, FIGS. 6 to 8 will be referenced to describe an example configuration of the second frame part 45. The second frame part 45 has a second base part 451. The second base part 451 has a top plate 451a, a bottom plate 451b, a right-side plate 451c, and a left-side plate 451d, and also has an internal space demarcated by the plates. The rear side of the internal space is an opening 452, and the first frame part 40 is insertable through the opening 452.

The top plate 451a and the bottom plate 451b extend forward to be longer than the right-side plate 451c and the left-side plate 451d. The width (that is, the length from left to right) of the portion extending forward from the positions of the right-side plate 451c and the left-side plate 451d in the top plate 451a and the bottom plate 451b is smaller than the preceding width. More specifically, the width of the portion extending forward from the positions of the right-side plate 451c and the left-side plate 451d in the top plate 451a and the bottom plate 451b is smaller than the width between the first and second plate-shaped parts 410a and 410b described above.

For example, the respective front ends of the top plate 451a and the bottom plate 451b extend into the area near an axle between the front wheels 2a and 2b. Near the front end of the bottom plate 451b, a downward step is formed, but such a step does not have to be provided.

The respective front ends of the top plate 451a and the bottom plate 451b are joined by a first connecting plate 453 that extends vertically. Also, a second connecting plate 454 that connects the top plate 451a and the bottom plate 451b is provided at a position a predetermined distance rearward from the first connecting plate 453. A space SP1 demarcated by the top plate 451a, the bottom plate 451b, the first connecting plate 453, and the second connecting plate 454 is formed. Although details will be described later, two connecting arms that connect the front wheels 2a and 2b are inserted through the space SP1.

Additionally, a pair of first and second grooves 457a and 457b that extend in the longitudinal direction are formed on the bottom plate 451b (see FIG. 8). The first and second grooves 457a and 457b are formed substantially parallel to each other. The first projecting part 413a included in the first frame part is slidable in the longitudinal direction through the first groove 457a. Likewise, the second projecting part 413b included in the first frame part 40 is slidable in the longitudinal direction through the second groove 457b.

On the rear end of the top plate 451a of the second base part 451, a handle bearing part 458 that accepts the insertion of a handle shaft is provided.

(Handle Part)

Next, FIGS. 9 to 12 will be referenced to describe an example configuration of the handle part 5. Broadly, for example, the handle part 5 has a handle 501, a handle shaft 502 on one end of which the handle 501 is connected, a frame 503 connected to the other end of the handle shaft 502, and a transmission part 504 that is connected to the frame 503 and that transmits the movement of the handle 501 to the front wheels 2. The transmission part 504 includes first and second transmission parts 504a and 504b shaped like narrow plates (see FIG. 11), for example. The handle shaft 502 is inserted into the handle bearing part 458 and thereby supported vertically with a predetermined inclination. At the spot where the handle 501 and the one end of the handle shaft 502 are connected, a display 507 is provided (see FIG. 10).

Figure 10:
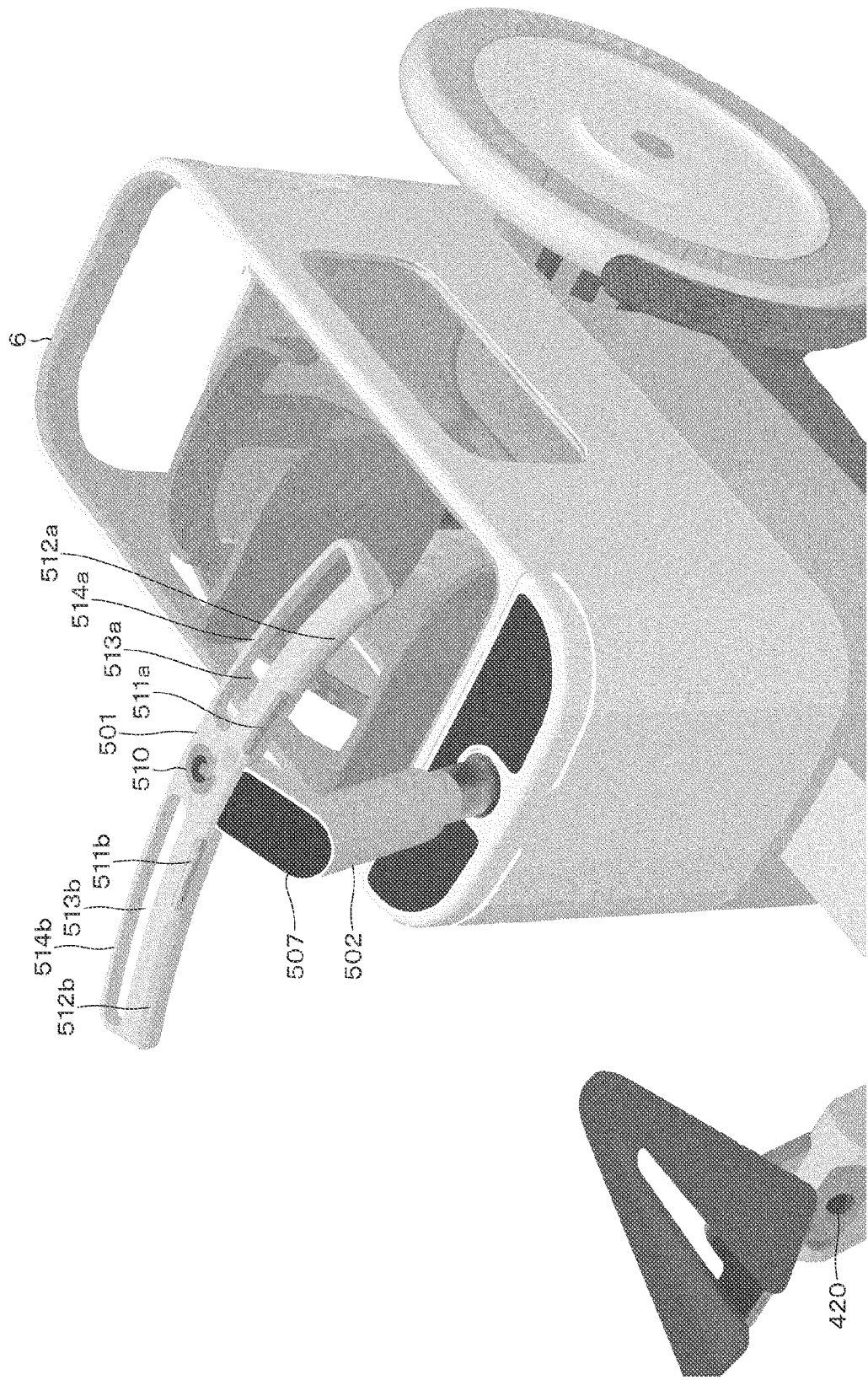
FIG. 10 is a diagram for explaining an example configuration of the handle part according to an embodiment.
Figure 11:
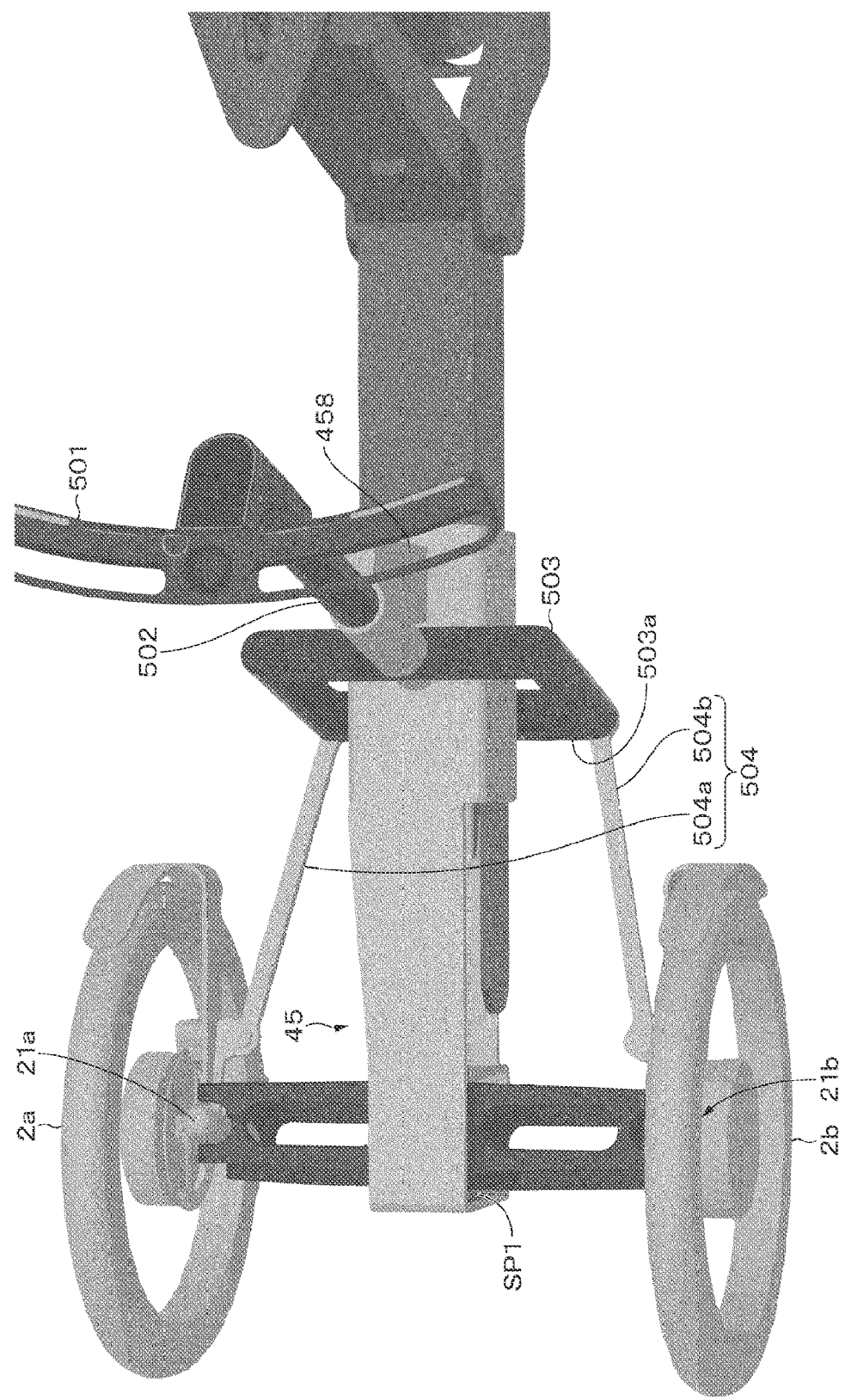
FIG. 11 is a diagram for explaining an example configuration of the handle part according to an embodiment.

As illustrated in FIG. 10, the handle 501 has a straight shape substantially orthogonal to the extension direction (for example, the vertical direction) of the handle shaft 502. The straight shape is does not necessarily mean a perfectly straight shape, and includes shapes that are curved to a certain degree or the like. The direction of the front wheels 2 changes in response to rotating the handle 501 in a suitable direction by a predetermined angle with the center of the handle 501 acting as the center of rotation. In other words, the front wheels 2 are steerable by the handle 501.

A camera 510 is provided at the center of rotation of the handle 501. The camera 510 is provided at the highest position on the vehicle 1, for example. The camera 510 is a hemispherical camera capable of taking wide-angle images, for example. Images acquired by the camera 510 may be still images, moving images, or both. Images taken by the camera 510 are used according to the application. For example, an image taken by the camera 510 is used to perform face recognition to determine whether the user of the vehicle 1 is an authorized user. Additionally, images taken by the camera 510 may be used to detect obstacles positioned in front of the vehicle 1. Furthermore, in a case where an obstacle exists, a safety operation such as automatically applying brakes may be performed.

In the periphery of the right near side of the handle 501, a first speaker 511a and a first tactile presentation part 512a are provided in order from the center of rotation of the handle 501 toward the right end of the handle 501. In the periphery of the left near side of the handle 501, a second speaker 511b and a second tactile presentation part 512b are provided in order from the center of rotation of the handle 501 toward the left end of the handle 501. Note that herein, the side of the handle 501 where the user is positioned is defined as the near side, whereas the opposite side is defined as the far side.

Sounds such as music and alarms are produced from the first and second speakers 511a and 511b. By providing the first and second speakers 511a and 511b in the handle 501, sounds can be produced at a position close to the user.

The first and second tactile presentation parts 512a and 512b include one or multiple vibration devices, for example. By causing the vibration devices included in the first and second tactile presentation parts 512a and 512b to vibrate, various feedback is provided to the user gripping the handle 501. For example, in a case where the user is detected to be dozing off or the like on the basis of an image taken by the camera 510, and the like, the first and second tactile presentation parts 512a and 512b are made to vibrate, thereby alerting the user.

On either side of the handle 501, first and second hollow parts 513a and 513b having an elongated oval shape are provided between the near-side periphery and the far-side periphery of the handle 501, and are configured to be grippable on the far side thereof. The grippable portions are first and second brake parts 514a and 514b, and by having the user grip the first and second brake parts 514a and 514b, the brakes of the vehicle 1 are applied.

Note that the vehicle 1 according to the present embodiment includes a camera 420, which is provided near the top end (near the saddle 407) on the back side of the upright part 405 described above, and which is capable of imaging the area behind the vehicle 1 (see FIG. 10). For example, in the case of detecting that a car is attempting to overtake the vehicle 1 on the basis of an image captured by the camera 420, the first and second tactile presentation parts 512a and 512b can be made to vibrate and thereby encourage the user to pay attention. With a configuration provided with only the camera 510, the area behind the vehicle 1 is obstructed by the presence of the user who acts as the driver of the vehicle 1, and therefore an image cannot be taken, but by providing the camera 420, an image of the area behind the vehicle 1 can be taken. Note that the position of the camera 420 may be changed appropriately insofar as it is possible to take an image of the area behind the vehicle 1.

The handle shaft 502 is inserted into the cylindrical hollow provided in the handle bearing part 458. The end of the handle shaft 502 that is exposed to the outside from the open end on the lower side of the handle bearing part 458 is a rectangular frame 503. The second base part 451 is inserted through the frame 503 with a predetermined clearance.

The frame 503 has a base part 503a positioned on the lower side. One end of the first transmission part 504a is connected on the right side of the base part 503a. The other end of the first transmission part 504a is connected to the front wheel 2a (for example, a shaft 21a connected to the axle of the front wheel 2a). Also, one end of the second transmission part 504b is connected on the left side of the base part 503a. The other end of the second transmission part 504b is connected to the front wheel 2b (for example, a shaft 21b connected to the axle of the front wheel 2b). Through the first and second transmission parts 504a and 504b, force corresponding to the operation of the handle 501 is transmitted to the front wheels 2a and 2b, and the direction of the front wheels 2a and 2b changes appropriately.

Figure 12:
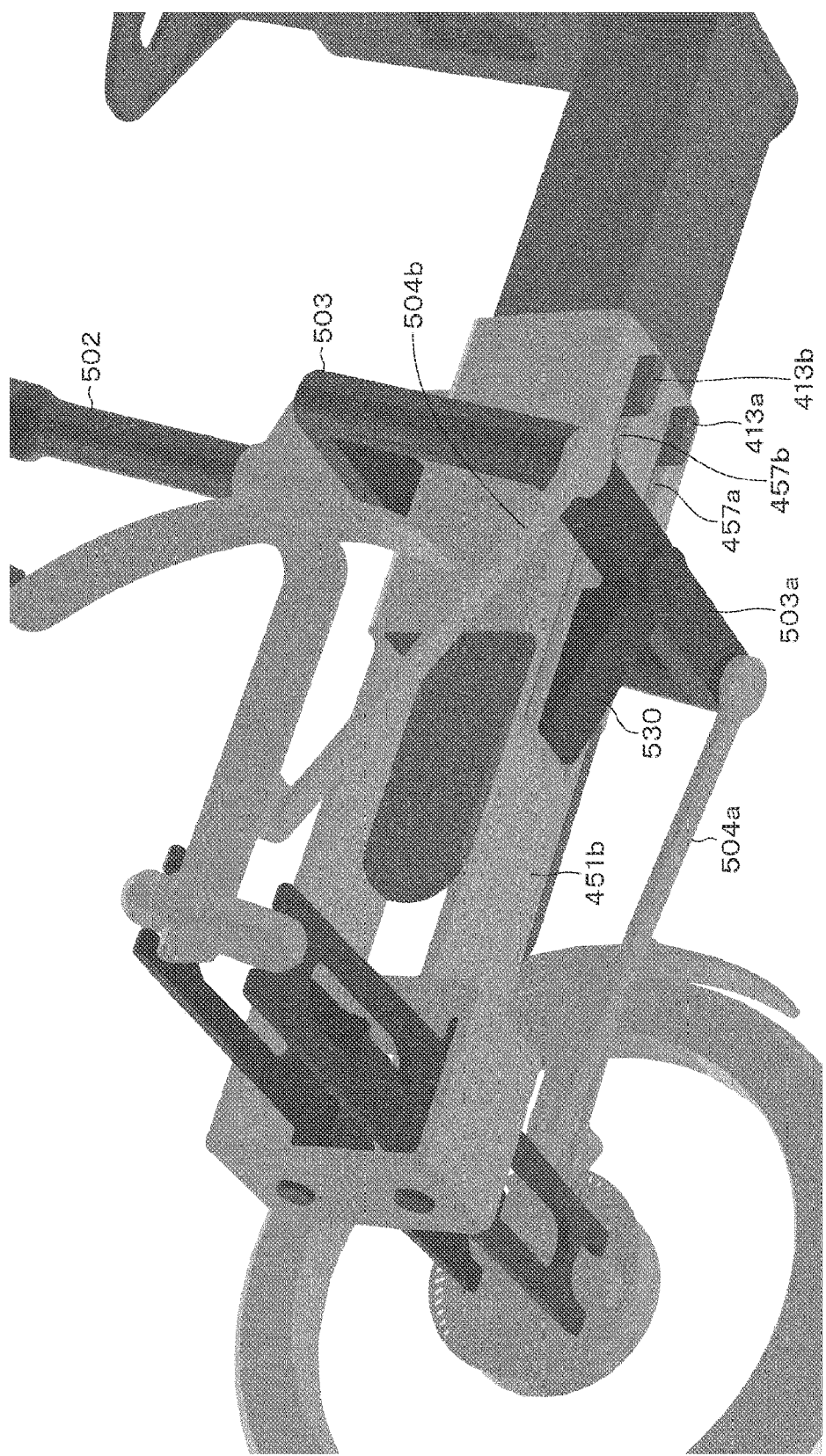
FIG. 12 is a diagram for explaining an example configuration of the handle part according to an embodiment.

Also, as illustrated in FIG. 12, the base part 503a is provided with a linked part 530 that projects forward from near the center of the base part 503a, and acts as a linked member that moves together with the movement of the handle 501. The linked part 530 is wedge-shaped, for example, and a flat principal face thereof abuts the back (bottom) of the bottom plate 451b. Specifically, the flat principal face of the linked part 530 abuts the back of the bottom plate 451b at a position toward the front between the first and second grooves 457a and 457b.

(Carrier)

Next, the carrier 6 will be described. The carrier 6 is shaped like a box that is open on top, for example, and is attached by being placed on top of the top plate 451a. Various loads are stored inside the carrier 6. A child seat may also be provided inside the carrier 6 to allow a child to be seated in the carrier 6. The carrier 6 according to the present embodiment is provided such that the center of gravity of the carrier 6 is disposed between the center of the rotational axis of the front wheels 2 and the handle 501.

(Link Mechanism)

Figure 9:
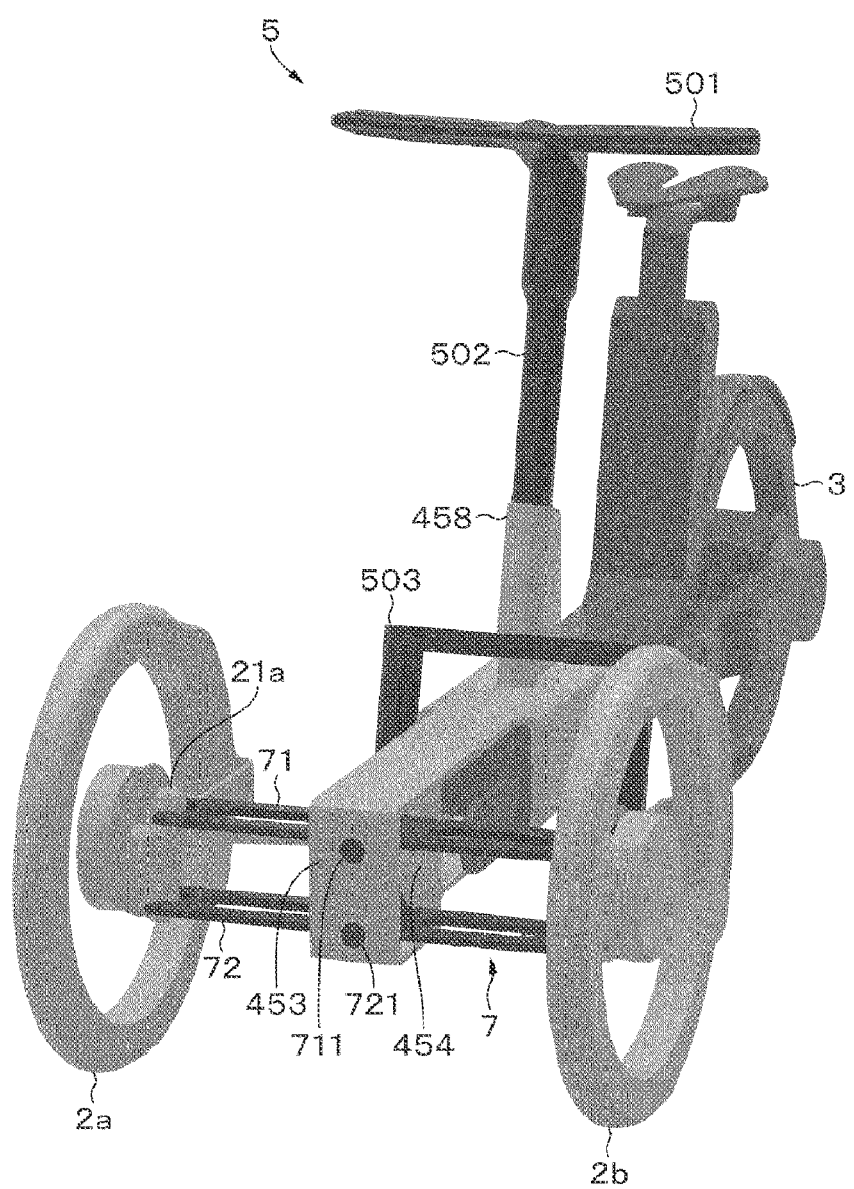
FIG. 9 is a diagram for explaining an example configuration of a handle part and a link mechanism according to an embodiment.
Figure 13:
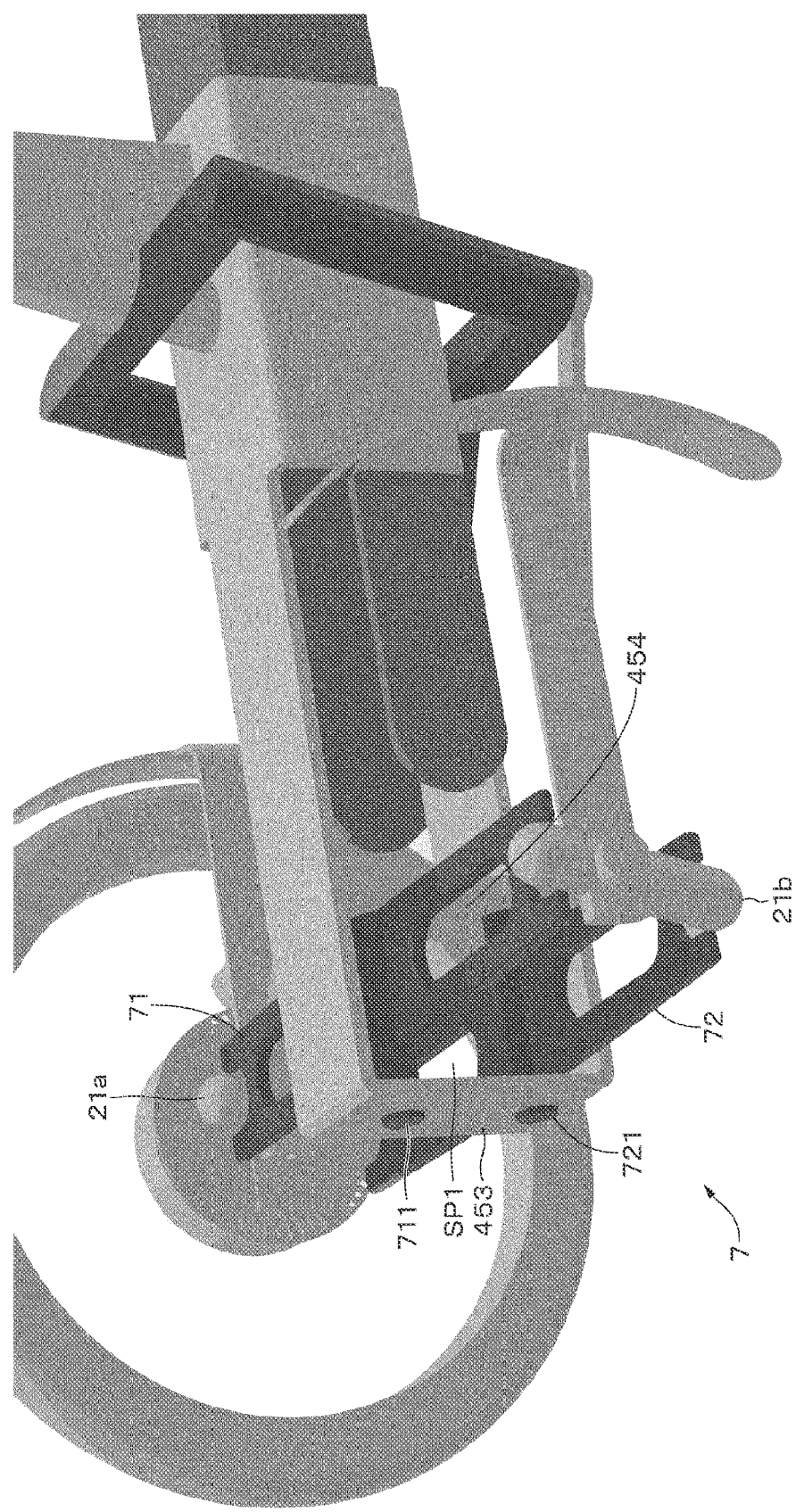
FIG. 13 is a diagram for explaining an example configuration of the link mechanism according to an embodiment.

Next, FIGS. 9 and 13 will be referenced to describe the link mechanism 7. The link mechanism 7 has first and second connecting arms 71 and 72 disposed substantially parallel to each other in the vertical direction. The first and second connecting arms 71 and 72 are shaped like thin plates with appropriate holes formed therein.

One end of the first connecting arm 71 positioned on the upper side is connected to the upper side of the shaft 21a, while the other end is connected to the upper side of the shaft 21*b*. In this way, the first connecting arm 71 is connected as a bridge between the front wheels 2*a* and 2*b*. The approximate center of the first connecting arm 71 is disposed inside the space SP1. The first connecting arm 71 has a cylindrical shaft 711 that extends in the longitudinal direction near the center of the first connecting arm 71. A front end of the shaft 711 is attached to a hole formed in the upper side of the first connecting plate 453, while a rear end of the shaft 711 is attached to a hole formed in the upper side of the second connecting plate 454.

On the other hand, one end of the second connecting arm 72 positioned on the lower side is connected to the lower side of the shaft 21*a*, while the other end is connected to the lower side of the shaft 21*b*. In this way, the second connecting arm 72 is connected as a bridge between the front wheels 2*a* and 2*b*. The approximate center of the second connecting arm 72 is disposed inside the space SP1. The second connecting arm 72 has a cylindrical shaft 721 that extends in the longitudinal direction near the center of the second connecting arm 72. A front end of the shaft 721 is attached to a hole formed in the lower side of the first connecting plate 453, while a rear end of the shaft 721 is attached to a hole formed in the lower side of the second connecting plate 454. Note that the distance between the first and second connecting arms 71 and 72 (the vertical distance) is set such that the first and second plate-shaped parts 410*a* and 410*b* are insertable in between with a slight clearance.

[Example Operations by Vehicle]

(Example Expansion and Contraction Operations of Frame Part)

Next, example operations by the vehicle 1 will be described. For easier understanding, the expansion and contraction operations of the frame part 4 will be described first. In the present embodiment, the first frame part 40 is slidable in the longitudinal direction. For example, if the first frame part 40 is moved forward while holding the portion near the saddle 407, the first base part 402 of the first frame part 40 slides forward inside the second base part 451 of the second frame part 45. Conversely, if the first frame part 40 is moved backward while holding the portion near the saddle 407, the first base part 402 of the first frame part 40 slides backward inside the second base part 451 of the second frame part 45. Note that, although not illustrated in the drawings, a movement mechanism such as a rail for smoothly sliding the first frame part 40 is appropriately provided in the second base part 451 or the like. Also, the first frame part 40 may be moved manually, or the movement may be performed automatically by using power from the battery included in the vehicle 1. Additionally, the movement of the first frame part 40 may also be remotely controlled.

(Example Operations when Using Vehicle)

When using the vehicle 1, the first frame part 40 is moved backward to the first position in which the length of the frame part 4 is maximized. In such a first position, a lock mechanism (not illustrated) is engaged either manually or automatically, and the movement of the first frame part 40 in the longitudinal direction is restricted. The vehicle 1 is used in this state. In other words, the pedaling force generated by the user pushing the pedals 401*a* and 401*b* and the auxiliary driving force generated by the motor cause the rear wheel 3 to rotate, and the vehicle 1 moves forward.

When turning (steering) while using the vehicle 1, the user operates the handle 501. For example, when making a right turn, the user rotates the handle 501 to pull the right side of the handle 501 closer and push the left side of the handle 501 farther away. Also, when making a left turn, the user rotates the handle 501 to push the right side of the handle 501 farther way and pull the left side of the handle 501 closer. The operation of the handle 501 is transmitted to the frame 503 through the handle shaft 502, and the frame 503 also rotates together with the rotation of the handle 501. The rotation of the frame 503 is transmitted to each of the front wheels 2*a* and 2*b* through the first and second transmission parts 504*a* and 504*b*, and the direction of the front wheels 2*a* and 2*b* changes.

Note that the linked part 530 also rotates together with the rotation of the handle 501, in a direction corresponding to the rotation of the handle 501. In the state where the first frame part 40 is set to the first position, the first and second projecting parts 413*a* and 413*b* are positioned on the rear-end side of the first and second grooves 457*a* and 457*b*, respectively, and the movement of the linked part 530 is not restricted.

Figure 14:
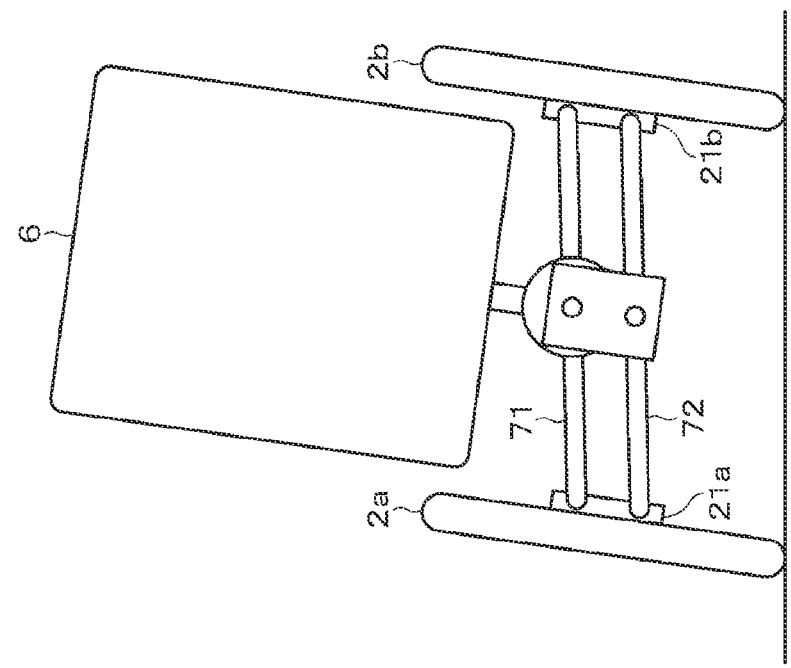
FIGS. 14A and 14B are diagrams for explaining an example of operations by the link mechanism according to an embodiment.
Figure 14:
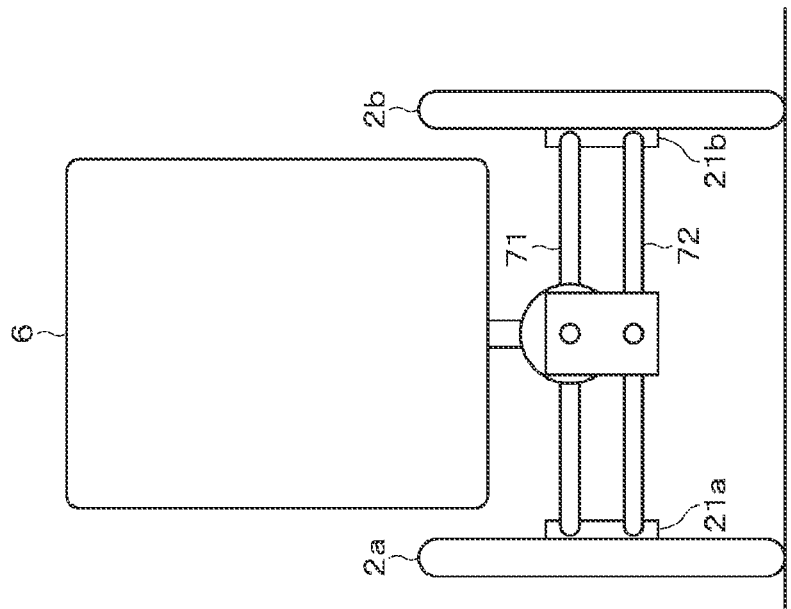

Also, when going around a curve, the link mechanism 7 operates. FIG. 14A illustrates the link mechanism 7 when the vehicle 1 is stopped. FIG. 14B is a diagram schematically illustrating the operation of the link mechanism 7 when the vehicle 1 goes around a curve. When going around a curve, the link mechanism 7 tilts to maintain a parallelogram formed by the first and second connecting arms 71 and 72 and the shafts 21*a* and 21*b*. The tilting of the link mechanism 7 allows the front wheels 2*a* and 2*b* to tilt in parallel. Through such operation by the link mechanism 7, it is possible to keep the user from falling due to the centrifugal force when the vehicle 1 goes around a curve.

(Example Operations when not Using Vehicle)

When not using the vehicle 1, the vehicle 1 is parked in a compact state in which the frame part 4 is shortened, or in other words, the full length of the vehicle 1 is shortened. FIGS. 14A, 14B, 15, 16, 17, and 18 will be referenced to explain an example of the arrangement of each structural element in the second position in which movement of the front wheels 2 is restricted.

When the user has finished using the vehicle 1, the user performs an action such as disengaging the lock mechanism not illustrated to put the first frame part 40 in a movable state. Thereafter, the first frame part 40 is slid forward either manually or automatically. For example, the first and second plate-shaped parts 410*a* and 410*b* included in the first frame part 40 slide forward along the inner sides of the right-side plate 451*c* and the left-side plate 451*d* of the second base part 451. Next, the first base part 402 of the first frame part 40 slides inside the second base part 451, and the first frame part slides farther forward.

Figure 15:
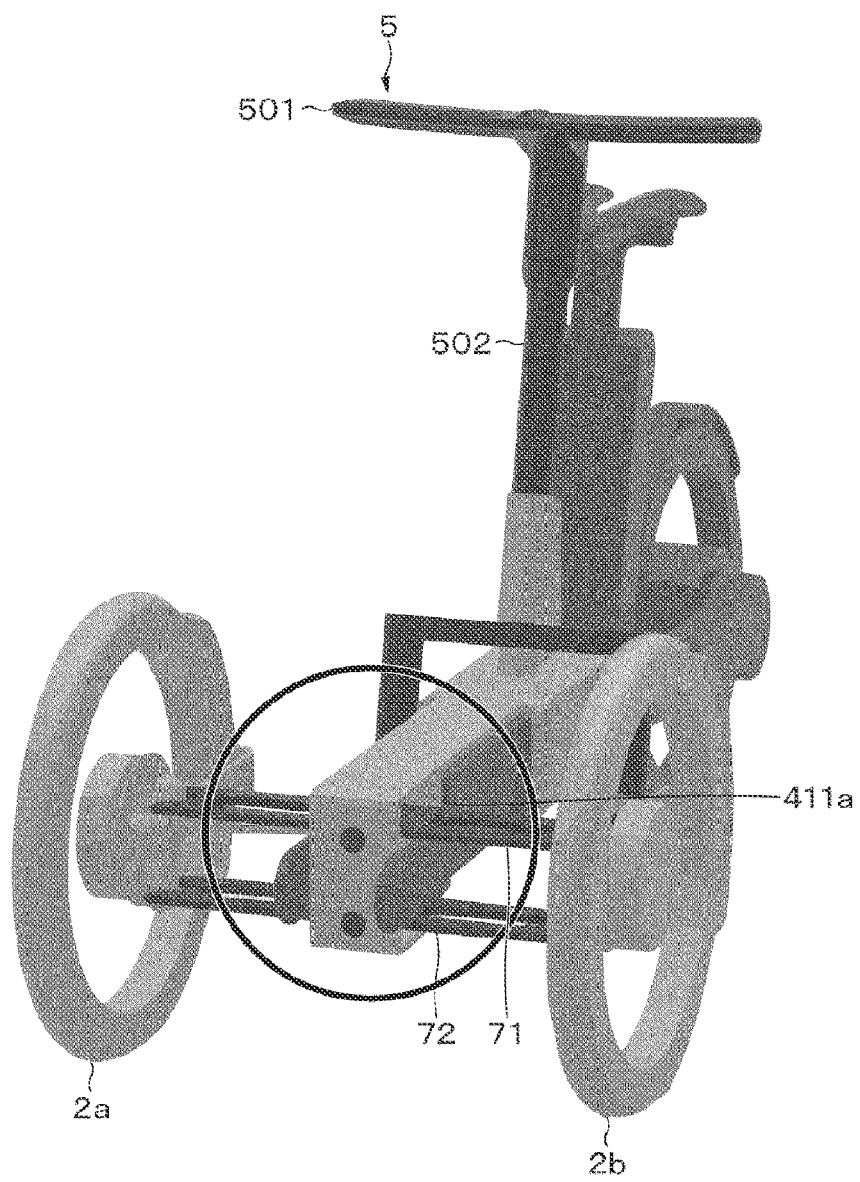
FIG. 15 is a diagram for explaining an example of the arrangement of each structural element in the second position in which movement of the front wheels is restricted.
Figure 16:
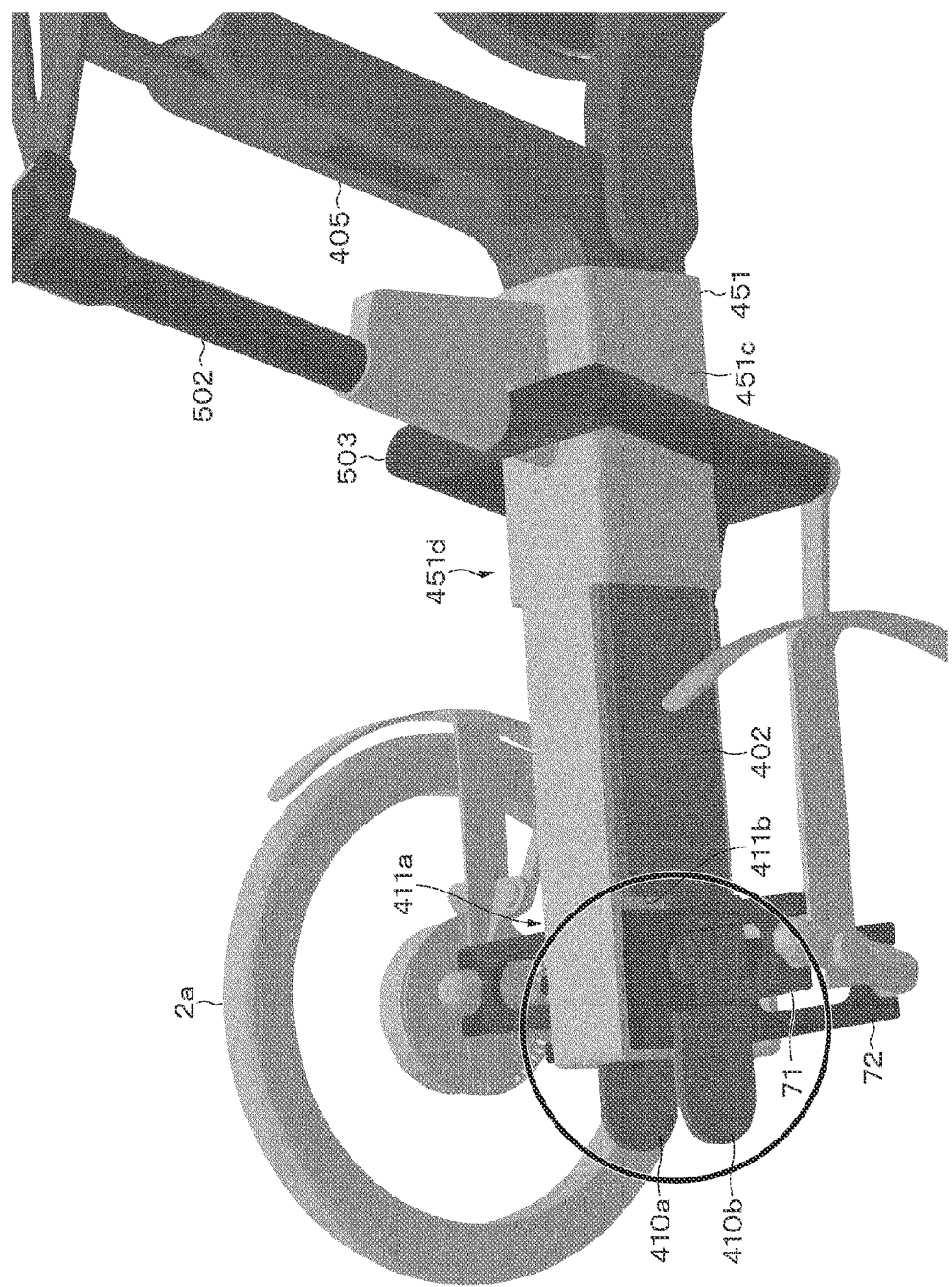
FIG. 16 is a diagram for explaining an example of the arrangement of each structural element in the second position in which movement of the front wheels is restricted.
Figure 17:
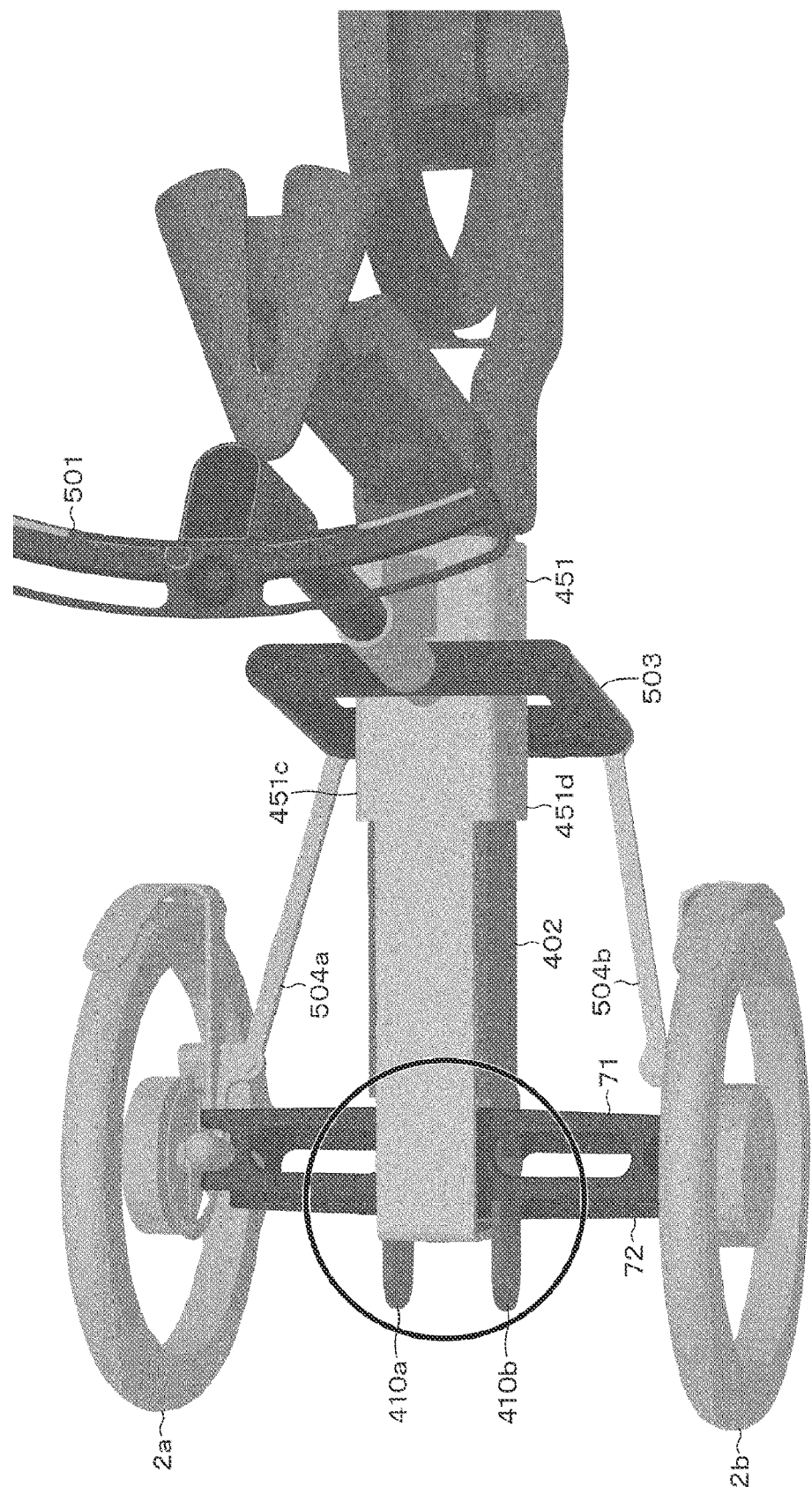
FIG. 17 is a diagram for explaining an example of the arrangement of each structural element in the second position in which movement of the front wheels is restricted.
Figure 18:
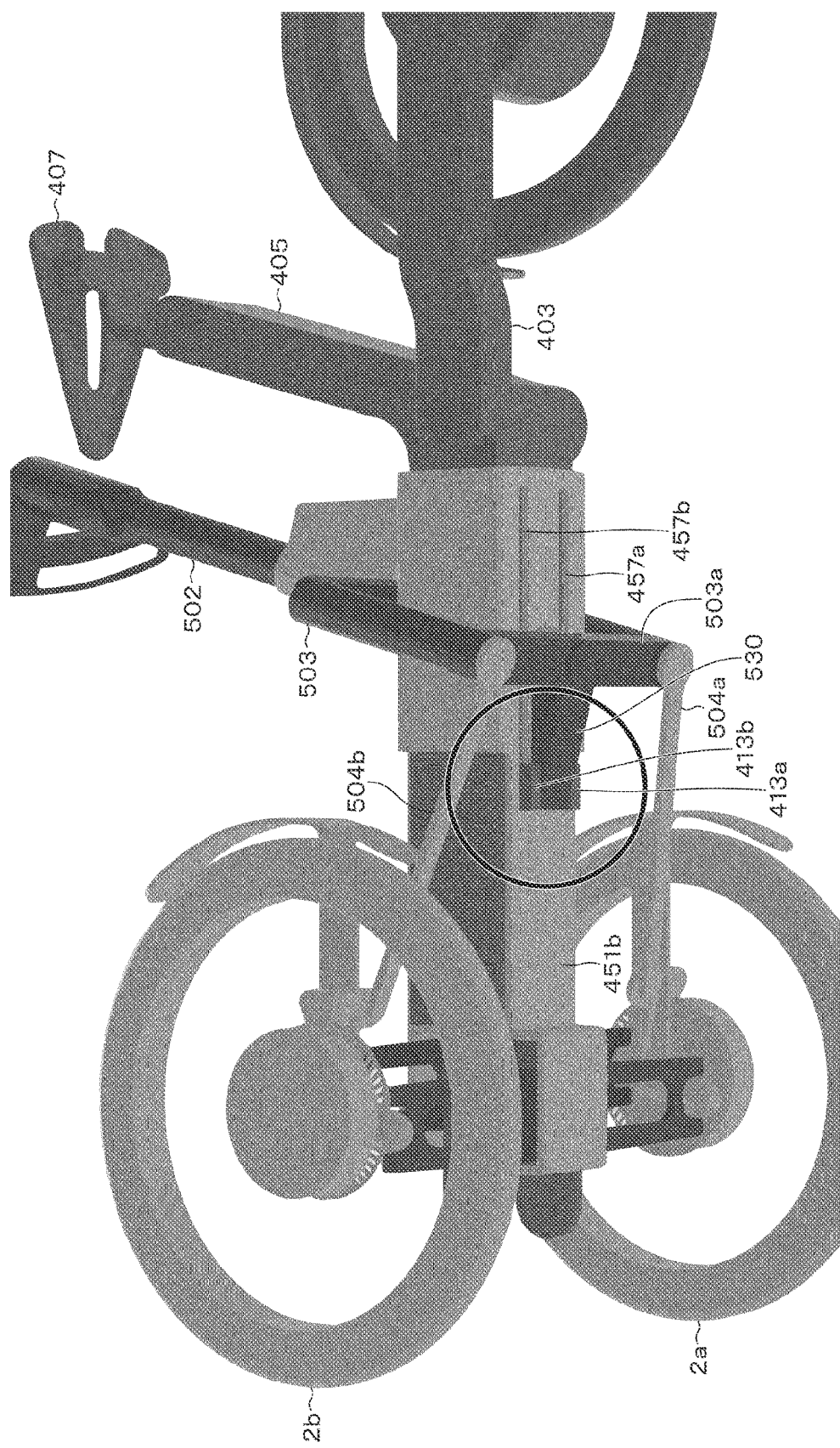
FIG. 18 is a diagram for explaining an example of the arrangement of each structural element in the second position in which movement of the front wheels is restricted.

By having the first frame part 40 slide farther, the first and second plate-shaped parts 410*a* and 410*b* are inserted between the first and second connecting arms 71 and 72 (see the circled portions in FIGS. 15, 16, and 17). Additionally, as the first frame part 40 slides farther, the first and second steps 411*a* and 411*b* of the first frame part 40 abut the first connecting arm 71, and the forward sliding of the first frame part 40 is restricted. In the present embodiment, this state is treated as an example of the second position. Backward sliding of the first frame part 40 may also be restricted by engaging a lock mechanism not illustrated at the second position.

In such a second position, the movement of the front wheels 2 is restricted. The tilting of the link mechanism 7 is included in the movement of the front wheels 2. In other words, in the second position, the first and second plate-shaped parts 410*a* and 410*b* are inserted between the first and second connecting arms 71 and 72 of the link mechanism 7. Consequently, the tilting movement of the first and second connecting arms 71 and 72 is restricted by the first and second plate-shaped parts 410a and 410b. In this way, the first and second plate-shaped parts 410a and 410b function as restricting members that restrict the operation of the link mechanism 7 in a predetermined position (in this example, in the position between the first and second connecting arms 71 and 72).

Figure 19:
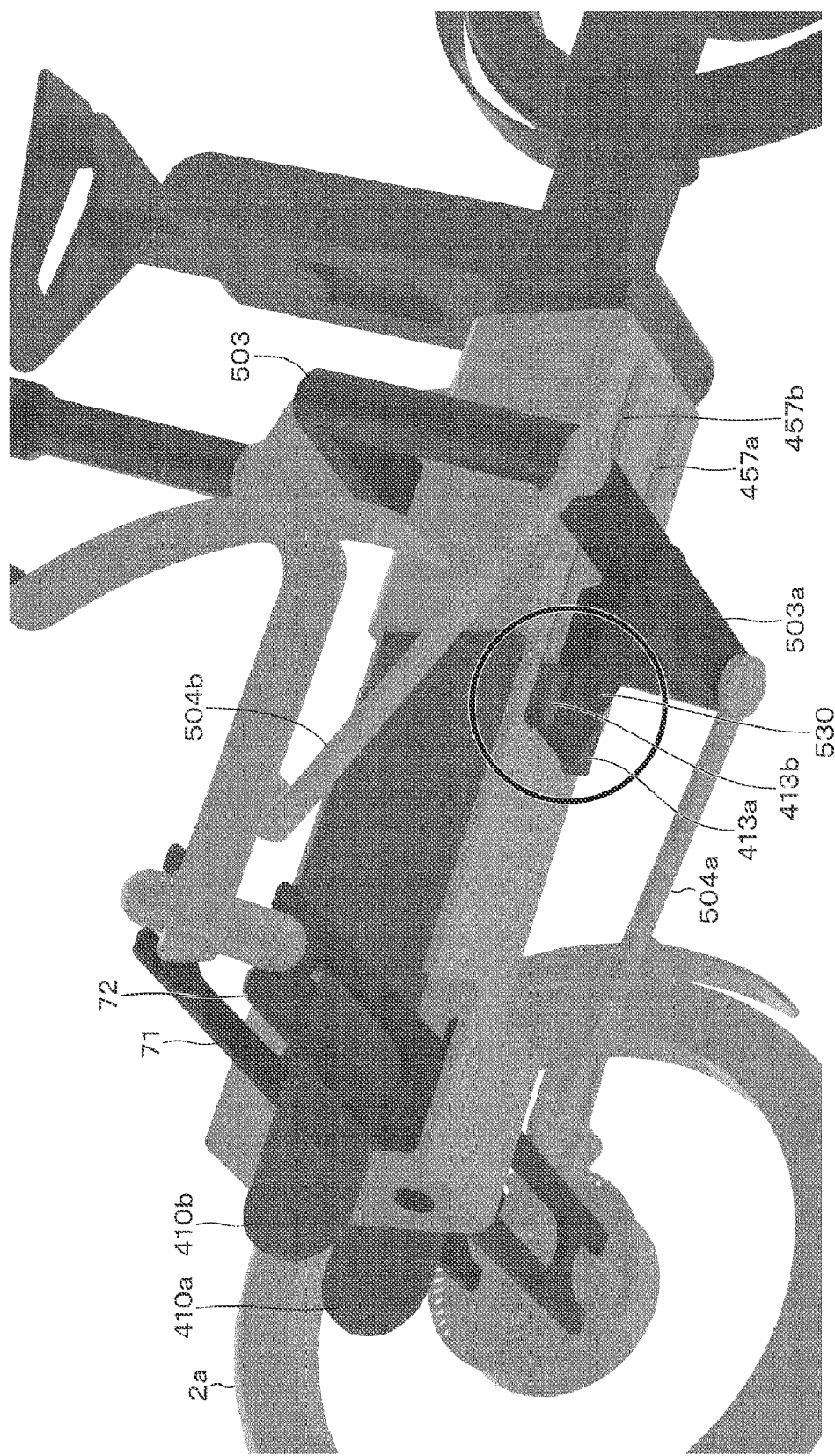
FIG. 19 is a diagram for explaining an example of the arrangement of each structural element in the second position in which movement of the front wheels is restricted.

Additionally, in association with the forward sliding movement of the first frame part 40, the first and second projecting parts 413a and 413b provided on the back of the bottom plate 451b slide forward through the first and second grooves 457a and 457b. Thereafter, in the second position, as illustrated in the circled portions of FIGS. 18 and 19, the first and second projecting parts 413a and 413b slide to the front ends of the first and second grooves 457a and 457b and become positioned on either side of the linked part 530. With this arrangement, the movement of the linked part 530 is restricted by the first and second projecting parts 413a and 413b. In this way, the first and second projecting parts 413a and 413b function as an engaging member that restricts the movement of the linked part 530 in a predetermined position. By restricting the movement of the linked part 530, the rotational operation (steering) of the handle 501 is restricted, and the movement of the front wheels 2 associated with the operation of the handle 501 is restricted, or in other words, the steering angle is fixed.

In this way, by setting the frame part 4 to the second position when not using the vehicle 1, such as when parking, the full length of the vehicle 1 can be shortened, and the vehicle 1 can be parked in a compact state. Additionally, the full length of the vehicle 1 can be shortened while also restricting the movement of the front wheels 2. Consequently, for example, when a heavy load or a child is placed in the carrier 6, it is possible to keep the load or the child placed in the carrier 6 from falling due to a loss of stability of the carrier 6 caused by the vehicle 1 tilting as a whole or the handle 501 moving and turning the vehicle 1.

[Example of Parked State]

Figure 20:
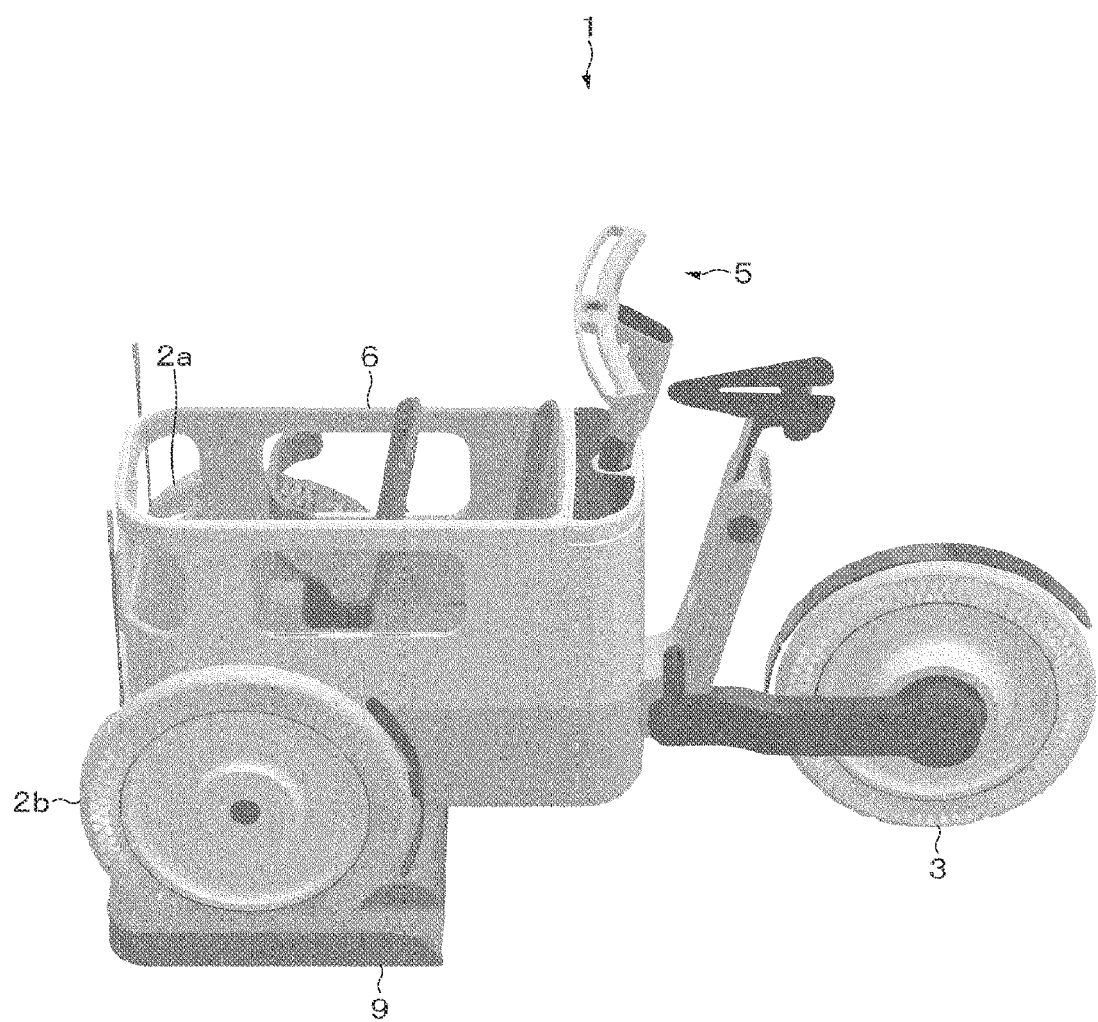
FIG. 20 is a diagram illustrating an example of a parked state of the vehicle.
Figure 21:
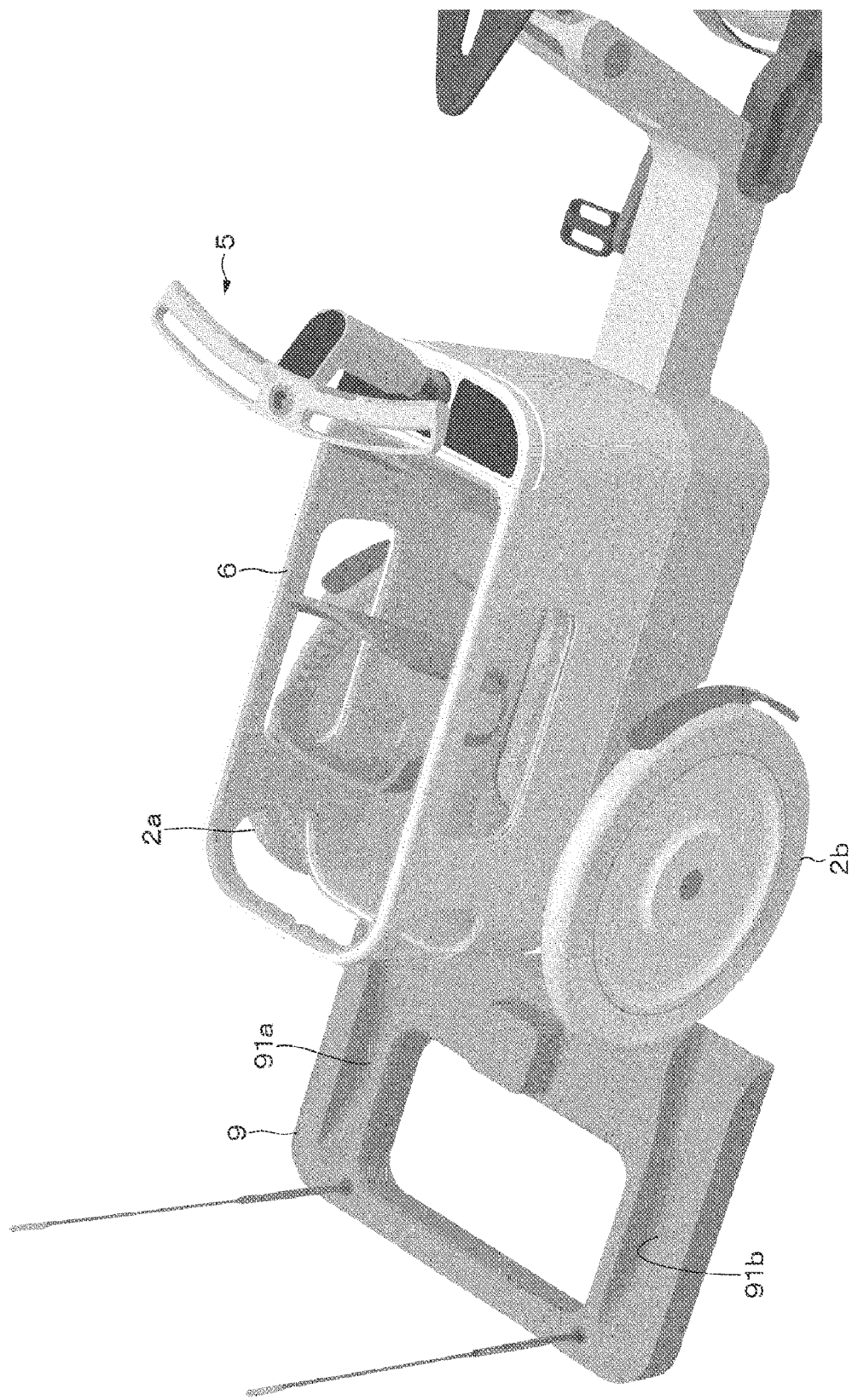
FIG. 21 is a diagram for explaining an example configuration of a parking dock according to an embodiment.

Next, an example of the parked state of the vehicle 1 will be described. FIG. 20 is a diagram illustrating an example of the parked state of the vehicle 1. The vehicle 1 is parked in a state with the front wheels 2a and 2b placed on a parking dock 9, for example. FIG. 21 is a diagram for explaining an example configuration of the parking dock 9. As illustrated in FIG. 21, the parking dock 9 has a shape whose outline forms a rectangle overall, and has a groove 91a in which the front wheel 2a is stored and a groove 91b in which the front wheel 2b is stored. The grooves 91a and 91b are open on one side to allow the front wheels 2a and 2b to be moved and stored in the grooves 91a and 91b. The depth of the groove 91a gradually increases from the open side, becoming deepest near the center of the groove 91a. The groove 91b is similar, with the depth of the groove 91b gradually increasing from the open side and becoming deepest near the center of the groove 91b. The front wheels 2a and 2b are stored in a stable state in the deepest portions of the grooves 91a and 91b.

Note that the vehicle 1 may be parked in the parking dock 9 manually by the user, or automatically. In the case of automatic parking, the vehicle 1 may recognize the parking dock 9 with the camera 510 and park autonomously. Also, the vehicle 1 and the parking dock 9 may communicate with each other wirelessly such that the vehicle 1 recognizes the location of the parking dock 9, and the vehicle 1 may be guided to the parking dock 9.

In addition, the battery included in the vehicle 1 may be charged by contactless charging while the vehicle 1 is parked in the parking dock 9. Also, a device that charges the battery may be provided near the parking dock 9.

[Effects]

According to the embodiment described above, the following effects are obtained, for example.

When the vehicle is not being used, the full length of the vehicle can be put into compact state. Additionally, the full length of the vehicle can be shortened while also restricting the movement of the front wheels. Consequently, components such as a lock mechanism for restricting the movement of the front wheels or a stand for maintaining the stability of the vehicle may be unnecessary, and furthermore, the user does not need to operate such components. Also, by restricting the movement of the front wheels, the stability of the vehicle can be maintained. Consequently, it is possible to prevent the load or the like or the vehicle from falling out of the carrier or from falling down, due to instability of the vehicle when placing a load or the like into the carrier. Also, because the movement of the front wheels is restricted, an anti-theft effect is also obtained.

In the present embodiment, the carrier is provided such that the center of gravity of the carrier is disposed between the center of the rotational axis of the front wheels and the handle. According to such a configuration, it is possible to keep the vehicle from tilting when the brakes are applied, and prevent the user from flying forward when the brakes are applied. Also, it is possible to minimize instability in the attitude of the vehicle, such as the entire vehicle tilting when a load or a child is placed into the carrier.

In the present embodiment, a frame is provided on the other end of the handle shaft (the side opposite from the side where the handle is connected). By providing the frame, the designability of the vehicle can be improved.

[Design of Vehicle]

(Design of First Vehicle)

Figure 23:
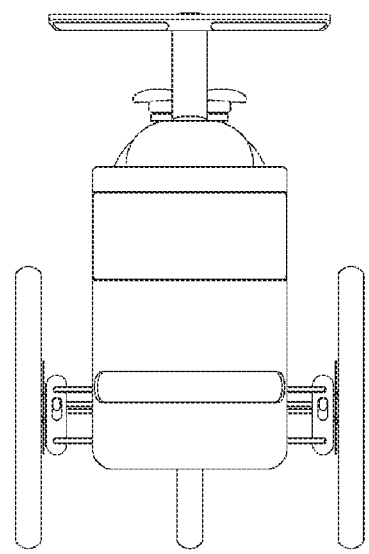
FIG. 23 is a front view of a first vehicle in a state in which the frame of the first vehicle is maximally expanded in the forward direction of the first vehicle.
Figure 24:
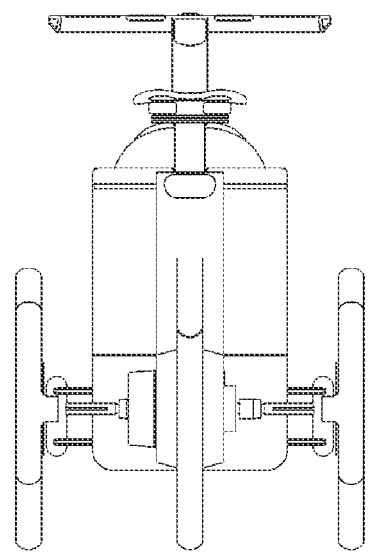
FIG. 24 is a rear view of the first vehicle in a state in which the frame of the first vehicle is maximally expanded in the forward direction of the first vehicle.
Figure 25:
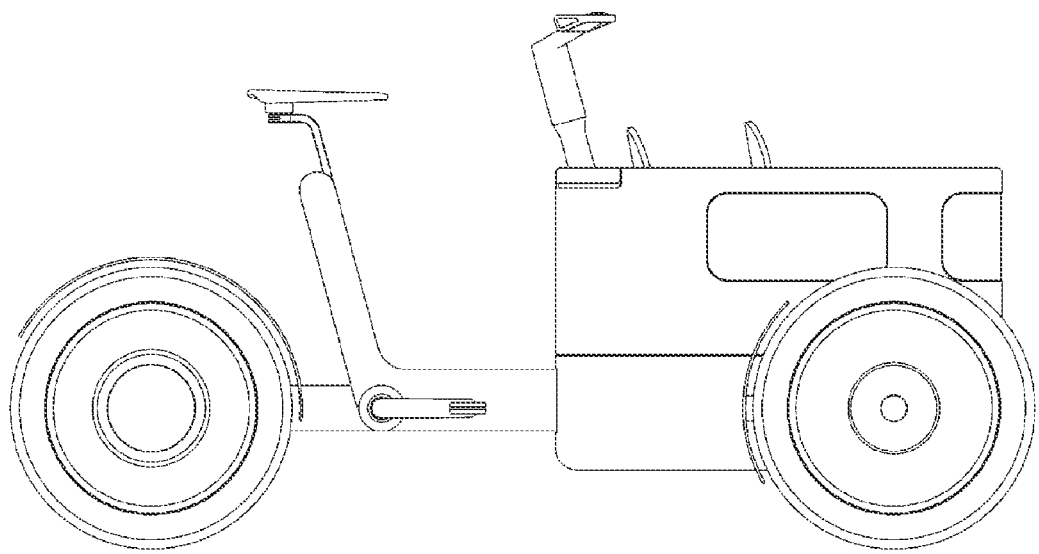
FIG. 25 is a left side view of the first vehicle in a state in which the frame of the first vehicle is maximally expanded in the forward direction of the first vehicle.
Figure 26:
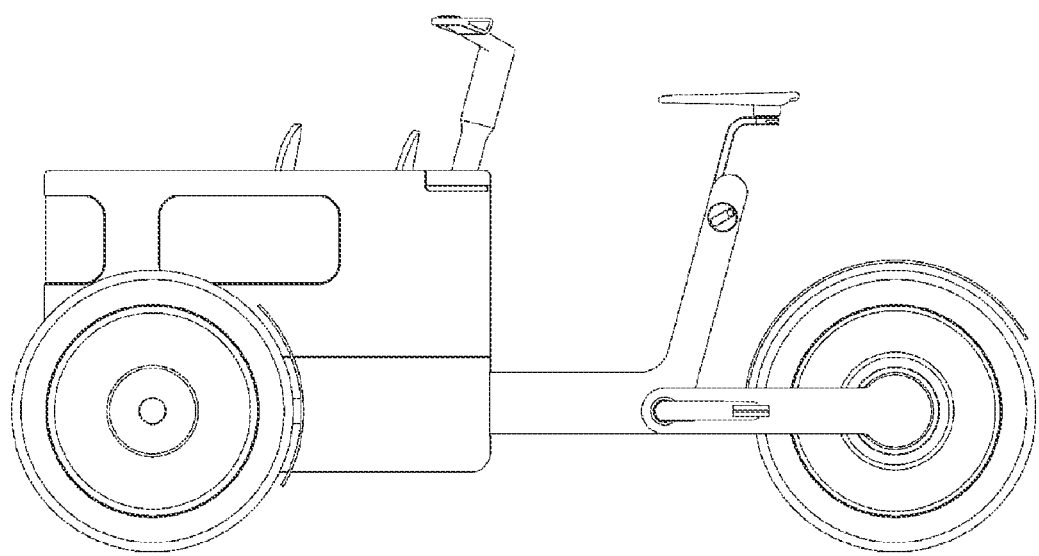
FIG. 26 is a right side view of the first vehicle in a state in which the frame of the first vehicle is maximally expanded in the forward direction of the first vehicle.
Figure 27:
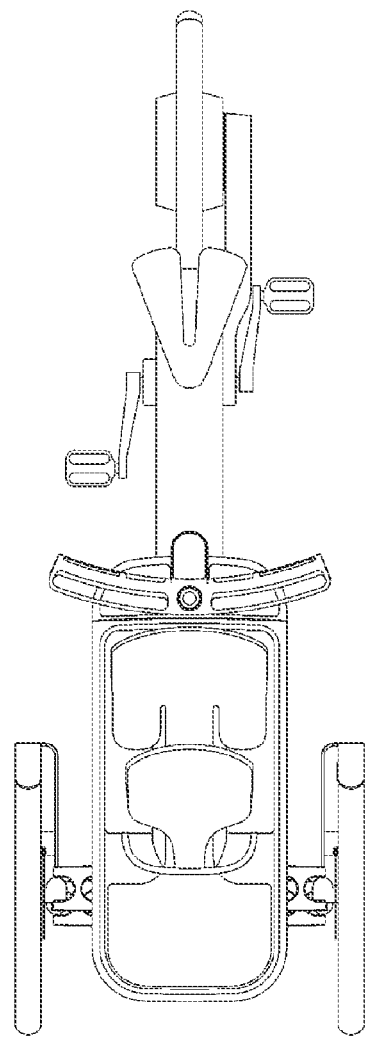
FIG. 27 is a top view of the first vehicle in a state in which the frame of the first vehicle is maximally expanded in the forward direction of the first vehicle.
Figure 28:
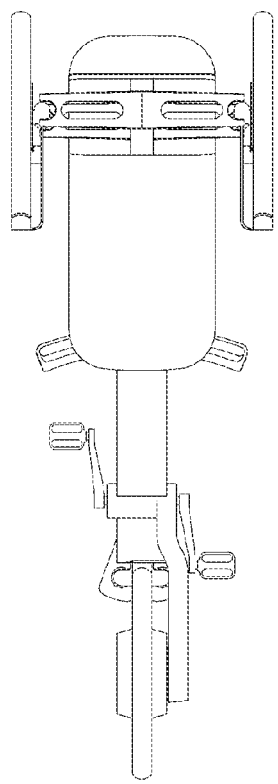
FIG. 28 is a bottom view of the first vehicle in a state in which the frame of the first vehicle is maximally expanded in the forward direction of the first vehicle.
Figure 29:
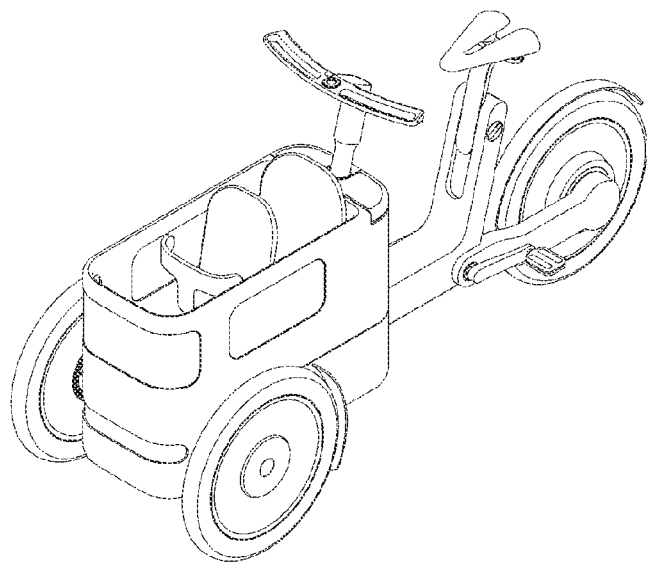
FIG. 29 is a perspective view of the first vehicle in a state in which the frame of the first vehicle is maximally expanded in the forward direction of the first vehicle.

The design of the vehicle will be described. FIG. 23 is a front view of a first vehicle (a vehicle whose principal shape is the same as the vehicle according to the embodiment). Also, the frame of the first vehicle is maximally expanded in the forward direction of the first vehicle (FIGS. 24 to 29 described hereinafter are similar). FIG. 24 is a rear view of the first vehicle. FIG. 25 is a left side view of the first vehicle. FIG. 26 is a right side view of the first vehicle. FIG. 27 is a top view of the first vehicle. FIG. 28 is a bottom view of the first vehicle. FIG. 29 is a perspective view of the first vehicle.

Figure 30:
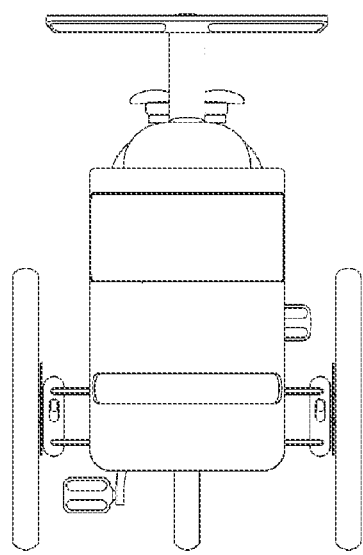
FIG. 30 is a front view of the first vehicle in a state in which the frame of the first vehicle is maximally contracted in the forward direction of the first vehicle.
Figure 31:
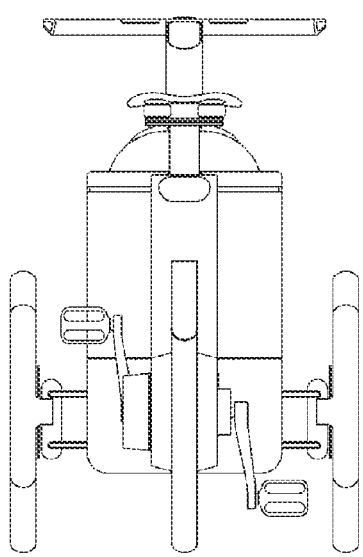
FIG. 31 is a rear view of the first vehicle in a state in which the frame of the first vehicle is maximally contracted in the forward direction of the first vehicle.
Figure 32:
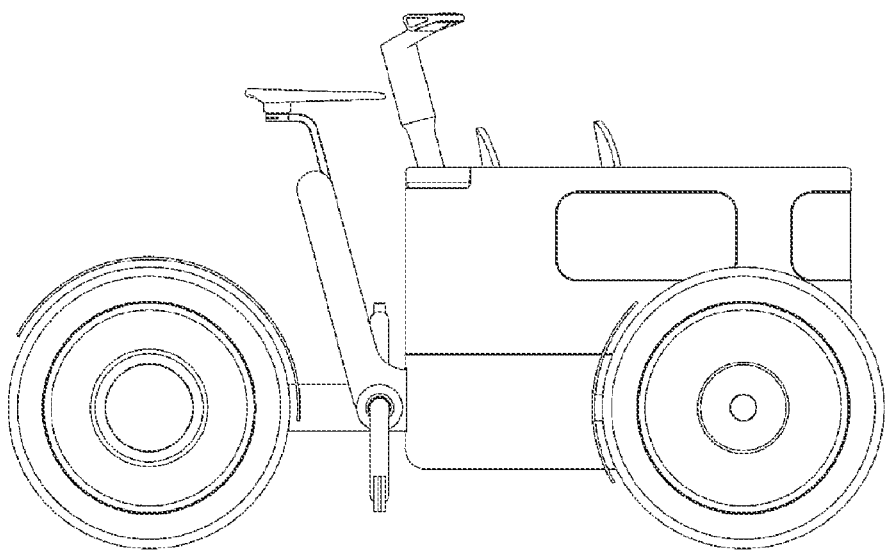
FIG. 32 is a left side view of the first vehicle in a state in which the frame of the first vehicle is maximally contracted in the forward direction of the first vehicle.
Figure 33:
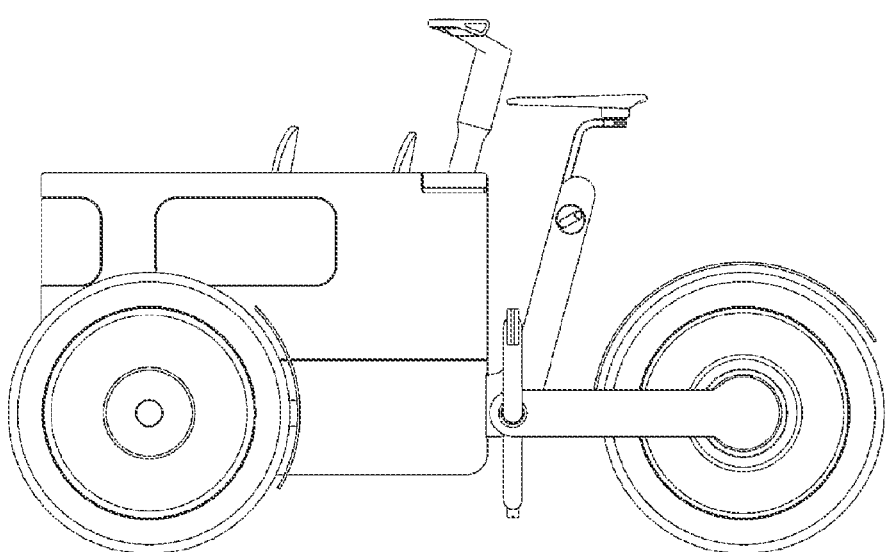
FIG. 33 is a right side view of the first vehicle in a state in which the frame of the first vehicle is maximally contracted in the forward direction of the first vehicle.
Figure 34:
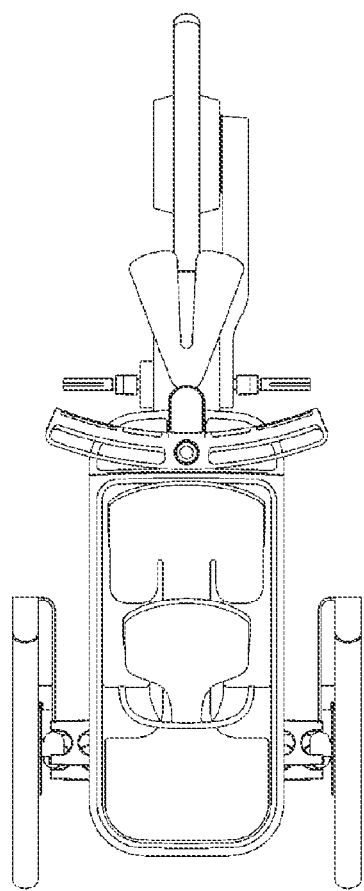
FIG. 34 is a top view of the first vehicle in a state in which the frame of the first vehicle is maximally contracted in the forward direction of the first vehicle.
Figure 35:
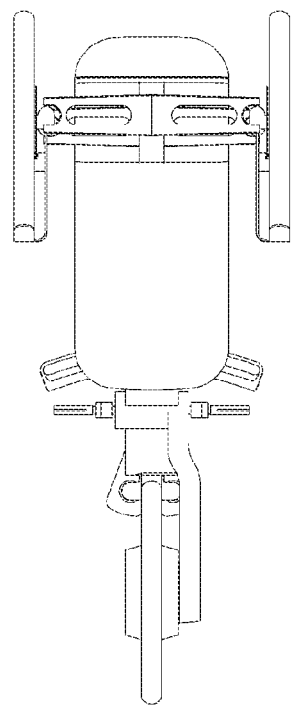
FIG. 35 is a bottom view of the first vehicle in a state in which the frame of the first vehicle is maximally contracted in the forward direction of the first vehicle.
Figure 36:
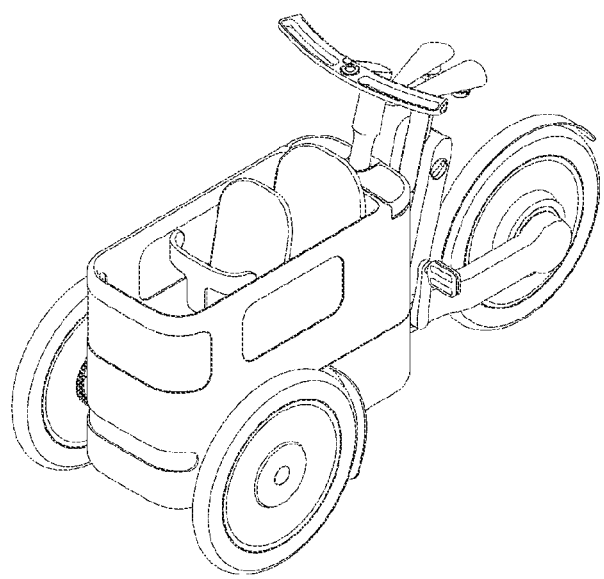
FIG. 36 is a perspective view of the first vehicle in a state in which the frame of the first vehicle is maximally contracted in the forward direction of the first vehicle.

FIG. 30 is a front view of a first vehicle. Also, the frame of the vehicle is maximally contracted in the forward direction of the vehicle (FIGS. 31 to 36 described hereinafter are similar). FIG. 31 is a rear view of the first vehicle. FIG. 32 is a left side view of the first vehicle. FIG. 33 is a right side view of the first vehicle. FIG. 34 is a top view of the first vehicle. FIG. 35 is a bottom view of the first vehicle. FIG. 36 is a perspective view of the first vehicle. When the frame is shortened, the crank is positioned vertically.

Figure 37:
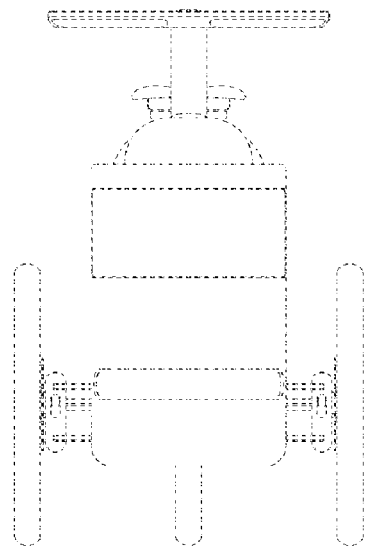
FIG. 37 is a front view of a first vehicle in a state in which the frame of the first vehicle is maximally expanded in the forward direction of the first vehicle.

FIG. 37 is a front view of the first vehicle. Note that in FIG. 37, with respect to the illustration of the partial design, the portion represented by solid lines is under application for design registration as a partial design. The chain line indicates the boundary between the portion under application for design registration as a partial design and the portion that is not, and is not part of the design. FIGS. 38 to 68 are similar.

Figure 38:
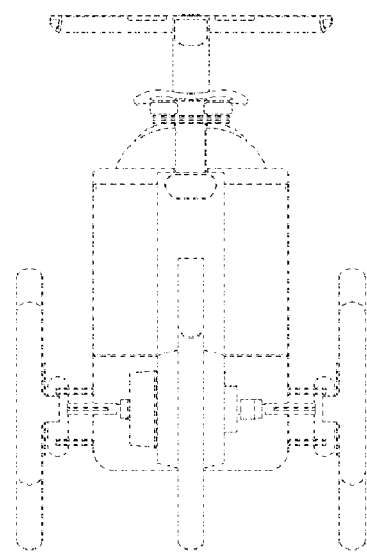
FIG. 38 is a rear view of the first vehicle in a state in which the frame of the first vehicle is maximally expanded in the forward direction of the first vehicle.
Figure 39:
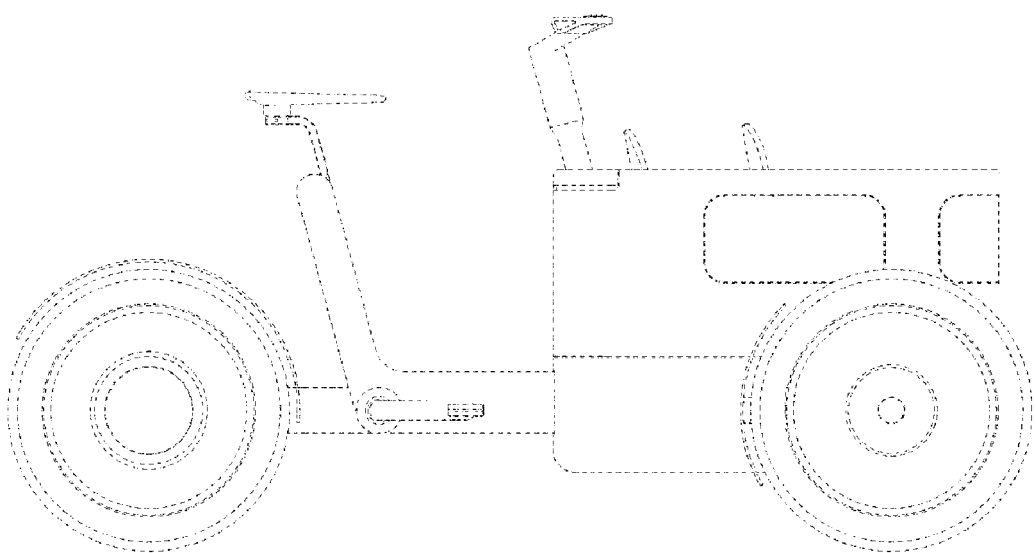
FIG. 39 is a left side view of the first vehicle in a state in which the frame of the first vehicle is maximally expanded in the forward direction of the first vehicle.
Figure 40:
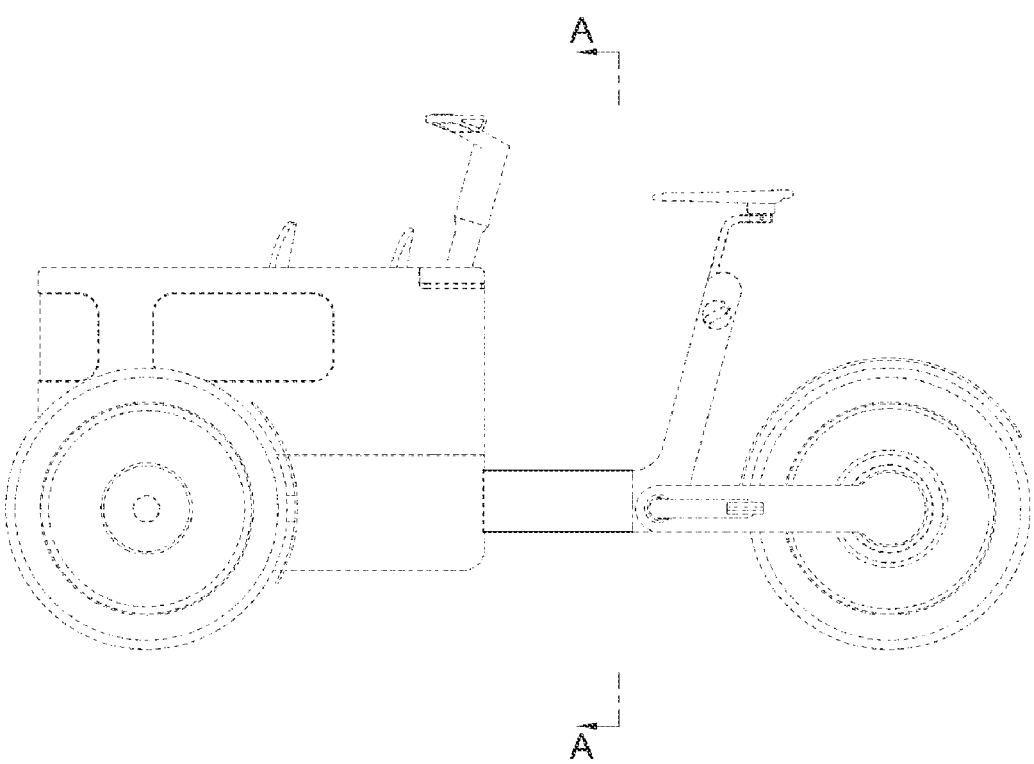
FIG. 40 is a right side view of the first vehicle in a state in which the frame of the first vehicle is maximally expanded in the forward direction of the first vehicle.
Figure 41:
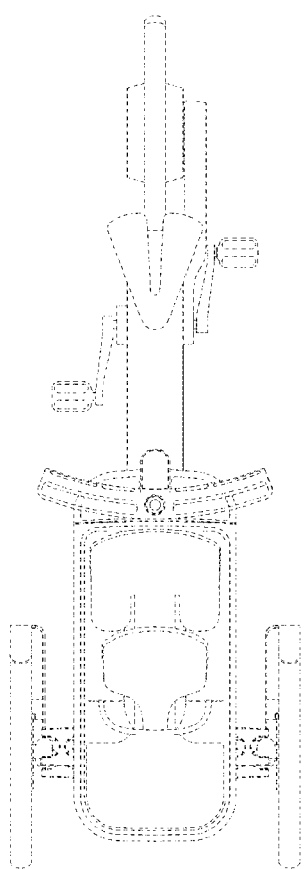
FIG. 41 is a top view of the first vehicle in a state in which the frame of the first vehicle is maximally expanded in the forward direction of the first vehicle.
Figure 42:
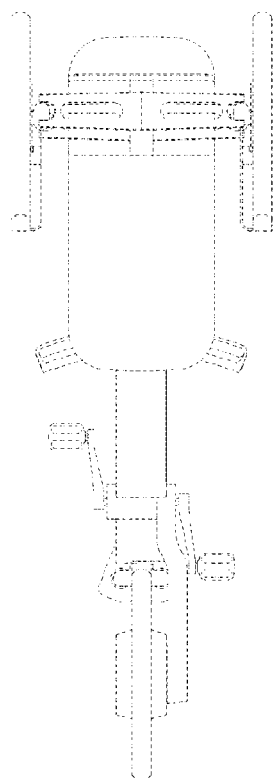
FIG. 42 is a bottom view of the first vehicle in a state in which the frame of the first vehicle is maximally expanded in the forward direction of the first vehicle.
Figure 43:
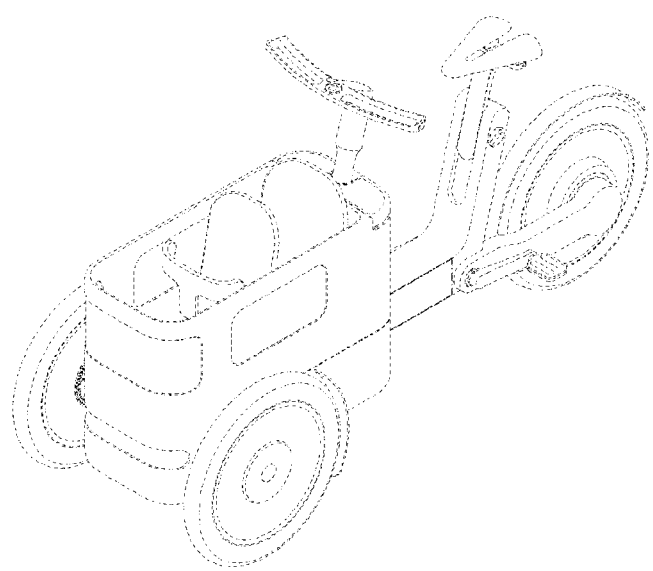
FIG. 43 is a perspective view of the first vehicle in a state in which the frame of the first vehicle is maximally expanded in the forward direction of the first vehicle.
Figure 44:
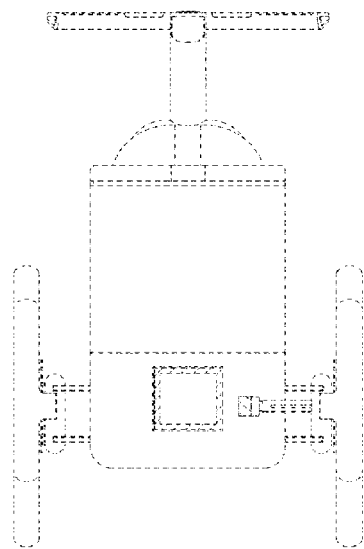
FIG. 44 is a cross-section view of the first vehicle taken along the line A-A illustrated in FIG. 40.

FIG. 37 is a front view of a first vehicle in a state in which the frame of the first vehicle is maximally expanded in the forward direction of the first vehicle. FIG. 38 is a rear view of the first vehicle in a state in which the frame of the first vehicle is maximally expanded in the forward direction of the first vehicle. FIG. 39 is a left side view of the first vehicle in a state in which the frame of the first vehicle is maximally expanded in the forward direction of the first vehicle. FIG. 40 is a right side view of the first vehicle in a state in which the frame of the first vehicle is maximally expanded in the forward direction of the first vehicle. FIG. 41 is a top view of the first vehicle in a state in which the frame of the first vehicle is maximally expanded in the forward direction of the first vehicle. FIG. 42 is a bottom view of the first vehicle in a state in which the frame of the first vehicle is maximally expanded in the forward direction of the first vehicle. FIG. 43 is a perspective view of the first vehicle in a state in which the frame of the first vehicle is maximally expanded in the forward direction of the first vehicle. FIG. 44 is a cross-section view of the first vehicle taken along the line A-A illustrated in FIG. 40.

Figure 45:
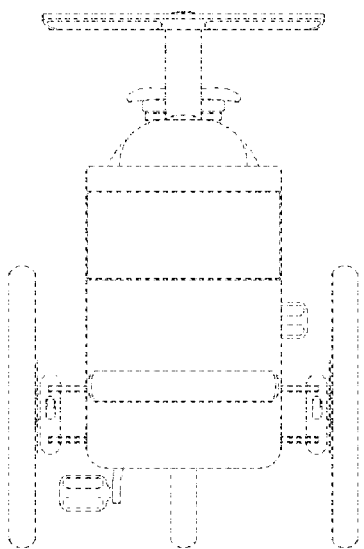
FIG. 45 is a front view of the first vehicle in a state in which the frame of the first vehicle is maximally contracted in the forward direction of the first vehicle.
Figure 46:
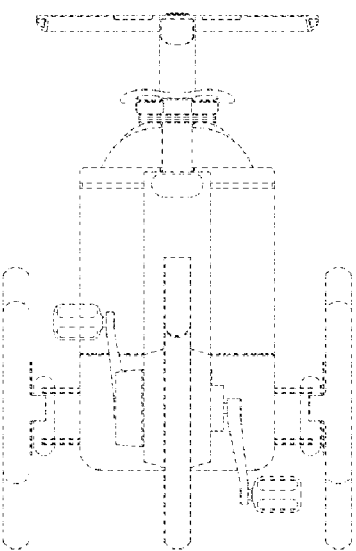
FIG. 46 is a rear view of the first vehicle in a state in which the frame of the first vehicle is maximally contracted in the forward direction of the first vehicle.
Figure 47:
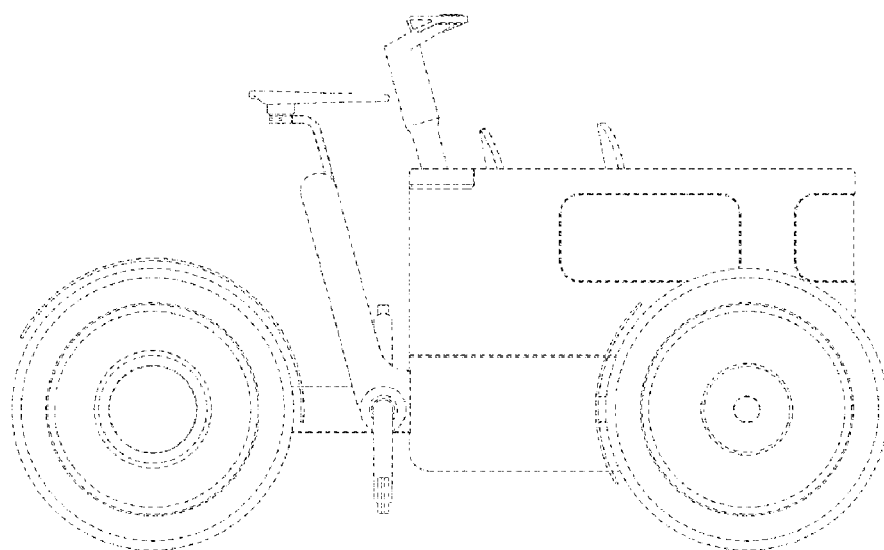
FIG. 47 is a left side view of the first vehicle in a state in which the frame of the first vehicle is maximally contracted in the forward direction of the first vehicle.
Figure 48:
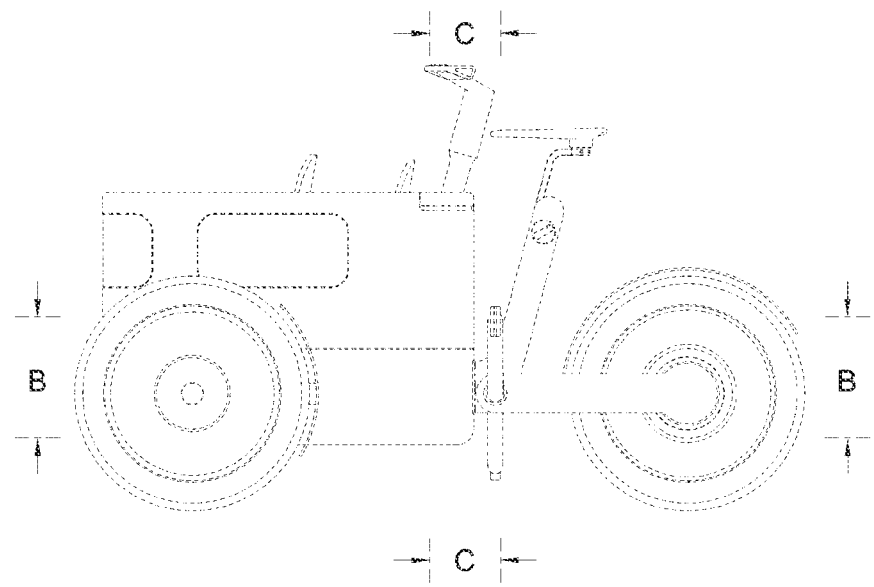
FIG. 48 is a right side view of the first vehicle in a state in which the frame of the first vehicle is maximally contracted in the forward direction of the first vehicle.
Figure 49:
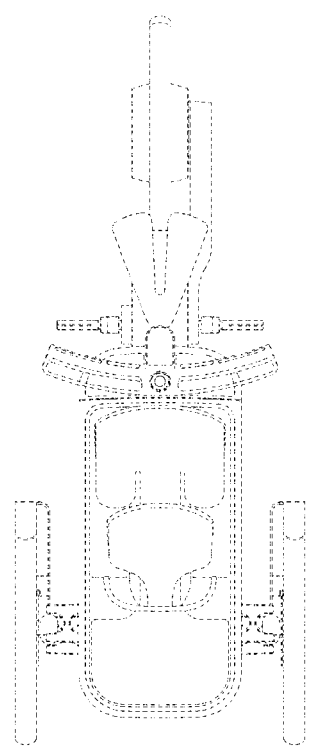
FIG. 49 is a top view of the first vehicle in a state in which the frame of the first vehicle is maximally contracted in the forward direction of the first vehicle.
Figure 50:
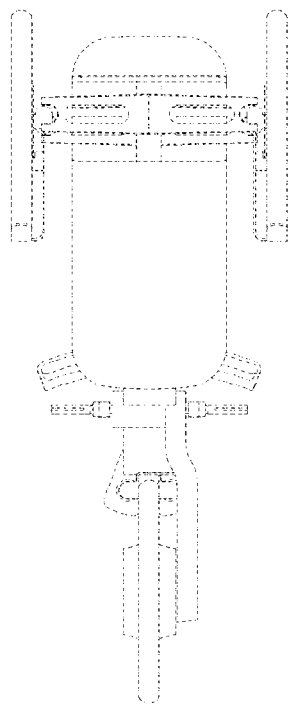
FIG. 50 is a bottom view of the first vehicle in a state in which the frame of the first vehicle is maximally contracted in the forward direction of the first vehicle.
Figure 51:
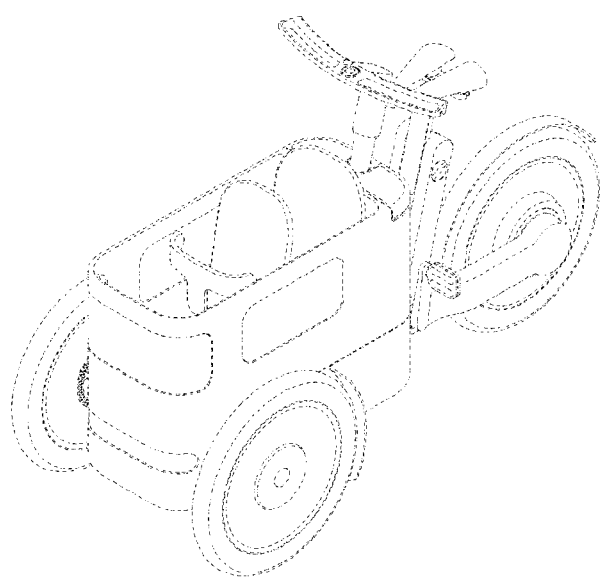
FIG. 51 is a perspective view of the first vehicle in a state in which the frame of the first vehicle is maximally contracted in the forward direction of the first vehicle.
Figure 52:
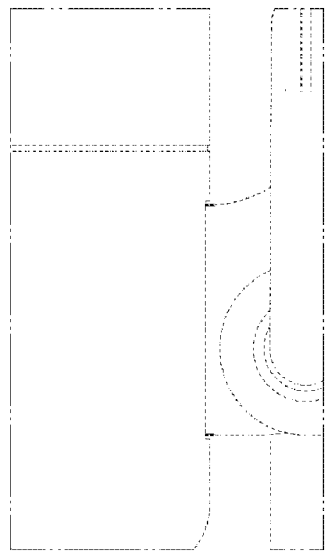
FIG. 52 is an enlarged view of the B-C portion in FIG. 48.

FIG. 45 is a front view of the first vehicle in a state in which the frame of the first vehicle is maximally contracted in the forward direction of the first vehicle. FIG. 46 is a rear view of the first vehicle in a state in which the frame of the first vehicle is maximally contracted in the forward direction of the first vehicle. FIG. 47 is a left side view of the first vehicle in a state in which the frame of the first vehicle is maximally contracted in the forward direction of the first vehicle. FIG. 48 is a right side view of the first vehicle in a state in which the frame of the first vehicle is maximally contracted in the forward direction of the first vehicle. FIG. 49 is a top view of the first vehicle in a state in which the frame of the first vehicle is maximally contracted in the forward direction of the first vehicle. FIG. 50 is a bottom view of the first vehicle in a state in which the frame of the first vehicle is maximally contracted in the forward direction of the first vehicle. FIG. 51 is a perspective view of the first vehicle in a state in which the frame of the first vehicle is maximally contracted in the forward direction of the first vehicle. FIG. 52 is an enlarged view of the B-C portion in FIG. 48.

Figure 53:
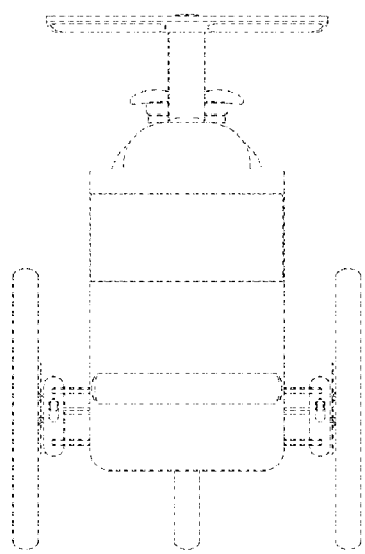
FIG. 53 is a front view of a first vehicle in a state in which the frame of the first vehicle is maximally expanded in the forward direction of the first vehicle.
Figure 54:
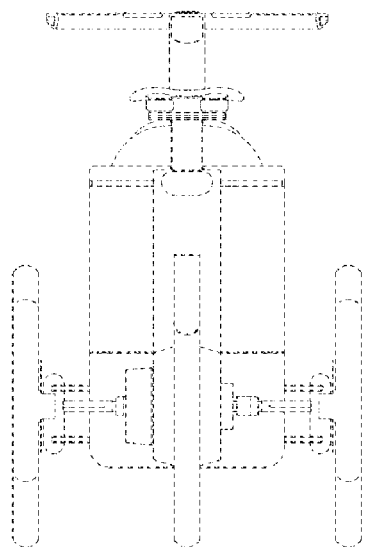
FIG. 54 is a rear view of the first vehicle in a state in which the frame of the first vehicle is maximally expanded in the forward direction of the first vehicle.
Figure 55:
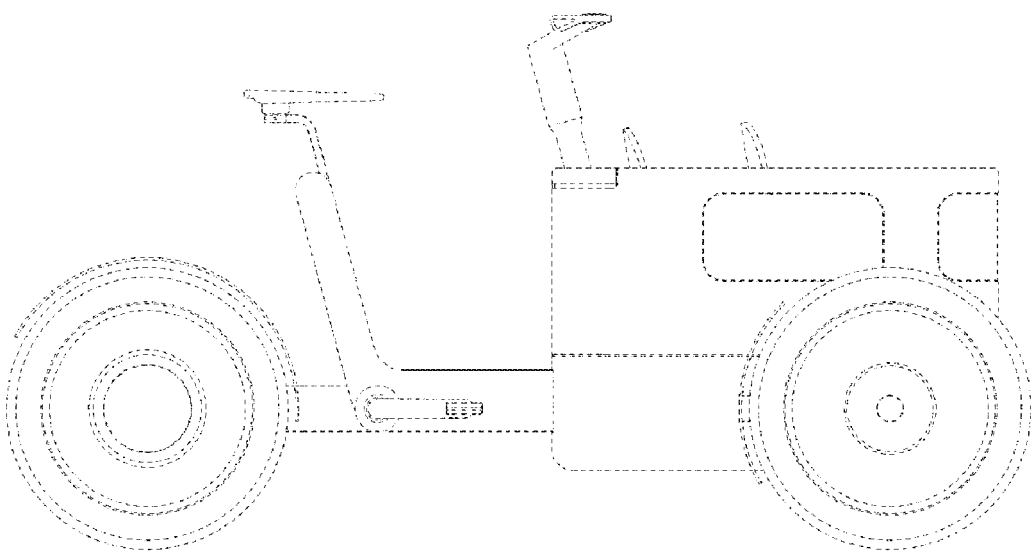
FIG. 55 is a left side view of the first vehicle in a state in which the frame of the first vehicle is maximally expanded in the forward direction of the first vehicle.
Figure 56:
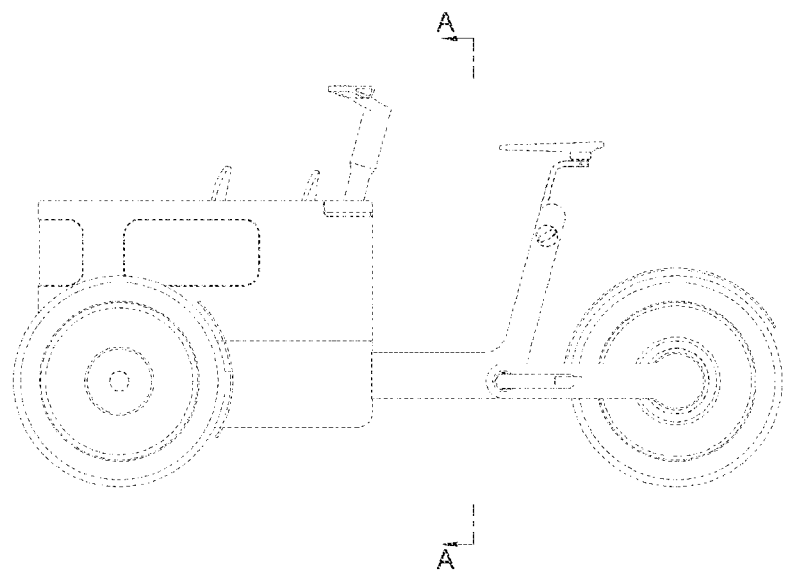
FIG. 56 is a right side view of the first vehicle in a state in which the frame of the first vehicle is maximally expanded in the forward direction of the first vehicle.
Figure 57:
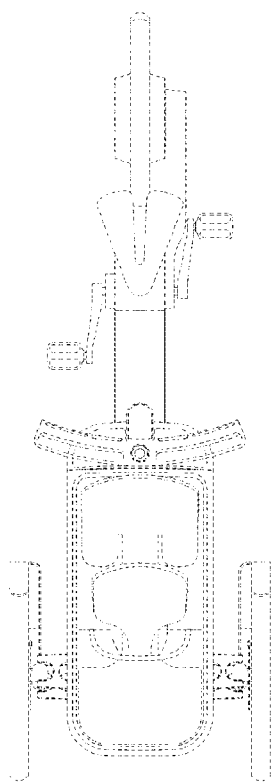
FIG. 57 is a top view of the first vehicle in a state in which the frame of the first vehicle is maximally expanded in the forward direction of the first vehicle.
Figure 58:
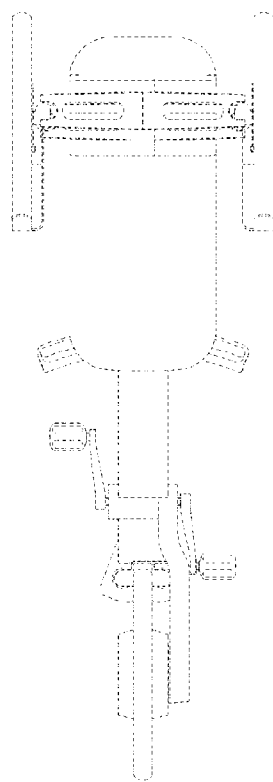
FIG. 58 is a bottom view of the first vehicle in a state in which the frame of the first vehicle is maximally expanded in the forward direction of the first vehicle.
Figure 59:
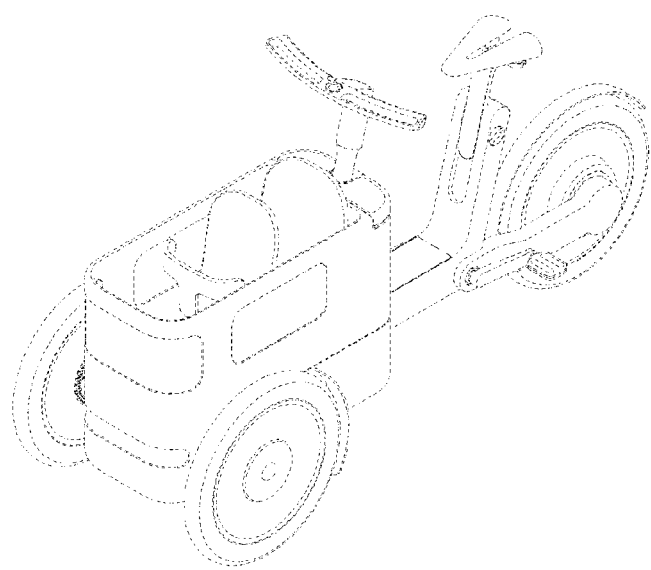
FIG. 59 is a perspective view of the first vehicle in a state in which the frame of the first vehicle is maximally expanded in the forward direction of the first vehicle.
Figure 60:
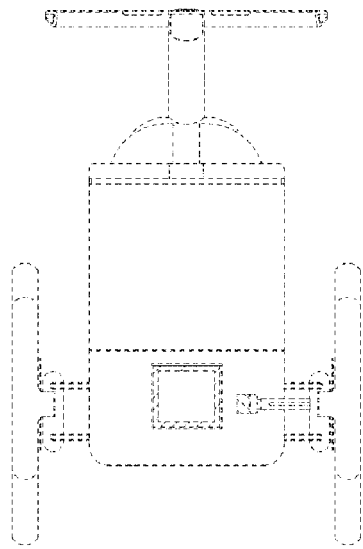
FIG. 60 is a cross-section view of the first vehicle taken along the line A-A illustrated in FIG. 56.

FIG. 53 is a front view of a first vehicle in a state in which the frame of the first vehicle is maximally expanded in the forward direction of the first vehicle. FIG. 54 is a rear view of the first vehicle in a state in which the frame of the first vehicle is maximally expanded in the forward direction of the first vehicle. FIG. 55 is a left side view of the first vehicle in a state in which the frame of the first vehicle is maximally expanded in the forward direction of the first vehicle. FIG. 56 is a right side view of the first vehicle in a state in which the frame of the first vehicle is maximally expanded in the forward direction of the first vehicle. FIG. 57 is a top view of the first vehicle in a state in which the frame of the first vehicle is maximally expanded in the forward direction of the first vehicle. FIG. 58 is a bottom view of the first vehicle in a state in which the frame of the first vehicle is maximally expanded in the forward direction of the first vehicle. FIG. 59 is a perspective view of the first vehicle in a state in which the frame of the first vehicle is maximally expanded in the forward direction of the first vehicle. FIG. 60 is a cross-section view of the first vehicle taken along the line A-A illustrated in FIG. 56.

Figure 61:
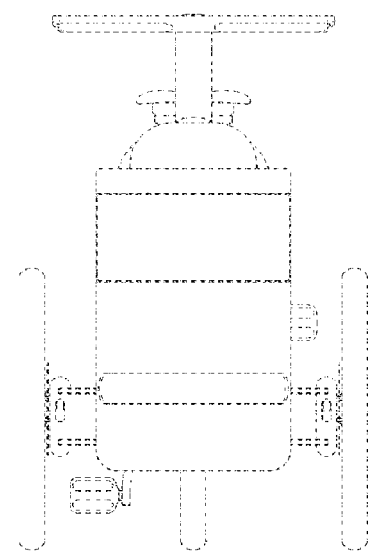
FIG. 61 is a front view of the first vehicle in a state in which the frame of the first vehicle is maximally contracted in the forward direction of the first vehicle.
Figure 62:
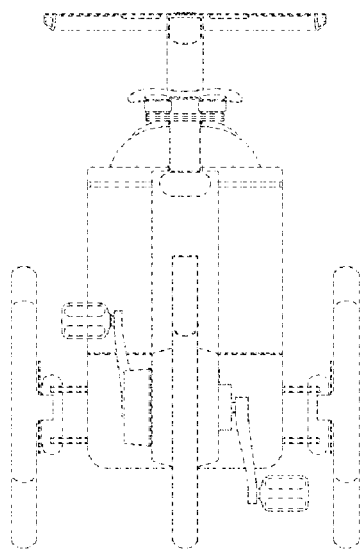
FIG. 62 is a rear view of the first vehicle in a state in which the frame of the first vehicle is maximally contracted in the forward direction of the first vehicle.
Figure 63:
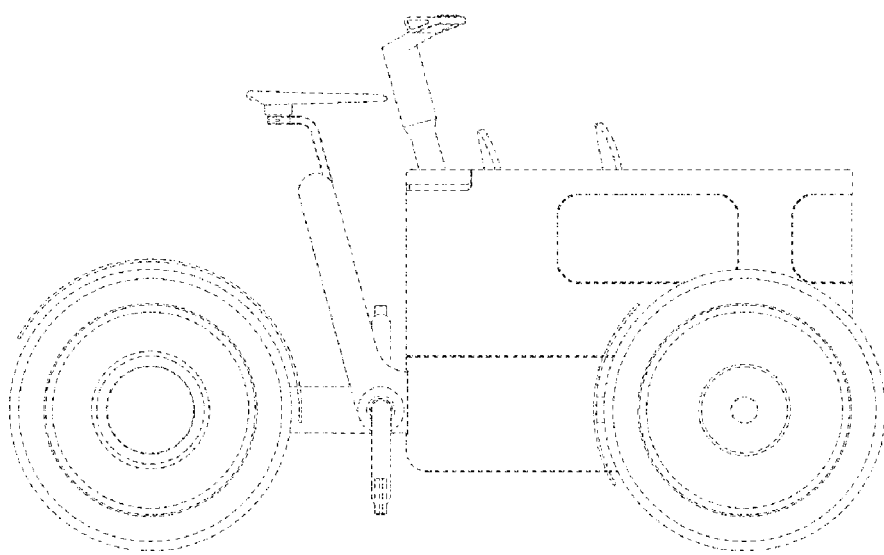
FIG. 63 is a left side view of the first vehicle in a state in which the frame of the first vehicle is maximally contracted in the forward direction of the first vehicle.
Figure 64:
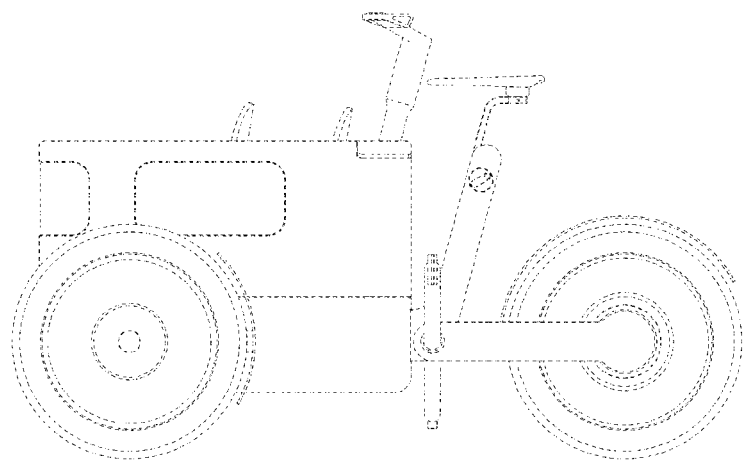
FIG. 64 is a right side view of the first vehicle in a state in which the frame of the first vehicle is maximally contracted in the forward direction of the first vehicle.
Figure 65:
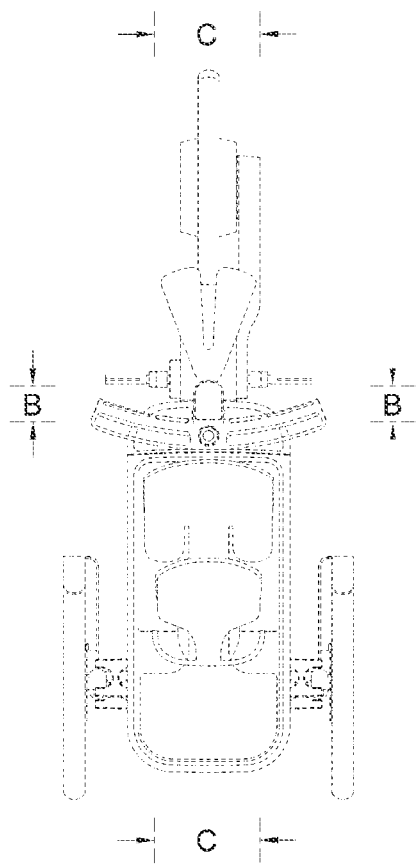
FIG. 65 is a top view of the first vehicle in a state in which the frame of the first vehicle is maximally contracted in the forward direction of the first vehicle.
Figure 66:
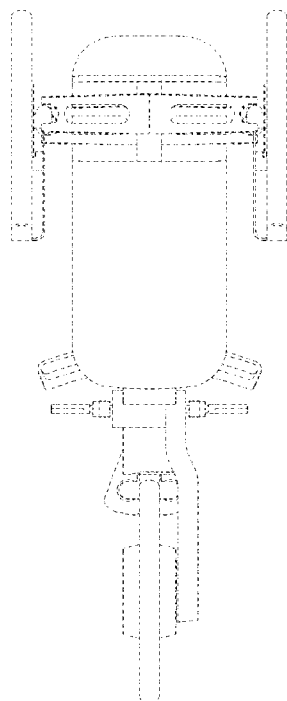
FIG. 66 is a bottom view of the first vehicle in a state in which the frame of the first vehicle is maximally contracted in the forward direction of the first vehicle.
Figure 67:
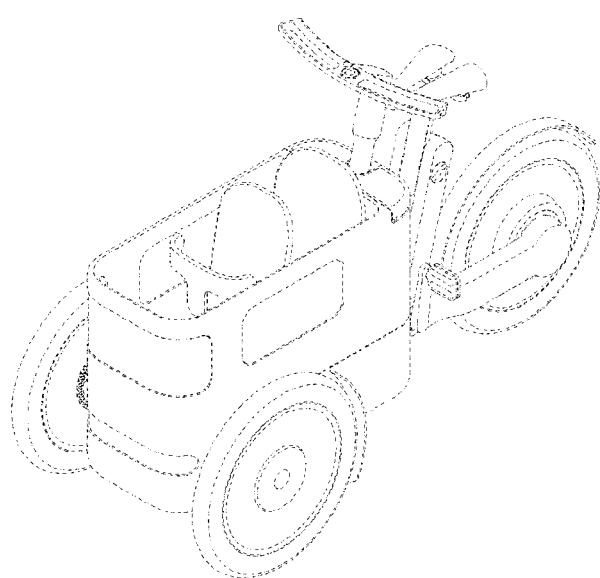
FIG. 67 is a perspective view of the first vehicle in a state in which the frame of the first vehicle is maximally contracted in the forward direction of the first vehicle.
Figure 68:
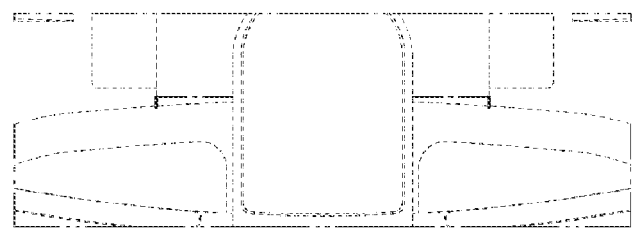
FIG. 68 is an enlarged view of the B-C portion in FIG. 65.

FIG. 61 is a front view of the first vehicle in a state in which the frame of the first vehicle is maximally contracted in the forward direction of the first vehicle. FIG. 62 is a rear view of the first vehicle in a state in which the frame of the first vehicle is maximally contracted in the forward direction of the first vehicle. FIG. 63 is a left side view of the first vehicle in a state in which the frame of the first vehicle is maximally contracted in the forward direction of the first vehicle. FIG. 64 is a right side view of the first vehicle in a state in which the frame of the first vehicle is maximally contracted in the forward direction of the first vehicle. FIG. 65 is a top view of the first vehicle in a state in which the frame of the first vehicle is maximally contracted in the forward direction of the first vehicle. FIG. 66 is a bottom view of the first vehicle in a state in which the frame of the first vehicle is maximally contracted in the forward direction of the first vehicle. FIG. 67 is a perspective view of the first vehicle in a state in which the frame of the first vehicle is maximally contracted in the forward direction of the first vehicle. FIG. 68 is an enlarged view of the B-C portion in FIG. 65.

(Design of Second Vehicle)

Next, the design of the second vehicle will be described. The second vehicle, although partially different in design from the first vehicle, is the same as the vehicle described in the embodiment, in that the frame is expandable and contractible in the forward direction.

Figure 69:
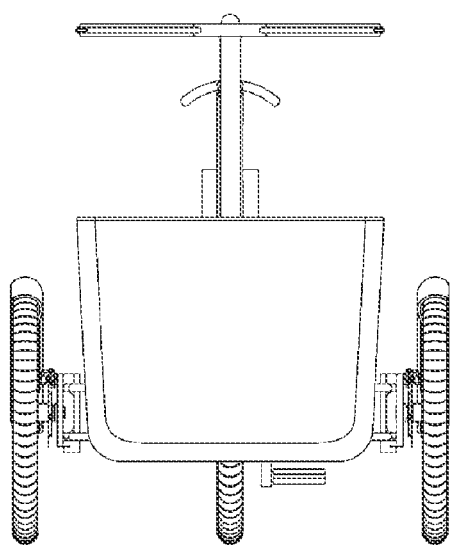
FIG. 69 is a front view of a second vehicle in a state in which the frame of the second vehicle is maximally expanded in the forward direction of the second vehicle.
Figure 70:
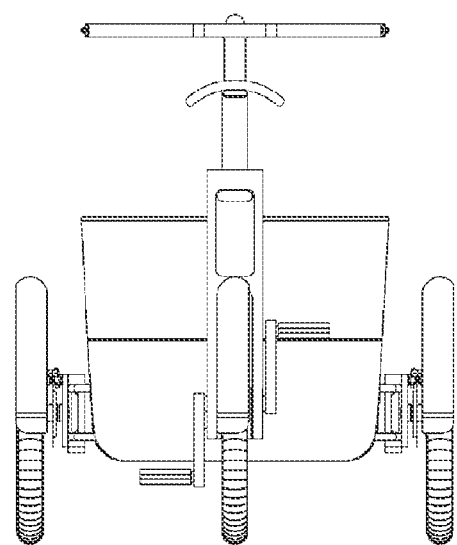
FIG. 70 is a rear view of the second vehicle in a state in which the frame of the second vehicle is maximally expanded in the forward direction of the second vehicle.
Figure 71:
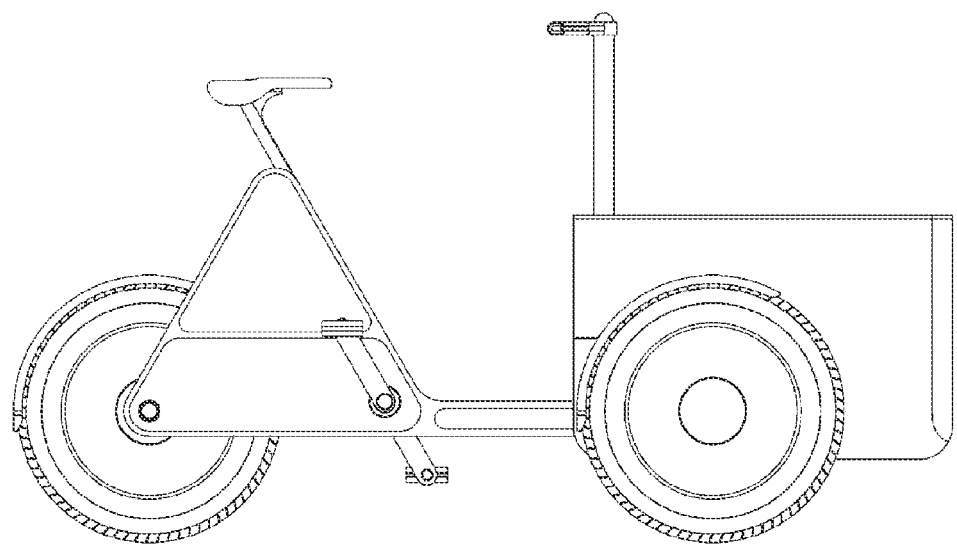
FIG. 71 is a left side view of the second vehicle in a state in which the frame of the second vehicle is maximally expanded in the forward direction of the second vehicle.
Figure 72:
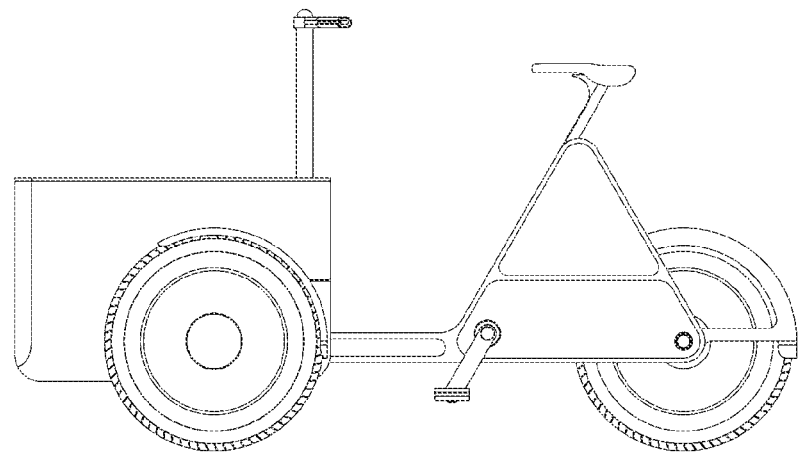
FIG. 72 is a right side view of the second vehicle in a state in which the frame of the second vehicle is maximally expanded in the forward direction of the second vehicle.
Figure 73:
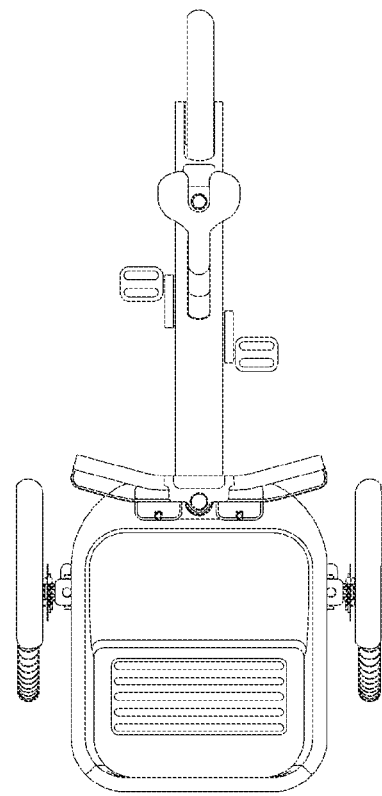
FIG. 73 is a top view of the second vehicle in a state in which the frame of the second vehicle is maximally expanded in the forward direction of the second vehicle.
Figure 74:
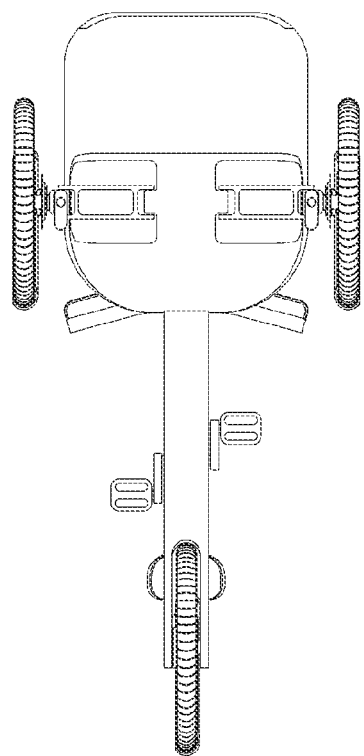
FIG. 74 is a bottom view of the second vehicle in a state in which the frame of the second vehicle is maximally expanded in the forward direction of the second vehicle.
Figure 75:
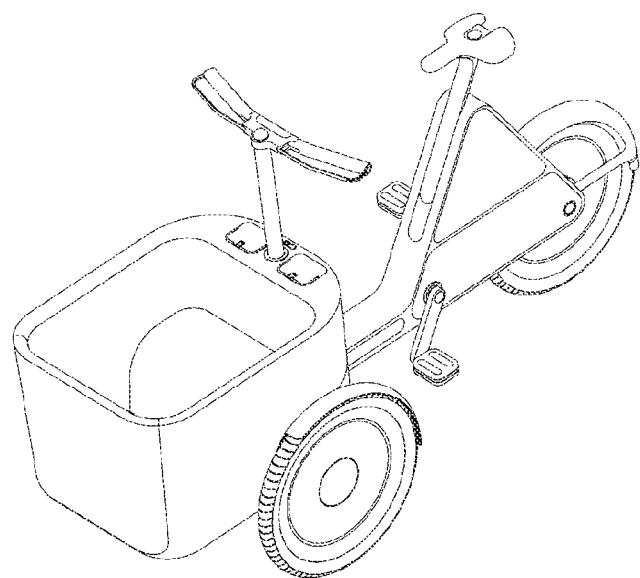
FIG. 75 is a perspective view of the second vehicle in a state in which the frame of the second vehicle is maximally expanded in the forward direction of the second vehicle.

FIG. 69 is a front view of a second vehicle in a state in which the frame of the second vehicle is maximally expanded in the forward direction of the second vehicle. FIG. 70 is a rear view of the second vehicle in a state in which the frame of the second vehicle is maximally expanded in the forward direction of the second vehicle. FIG. 71 is a left side view of the second vehicle in a state in which the frame of the second vehicle is maximally expanded in the forward direction of the second vehicle. FIG. 72 is a right side view of the second vehicle in a state in which the frame of the second vehicle is maximally expanded in the forward direction of the second vehicle. FIG. 73 is a top view of the second vehicle in a state in which the frame of the second vehicle is maximally expanded in the forward direction of the second vehicle. FIG. 74 is a bottom view of the second vehicle in a state in which the frame of the second vehicle is maximally expanded in the forward direction of the second vehicle. FIG. 75 is a perspective view of the second vehicle in a state in which the frame of the second vehicle is maximally expanded in the forward direction of the second vehicle.

Figure 76:
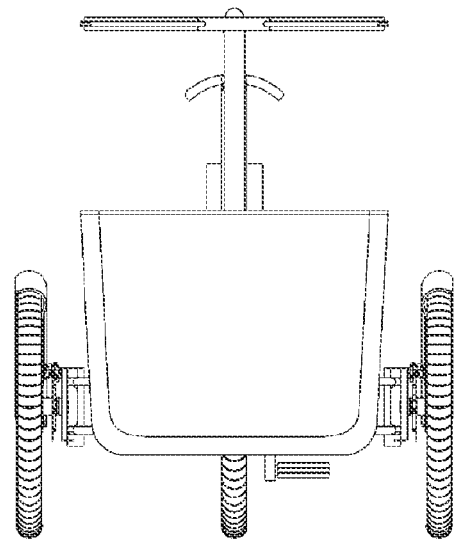
FIG. 76 is a front view of the second vehicle in a state in which the frame of the second vehicle is maximally contracted in the forward direction of the second vehicle.
Figure 77:
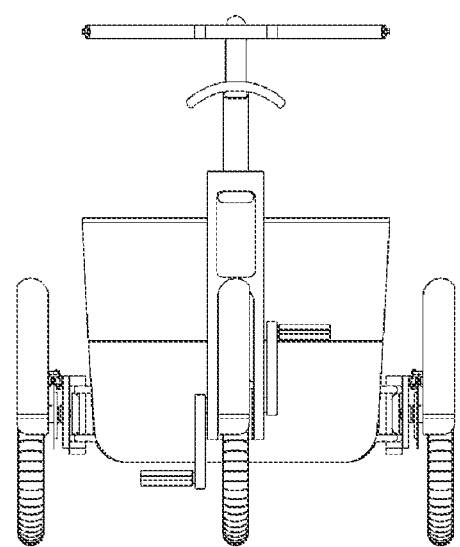
FIG. 77 is a rear view of the second vehicle in a state in which the frame of the second vehicle is maximally contracted in the forward direction of the second vehicle.
Figure 78:
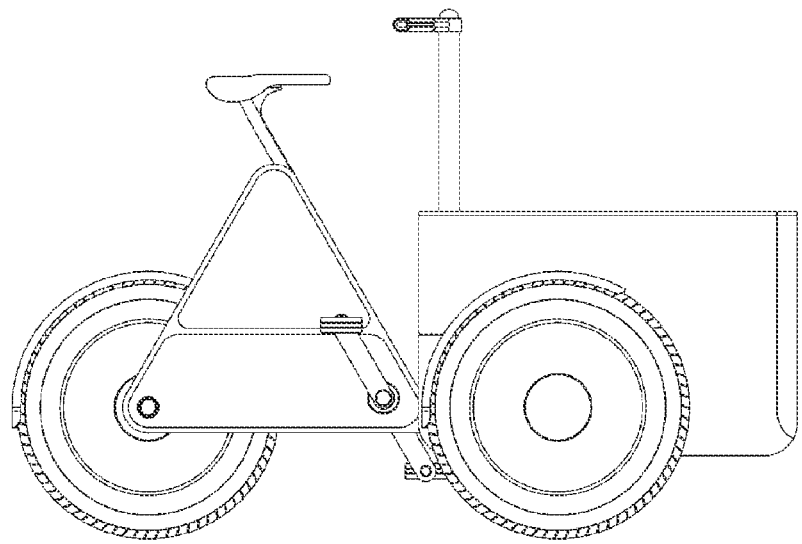
FIG. 78 is a left side view of the second vehicle in a state in which the frame of the second vehicle is maximally contracted in the forward direction of the second vehicle.
Figure 79:
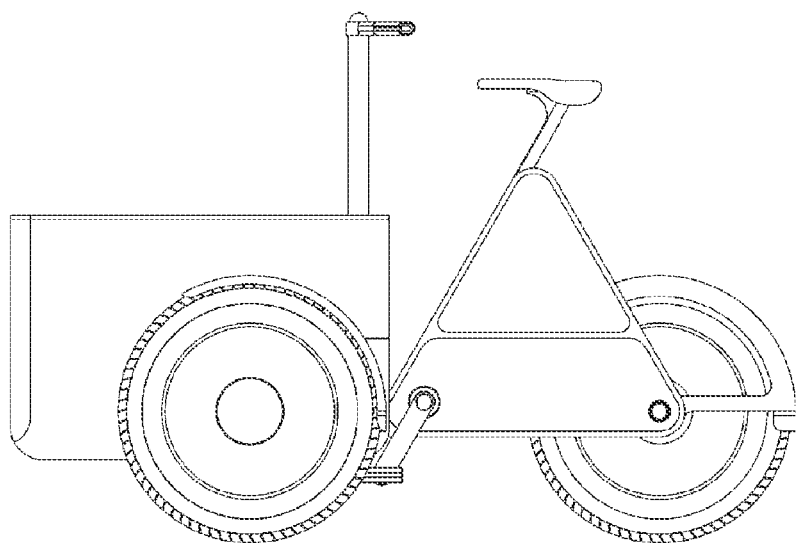
FIG. 79 is a right side view of the second vehicle in a state in which the frame of the second vehicle is maximally contracted in the forward direction of the second vehicle.
Figure 80:
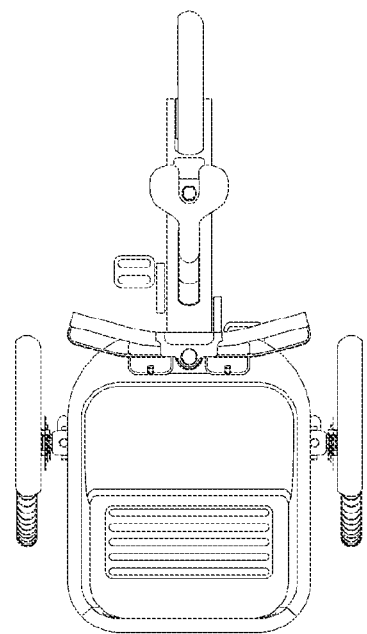
FIG. 80 is a top view of the second vehicle in a state in which the frame of the second vehicle is maximally contracted in the forward direction of the second vehicle.
Figure 81:
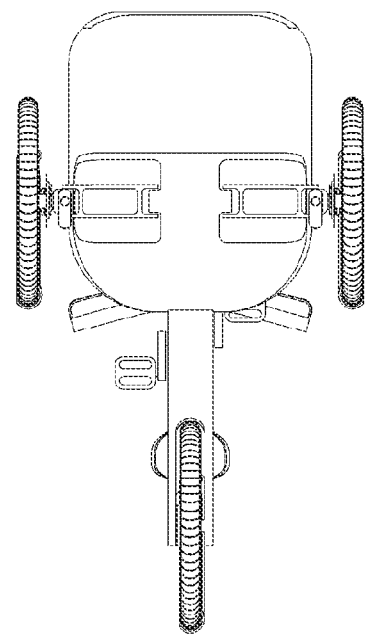
FIG. 81 is a bottom view of the second vehicle in a state in which the frame of the second vehicle is maximally contracted in the forward direction of the second vehicle.
Figure 82:
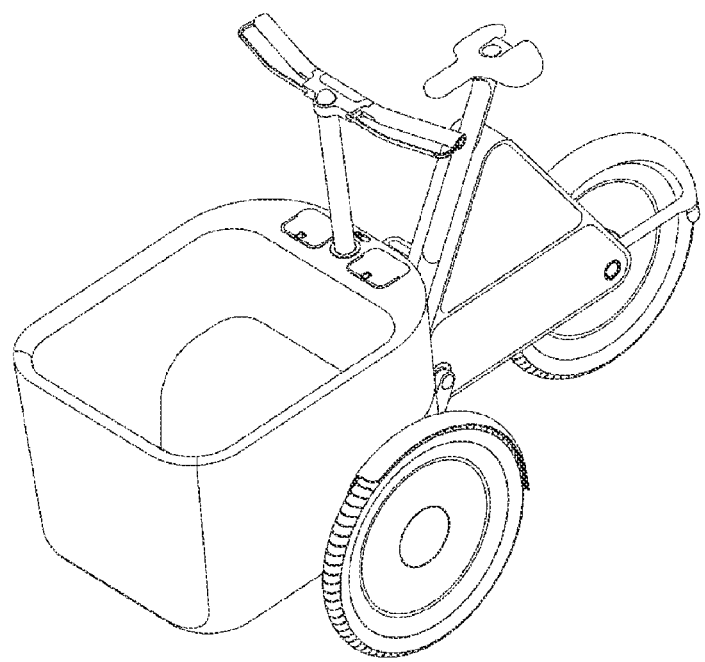
FIG. 82 is a perspective view of the second vehicle in a state in which the frame of the second vehicle is maximally contracted in the forward direction of the second vehicle.

FIG. 76 is a front view of the second vehicle in a state in which the frame of the second vehicle is maximally contracted in the forward direction of the second vehicle. FIG. 77 is a rear view of the second vehicle in a state in which the frame of the second vehicle is maximally contracted in the forward direction of the second vehicle. FIG. 78 is a left side view of the second vehicle in a state in which the frame of the second vehicle is maximally contracted in the forward direction of the second vehicle. FIG. 79 is a right side view of the second vehicle in a state in which the frame of the second vehicle is maximally contracted in the forward direction of the second vehicle. FIG. 80 is a top view of the second vehicle in a state in which the frame of the second vehicle is maximally contracted in the forward direction of the second vehicle. FIG. 81 is a bottom view of the second vehicle in a state in which the frame of the second vehicle is maximally contracted in the forward direction of the second vehicle. FIG. 82 is a perspective view of the second vehicle in a state in which the frame of the second vehicle is maximally contracted in the forward direction of the second vehicle.

Figure 83:
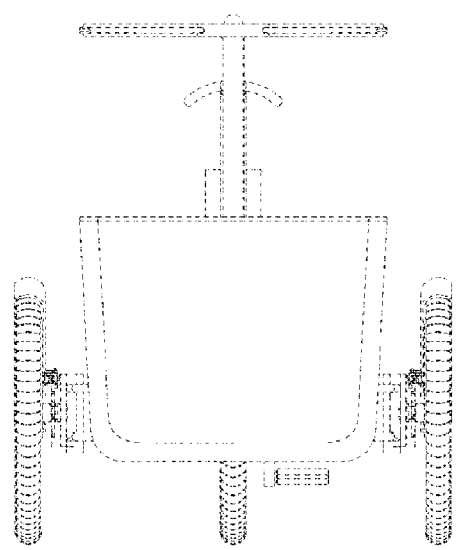
FIG. 83 is a front view of a second vehicle in a state in which the frame of the second vehicle is maximally expanded in the forward direction of the second vehicle.

FIG. 83 is a front view of the second vehicle. Note that in FIG. 83, with respect to the illustration of the partial design, the portion represented by solid lines is under application for design registration as a partial design. The chain line indicates the boundary between the portion under application for design registration as a partial design and the portion that is not, and is not part of the design. FIGS. 84 to 98 are similar.

Figure 84:
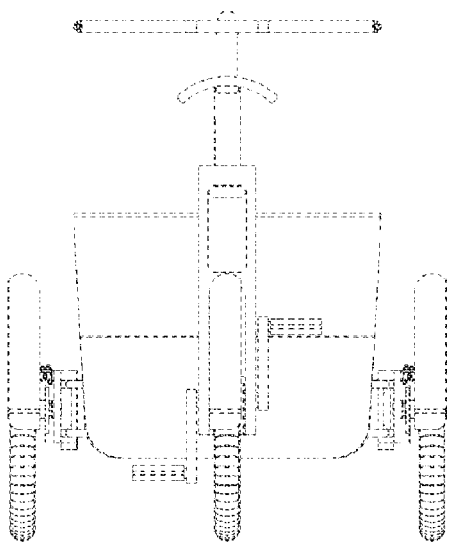
FIG. 84 is a rear view of the second vehicle in a state in which the frame of the second vehicle is maximally expanded in the forward direction of the second vehicle.
Figure 85:
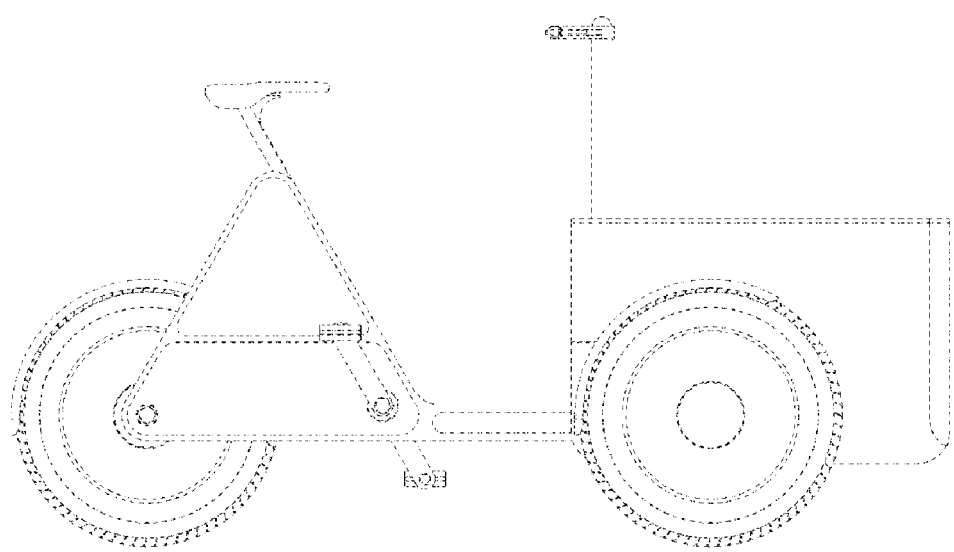
FIG. 85 is a left side view of the second vehicle in a state in which the frame of the second vehicle is maximally expanded in the forward direction of the second vehicle.
Figure 86:
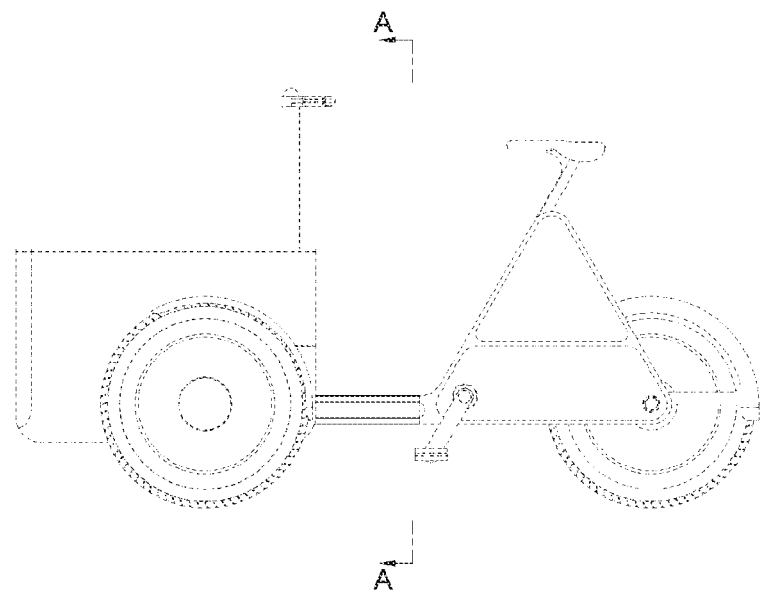
FIG. 86 is a right side view of the second vehicle in a state in which the frame of the second vehicle is maximally expanded in the forward direction of the second vehicle.
Figure 87:
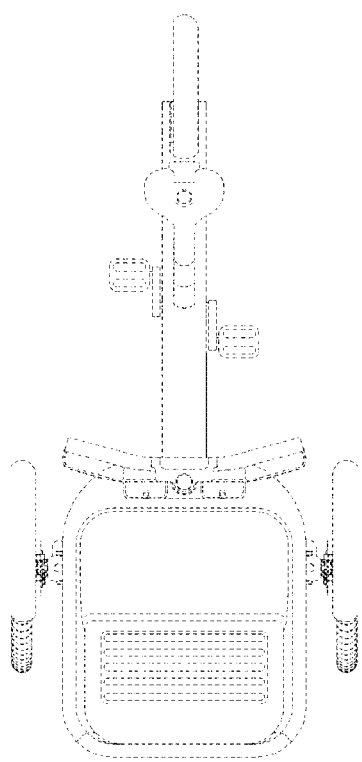
FIG. 87 is a top view of the second vehicle in a state in which the frame of the second vehicle is maximally expanded in the forward direction of the second vehicle.
Figure 88:
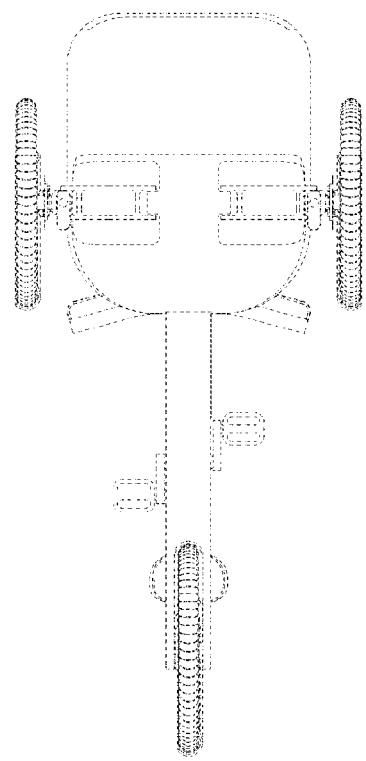
FIG. 88 is a bottom view of the second vehicle in a state in which the frame of the second vehicle is maximally expanded in the forward direction of the second vehicle.
Figure 89:
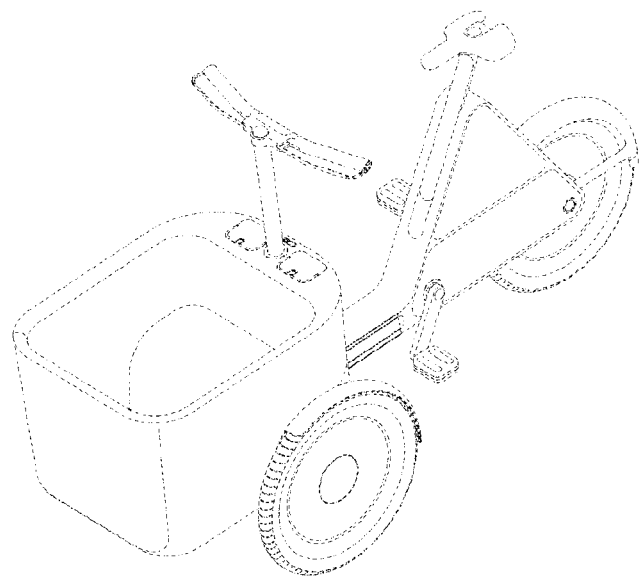
FIG. 89 is a perspective view of the second vehicle in a state in which the frame of the second vehicle is maximally expanded in the forward direction of the second vehicle.
Figure 90:
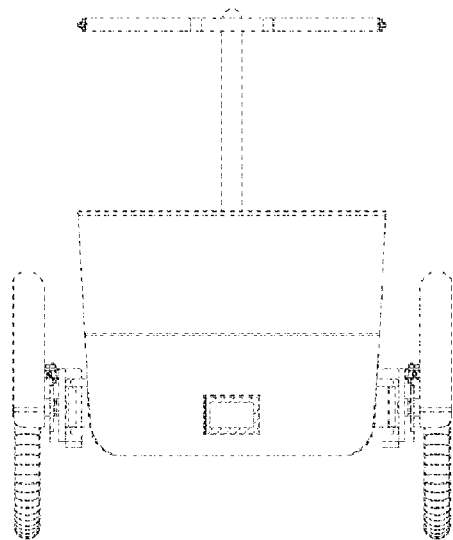
FIG. 90 is a cross-section view of the second vehicle taken along the line A-A illustrated in FIG. 86.

FIG. 84 is a rear view of the second vehicle in a state in which the frame of the second vehicle is maximally expanded in the forward direction of the second vehicle. FIG. 85 is a left side view of the second vehicle in a state in which the frame of the second vehicle is maximally expanded in the forward direction of the second vehicle. FIG. 86 is a right side view of the second vehicle in a state in which the frame of the second vehicle is maximally expanded in the forward direction of the second vehicle. FIG. 87 is a top view of the second vehicle in a state in which the frame of the second vehicle is maximally expanded in the forward direction of the second vehicle. FIG. 88 is a bottom view of the second vehicle in a state in which the frame of the second vehicle is maximally expanded in the forward direction of the second vehicle. FIG. 89 is a perspective view of the second vehicle in a state in which the frame of the second vehicle is maximally expanded in the forward direction of the second vehicle. FIG. 90 is a cross-section view of the second vehicle taken along the line A-A illustrated in FIG. 86.

Figure 91:
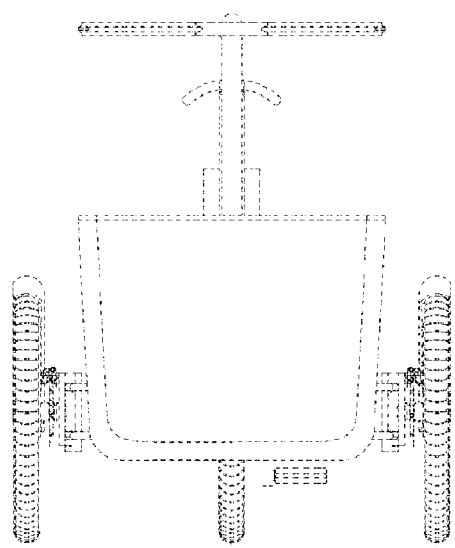
FIG. 91 is a front view of a second vehicle in a state in which the frame of the second vehicle is maximally expanded in the forward direction of the second vehicle.
Figure 92:
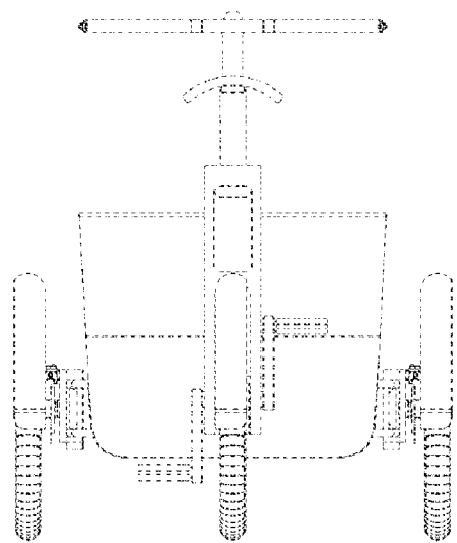
FIG. 92 is a rear view of the second vehicle in a state in which the frame of the second vehicle is maximally expanded in the forward direction of the second vehicle.
Figure 93:
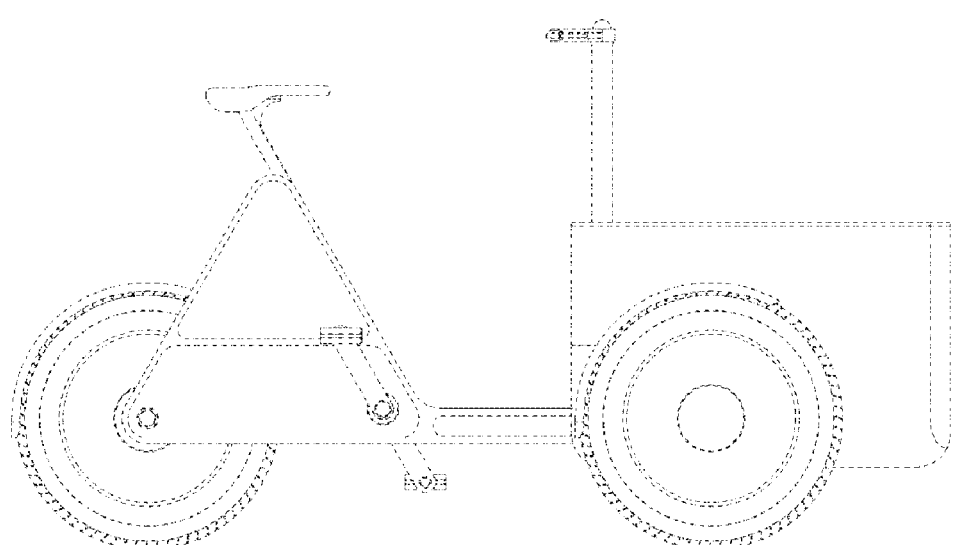
FIG. 93 is a left side view of the second vehicle in a state in which the frame of the second vehicle is maximally expanded in the forward direction of the second vehicle.
Figure 94:
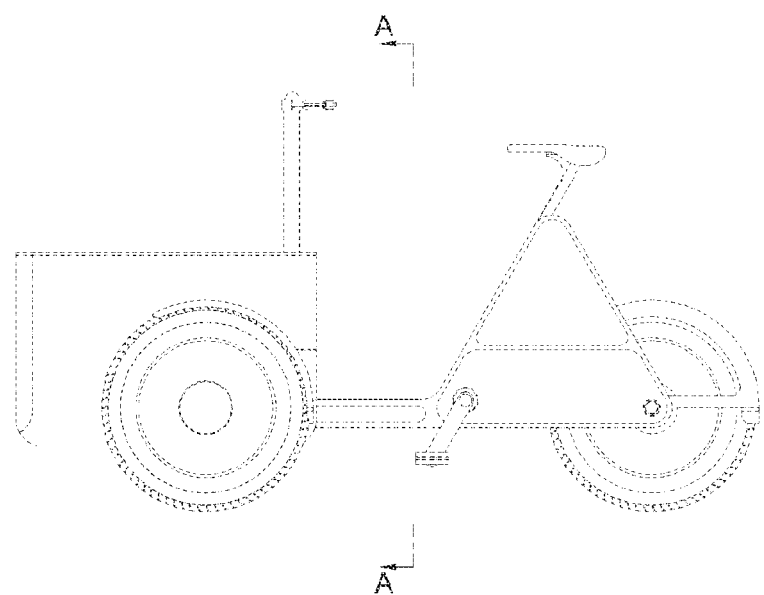
FIG. 94 is a right side view of the second vehicle in a state in which the frame of the second vehicle is maximally expanded in the forward direction of the second vehicle.
Figure 95:
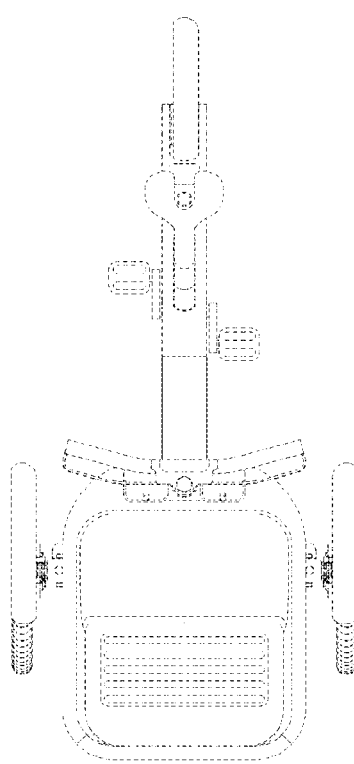
FIG. 95 is a top view of the second vehicle in a state in which the frame of the second vehicle is maximally expanded in the forward direction of the second vehicle.
Figure 96:
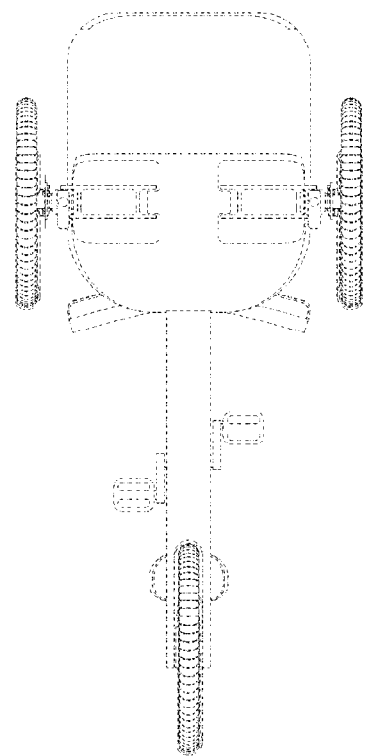
FIG. 96 is a bottom view of the second vehicle in a state in which the frame of the second vehicle is maximally expanded in the forward direction of the second vehicle.
Figure 97:
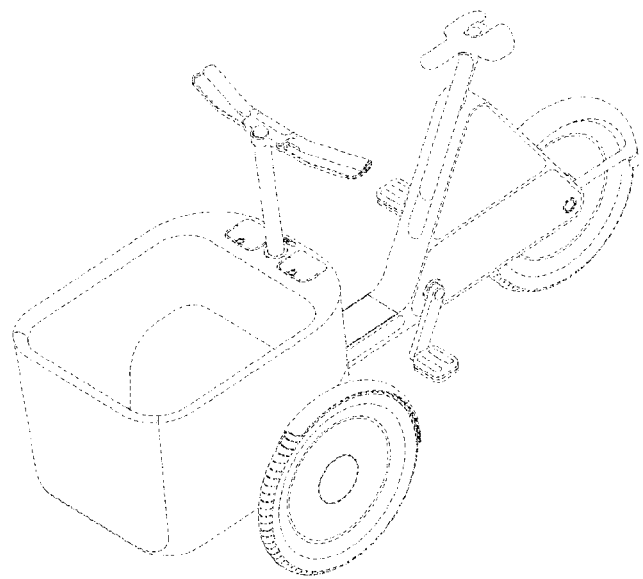
FIG. 97 is a perspective view of the second vehicle in a state in which the frame of the second vehicle is maximally expanded in the forward direction of the second vehicle.
Figure 98:
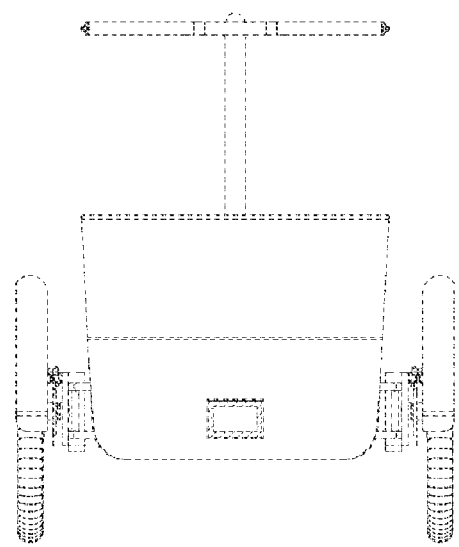
FIG. 98 is a cross-section view of the second vehicle taken along the line A-A illustrated in FIG. 94.

FIG. 91 is a front view of a second vehicle in a state in which the frame of the second vehicle is maximally expanded in the forward direction of the second vehicle. FIG. 92 is a rear view of the second vehicle in a state in which the frame of the second vehicle is maximally expanded in the forward direction of the second vehicle. FIG. 93 is a left side view of the second vehicle in a state in which the frame of the second vehicle is maximally expanded in the forward direction of the second vehicle. FIG. 94 is a right side view of the second vehicle in a state in which the frame of the second vehicle is maximally expanded in the forward direction of the second vehicle. FIG. 95 is a top view of the second vehicle in a state in which the frame of the second vehicle is maximally expanded in the forward direction of the second vehicle. FIG. 96 is a bottom view of the second vehicle in a state in which the frame of the second vehicle is maximally expanded in the forward direction of the second vehicle. FIG. 97 is a perspective view of the second vehicle in a state in which the frame of the second vehicle is maximally expanded in the forward direction of the second vehicle. FIG. 98 is a cross-section view of the second vehicle taken along the line A-A illustrated in FIG. 94.

<Modifications>

The foregoing specifically describes a plurality of embodiments of the present disclosure, but the content of the present disclosure is not limited to the foregoing embodiments, and various modifications based on the technical ideas of the present disclosure are possible. Hereinafter, modifications will be described.

Figure 22:
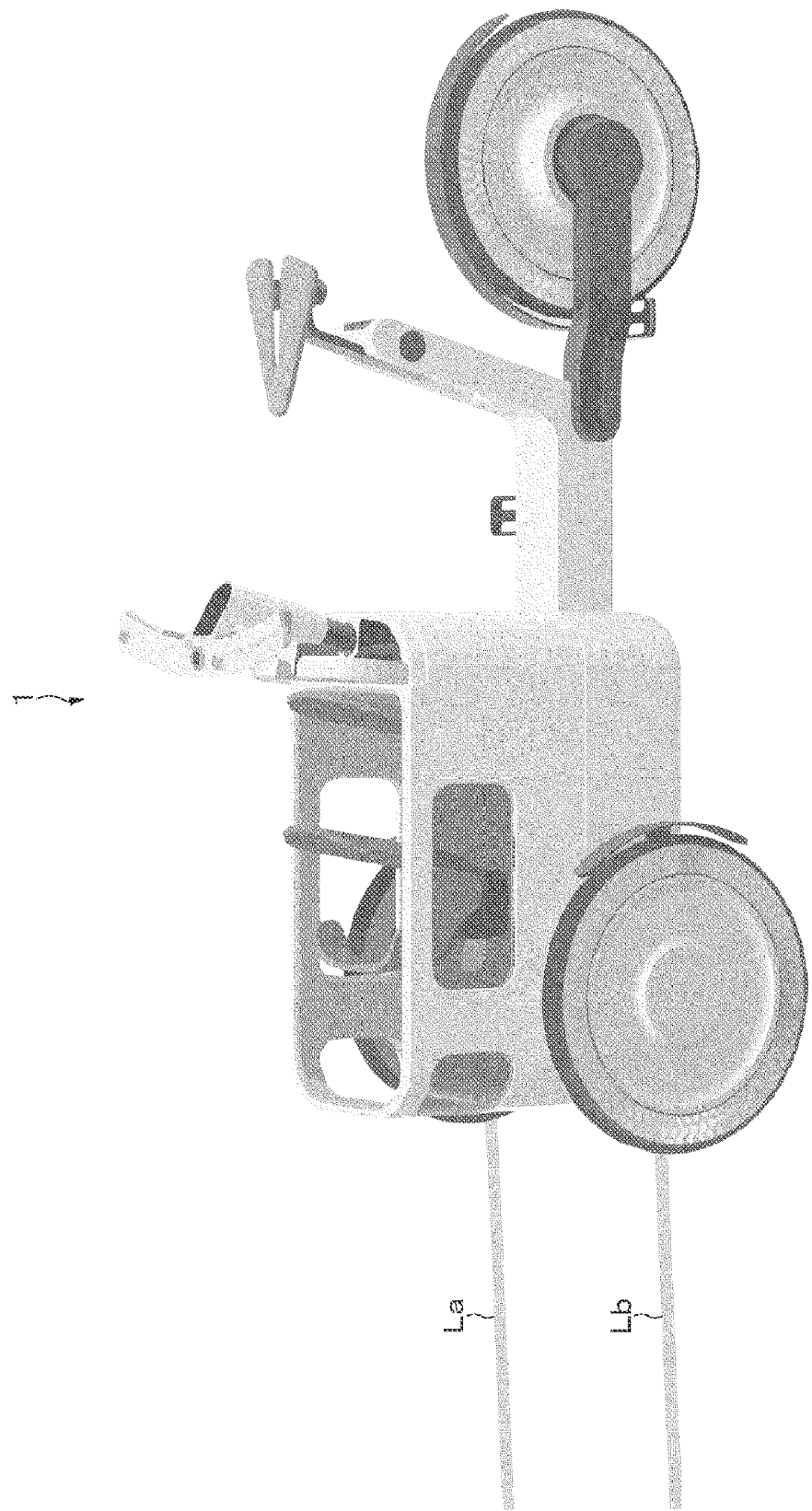
FIG. 22 is a diagram for explaining a modification.

As illustrated in FIG. 22, the vehicle may also include a laser light source that emits laser lights La and Lb making it easy for the user to recognize the width of the vehicle, light source such as a light-emitting diode (LED), an illumination device that illuminates the area ahead of the vehicle, and the like. Also, in the foregoing embodiment, a configuration in which the step of the first base part abuts the connecting arm on the upper side is described, but the step may also abut the connecting arm on the lower side, or both connecting arms. Also, a vehicle according to the embodiment described above may be provided with a solar panel as an auxiliary battery that assists the battery. In this way, the configuration described in the embodiment described above may be modified appropriately insofar as a technical contradiction does not occur. Furthermore, a configuration not described in the embodiment may also be added to the vehicle.

In the foregoing embodiment, a configuration in which the first frame part slides is described, but the second frame part may be configured to slide, or both the first and second frame parts may be configured to slide. Also, the second position may be a position in which the movement of the rear wheel rather than the front wheels is restricted, or a position in which the movement of the front wheels and the rear wheel is restricted. Additionally, the movement of the front wheels that is restricted in the second position may also include a movement other than that described in the embodiment (for example, the rotation of the front wheels themselves).

The vehicle according to the embodiment may also be a vehicle that is used by an unspecified large number of users, or in other words, a shared vehicle.

The technology according to the present disclosure is also applicable to vehicles other than a motorized tricycle, such as a human-powered bicycle, a motorbike that runs on an internal combustion engine, and a toy tricycle, for example.

The present disclosure may include the following configuration.

(1)

A vehicle including:

a handle part that includes a handle;

a front wheel connected to be steerable by the handle;

a rear wheel connected to a pedal; and a frame part that connects the front wheel and the rear wheel, in which the frame part is expandable and contractible between a first position in which a movement of the front wheel is permitted, and a second position in which a movement of the front wheel is restricted.

(2)

The vehicle according to (1), in which the movement of the front wheel includes a movement of the front wheel associated with an operation of the handle.

(3)

The vehicle according to (1) or (2), in which the front wheel includes a first front wheel and a second front wheel, and the movement of the front wheel includes a tilting of a link mechanism connected to the first front wheel and the second front wheel.

(4)

The vehicle according to any one of (1) to (3), in which the frame part includes a first frame part and a second frame part, and the frame part expands and contracts due to the first frame part and the second frame part moving relative to each other.

(5)

The vehicle according to (4), in which the frame part expands and contracts due to the first frame part sliding with respect to the second frame part.

(6)

The vehicle according to (4) or (5), in which the rear wheel is connected to the first frame part, and the front wheel is connected to the second frame part.

(7)

The vehicle according to (5) or (6), in which the frame part contracts by causing the first frame part to slide toward the second frame part, and the frame part expands by causing the first frame part to slide away from the second frame part.

(8)

The vehicle according to any one of (5) to (7), further including:
 a linked member configured to move together with an operation of the handle, in which
 in the second position, a movement of the linked member is restricted by an engaging member included in the first frame part.

(9)

The vehicle according to any one of (5) to (7), further including:
 a link mechanism including two connecting members connected as a bridge between two of the front wheel, in which
 in the second position, a movement of the link mechanism is restricted due to a restricting member included in the first frame part being inserted between the two connecting members.

(10)

The vehicle according to any one of (1) to (9), further including:
 a carrier, in which
 the carrier is provided such that a center of gravity of the carrier is disposed between a center of a rotational axis of the front wheel and the handle.

(11)

The vehicle according to any one of (1) to (10), in which
 the handle has a straight shape extending in a direction substantially orthogonal to an extension direction of a handle shaft, and
 the handle is provided with a speaker and a tactile presentation part in order respectively from a center of rotation of the handle toward either end of the handle.

(12)

The vehicle according to (11), in which
 an imaging device is provided near the center of rotation of the handle.

(13)

The vehicle according to any one of (1) to (12), in which
 the handle part has a handle shaft, the handle being connected on one end of the handle shaft, and a rectangular frame being provided on another end of the handle shaft.

REFERENCE SIGNS LIST

1 Vehicle
2, 2a, 2b Front wheel
3 Rear wheel
4 Frame part
5 Handle part
6 Carrier
7 Link mechanism
40 First frame part
45 Second frame part
71 First connecting arm
72 Second connecting arm
401a, 401b Pedal
410a First plate-shaped part
410b Second plate-shaped part
413a First projecting part
413b Second projecting part
501 Handle
502 Handle shaft
503 Frame
510 Camera
511a First speaker
511b Second speaker
512a First tactile presentation part
512b Second tactile presentation part
530 Linked part

The invention claimed is:

1. A vehicle, comprising:
 a handle part that includes a handle and a handle shaft, wherein
  the handle has a straight shape that extends in a direction substantially orthogonal to an extension direction of the handle shaft, and
  the handle includes a speaker and a tactile presentation part in order respectively from a center of rotation of the handle toward either end of the handle;
 an imaging device near the center of rotation of the handle;
 a front wheel connected to be steerable by the handle;
 a rear wheel connected to a pedal; and
 a frame part that connects the front wheel and the rear wheel, wherein the frame part is expandable and contractible between a first position in which a movement of the front wheel is permitted, and a second position in which a movement of the front wheel is restricted.

2. The vehicle according to claim 1, wherein the movement of the front wheel includes a movement of the front wheel associated with an operation of the handle.

3. The vehicle according to claim 1, wherein
 the front wheel includes a first front wheel and a second front wheel, and
 the movement of the front wheel includes a tilting of a link mechanism connected to the first front wheel and the second front wheel.

4. The vehicle according to claim 1, wherein the frame part includes a first frame part and a second frame part, and the frame part expands and contracts due to the first frame part and the second frame part moving relative to each other.

5. The vehicle according to claim 4, wherein the frame part expands and contracts due to the first frame part sliding with respect to the second frame part.

6. The vehicle according to claim 5, wherein the frame part contracts based on the first frame part that slides toward the second frame part, and the frame part expands based on the first frame part that slides away from the second frame part.

7. The vehicle according to claim 5, further comprising:
 a linked member configured to move together with an operation of the handle, wherein
 in the second position, a movement of the linked member is restricted by an engaging member included in the first frame part.

8. The vehicle according to claim 5, further comprising:
 a link mechanism including two connecting members connected as a bridge between two of the front wheels, wherein
 in the second position, a movement of the link mechanism is restricted due to a restricting member included in the first frame part being inserted between the two connecting members.

9. The vehicle according to claim 4, wherein the rear wheel is connected to the first frame part, and the front wheel is connected to the second frame part.

10. The vehicle according to claim 1, further comprising:
 a carrier, wherein a center of gravity of the carrier is between a center of a rotational axis of the front wheel and the handle.

11. The vehicle according to claim 1, wherein the handle is connected on one end of the handle shaft, and a rectangular frame is on another end of the handle shaft.

\* \* \* \* \*